US011942788B2

(12) United States Patent
Slepchenkov et al.

(10) Patent No.: US 11,942,788 B2
(45) Date of Patent: Mar. 26, 2024

(54) SYSTEMS, DEVICES, AND METHODS FOR MODULE-BASED CASCADED ENERGY SYSTEMS CONFIGURED TO INTERFACE WITH RENEWABLE ENERGY SOURCES

(71) Applicant: TAE Technologies, Inc., Foothill Ranch, CA (US)

(72) Inventors: Mikhail Slepchenkov, Lake Forest, CA (US); Roozbeh Naderi, Foothill Ranch, CA (US)

(73) Assignee: TAE Technologies, Inc., Foothill Ranch, CA (US)

( * ) Notice: Subject to any disclaimer, the term of this patent is extended or adjusted under 35 U.S.C. 154(b) by 0 days.

(21) Appl. No.: 17/969,350

(22) Filed: Oct. 19, 2022

(65) Prior Publication Data
US 2023/0040660 A1 Feb. 9, 2023

Related U.S. Application Data

(63) Continuation of application No. 17/950,789, filed on Sep. 22, 2022, which is a continuation of application No. 17/858,751, filed on Jul. 6, 2022.
(Continued)

(51) Int. Cl.
H02J 3/38 (2006.01)
H02J 3/32 (2006.01)
(Continued)

(52) U.S. Cl.
CPC ............ H02J 3/32 (2013.01); H02J 3/381 (2013.01); H02J 7/0013 (2013.01); H02J 7/06 (2013.01);
(Continued)

(58) Field of Classification Search
CPC .. H02J 3/32; H02J 3/381; H02J 7/0013; H02J 7/06; H02J 7/345; H02J 2300/20;
(Continued)

(56) References Cited

U.S. PATENT DOCUMENTS 5,204,548 A 4/1993 Daehler et al.
5,428,522 A 6/1995 Millner et al.
(Continued)

FOREIGN PATENT DOCUMENTS

CA 2810369 3/2012
CN 201789411 4/2011
(Continued)

OTHER PUBLICATIONS

"Capacitor Voltage Control Technique For A Modular Converter", An IP.com Prior Art Database Technical Disclosure, Jun. 10, 2015, pp. 1-7.
(Continued)

Primary Examiner — Elim Ortiz
(74) Attorney, Agent, or Firm — Fish & Richardson P.C.

(57) ABSTRACT

Example embodiments of systems, devices, and methods are provided herein for energy systems having multiple modules arranged in cascaded fashion for storing power from one or more photovoltaic sources. Each module includes an energy source and converter circuitry that selectively couples the energy source to other modules in the system over an AC interface for generating AC power or for receiving and storing power from a charge source. Each module also includes a DC interface for receiving power from one or more photovoltaic sources. Each module can be controlled by control system to route power from the photovoltaic source to that modules energy source or to the AC interface. The energy systems can be arranged in single phase or multiphase topologies with multiple serial or interconnected
(Continued)

arrays. The energy systems can be arranged such that each module receives power from the same single photovoltaic source, or multiple photovoltaic sources.

20 Claims, 45 Drawing Sheets

Related U.S. Application Data

(60) Provisional application No. 63/243,061, filed on Sep. 10, 2021, provisional application No. 63/227,646, filed on Jul. 30, 2021, provisional application No. 63/219,021, filed on Jul. 7, 2021.

(51) Int. Cl.
*H02J 7/00* (2006.01)
*H02J 7/06* (2006.01)
*H02M 3/335* (2006.01)
*H02J 7/34* (2006.01)
*H02M 7/537* (2006.01)

(52) U.S. Cl.
CPC .......... *H02J 7/345* (2013.01); *H02J 2300/20* (2020.01); *H02J 2300/24* (2020.01); *H02J 2300/28* (2020.01); *H02J 2300/30* (2020.01); *H02M 3/33573* (2021.05); *H02M 7/537* (2013.01)

(58) Field of Classification Search
CPC ............... H02J 2300/24; H02J 2300/28; H02J 2300/30; H02M 3/33573; H02M 7/537; H02M 1/0043; H02M 1/007; H02M 3/158; H02M 3/33561; H02M 3/337; H02M 7/49; H02M 7/5387; Y02E 10/56
See application file for complete search history.

(56) References Cited

U.S. PATENT DOCUMENTS

| | | | |
|---|---|---|---|
| 5,642,275 A | 6/1997 | Peng et al. | |
| 5,905,371 A | 5/1999 | Limpaecher | |
| 5,933,339 A | 8/1999 | Duba et al. | |
| 5,949,664 A | 9/1999 | Bernet et al. | |
| 6,051,961 A | 4/2000 | Jang et al. | |
| 6,058,032 A | 5/2000 | Yamanaka et al. | |
| 6,064,180 A | 5/2000 | Sullivan et al. | |
| 6,236,580 B1 | 5/2001 | Aiello et al. | |
| 6,373,734 B1 | 4/2002 | Martinelli | |
| 7,091,701 B2 | 8/2006 | Turner et al. | |
| 7,485,987 B2 | 2/2009 | Mori et al. | |
| 7,608,937 B1* | 10/2009 | Altenschulte ........... H02J 3/381 |
| | | | 290/44 |
| 7,819,676 B1 | 10/2010 | Cardoso et al. | |
| 8,395,280 B2 | 3/2013 | Graovac et al. | |
| 8,476,888 B1 | 7/2013 | Chen et al. | |
| 8,503,202 B2 | 8/2013 | Chimento et al. | |
| 8,614,525 B2 | 12/2013 | Teichmann et al. | |
| 8,829,723 B2 | 9/2014 | Graovac et al. | |
| 9,172,254 B2 | 10/2015 | Ganor | |
| 9,444,275 B2 | 9/2016 | Huang et al. | |
| 9,461,474 B2 | 10/2016 | Deboy et al. | |
| 9,673,732 B2 | 6/2017 | Deboy et al. | |
| 10,014,611 B2 | 7/2018 | Götz | |
| 10,074,995 B2 | 9/2018 | Smedley et al. | |
| 10,193,359 B2 | 1/2019 | Ganor | |
| 10,218,189 B2 | 2/2019 | Goetz | |
| 10,291,037 B2 | 5/2019 | Birkl et al. | |
| 10,391,870 B2 | 8/2019 | Götz et al. | |
| 10,396,682 B2 | 8/2019 | Götz et al. | |
| 10,439,506 B2 | 10/2019 | Götz | |
| 10,442,309 B2 | 10/2019 | Götz | |
| 10,454,331 B2 | 10/2019 | Götz | |
| 10,473,728 B2 | 11/2019 | Goetz | |
| 10,630,201 B2 | 4/2020 | Götz et al. | |
| 10,700,587 B2 | 6/2020 | Götz | |
| 10,759,284 B2 | 9/2020 | Jaensch et al. | |
| 10,784,698 B2 | 9/2020 | Jaensch et al. | |
| 10,840,714 B2 | 11/2020 | Götz et al. | |
| 10,980,103 B2 | 4/2021 | Götz et al. | |
| 10,985,551 B2 | 4/2021 | Götz | |
| 10,998,739 B2 | 5/2021 | Hinterberger et al. | |
| 11,038,435 B2 | 6/2021 | Götz | |
| 2003/0102845 A1 | 6/2003 | Aker et al. | |
| 2004/0008016 A1 | 1/2004 | Sutardja et al. | |
| 2004/0037101 A1 | 2/2004 | Meynard et al. | |
| 2004/0159102 A1 | 8/2004 | Toyomura et al. | |
| 2005/0065684 A1 | 3/2005 | Larson et al. | |
| 2006/0097782 A1 | 5/2006 | Ebner | |
| 2006/0202636 A1 | 9/2006 | Schneider | |
| 2007/0147098 A1 | 6/2007 | Mori et al. | |
| 2007/0194627 A1 | 8/2007 | Mori et al. | |
| 2007/0246635 A1 | 10/2007 | Nakajima et al. | |
| 2008/0080212 A1 | 4/2008 | Grbovic | |
| 2008/0245593 A1 | 10/2008 | Kim | |
| 2008/0286622 A1* | 11/2008 | Shaw ................ H01M 8/04888 |
| | | | 429/431 |
| 2008/0304296 A1 | 12/2008 | Nadimpalliraju et al. | |
| 2009/0251212 A1 | 10/2009 | Pillonnet et al. | |
| 2009/0311891 A1 | 12/2009 | Lawrence et al. | |
| 2010/0060235 A1 | 3/2010 | Dommaschk et al. | |
| 2010/0085789 A1 | 4/2010 | Ulrich et al. | |
| 2010/0121511 A1 | 5/2010 | Onnerud et al. | |
| 2010/0219688 A1 | 9/2010 | Shyu et al. | |
| 2010/0298957 A1 | 11/2010 | Sanchez Rocha et al. | |
| 2010/0301827 A1 | 12/2010 | Chen et al. | |
| 2011/0025275 A1* | 2/2011 | Nozu .................. H01M 50/213 |
| | | | 320/137 |
| 2011/0133573 A1 | 6/2011 | Ratnaparkhi et al. | |
| 2011/0140533 A1 | 6/2011 | Zeng et al. | |
| 2011/0148198 A1 | 6/2011 | Tripathi et al. | |
| 2011/0148205 A1 | 6/2011 | Moon | |
| 2011/0187184 A1 | 8/2011 | Ichikawa | |
| 2011/0198936 A1 | 8/2011 | Graovac et al. | |
| 2012/0053871 A1 | 3/2012 | Sirard | |
| 2012/0074949 A1 | 3/2012 | Kepley et al. | |
| 2012/0112693 A1 | 5/2012 | Kusch et al. | |
| 2012/0155140 A1 | 6/2012 | Chen et al. | |
| 2012/0161858 A1 | 6/2012 | Permuy et al. | |
| 2012/0195084 A1 | 8/2012 | Norrga | |
| 2012/0262967 A1 | 10/2012 | Cuk | |
| 2013/0027126 A1 | 1/2013 | Jayaraman et al. | |
| 2013/0083563 A1 | 4/2013 | Wang et al. | |
| 2013/0088254 A1 | 4/2013 | Hoang et al. | |
| 2013/0088903 A1 | 4/2013 | Sagona et al. | |
| 2013/0090872 A1 | 4/2013 | Kurimoto | |
| 2013/0154379 A1 | 6/2013 | Tiefenbach | |
| 2013/0154521 A1 | 6/2013 | Butzmann et al. | |
| 2013/0257163 A1 | 10/2013 | O'Brien et al. | |
| 2013/0260188 A1 | 10/2013 | Coates | |
| 2013/0285457 A1 | 10/2013 | Kepley | |
| 2013/0302652 A1 | 11/2013 | Wolff et al. | |
| 2014/0022738 A1* | 1/2014 | Hiller .................. H02M 7/4835 |
| | | | 361/730 |
| 2014/0027112 A1 | 1/2014 | Irani et al. | |
| 2014/0042815 A1 | 2/2014 | Maksimovic et al. | |
| 2014/0042827 A1 | 2/2014 | Wolff | |
| 2014/0104899 A1 | 4/2014 | Fischer et al. | |
| 2014/0152109 A1 | 6/2014 | Kanakasabai et al. | |
| 2014/0226379 A1 | 8/2014 | Harrison | |
| 2014/0239927 A1 | 8/2014 | Nascimento et al. | |
| 2014/0254219 A1 | 9/2014 | Davies | |
| 2014/0340052 A1 | 11/2014 | Dwertmann et al. | |
| 2014/0354212 A1 | 12/2014 | Sugeno et al. | |
| 2015/0009594 A1 | 1/2015 | Okaeme et al. | |
| 2015/0049532 A1 | 2/2015 | Bernet et al. | |
| 2015/0124506 A1 | 5/2015 | Sahoo et al. | |
| 2015/0144176 A1 | 5/2015 | Chang et al. | |
| 2015/0229227 A1 | 8/2015 | Aeloiza et al. | |
| 2015/0249351 A1 | 9/2015 | Wolff et al. | |
| 2015/0270801 A1 | 9/2015 | Kessler et al. | |
| 2015/0280604 A1 | 10/2015 | Hassanpoor | |

(56) References Cited

U.S. PATENT DOCUMENTS

| | | | |
|---|---|---|---|
| 2015/0288287 A1 | 10/2015 | Madawala et al. | |
| 2015/0296292 A1 | 10/2015 | Hogan et al. | |
| 2015/0303820 A1 | 10/2015 | Cubaines | |
| 2015/0340964 A1 | 11/2015 | Modeer | |
| 2015/0364935 A1 | 12/2015 | Fetzer et al. | |
| 2016/0006251 A1 | 1/2016 | Modeer et al. | |
| 2016/0072396 A1 | 3/2016 | Deboy et al. | |
| 2016/0183451 A1 | 6/2016 | Conrad et al. | |
| 2016/0240894 A1* | 8/2016 | Wartenberg | H01M 10/425 |
| 2016/0254682 A1 | 9/2016 | Yip et al. | |
| 2016/0308466 A1 | 10/2016 | Oates | |
| 2017/0054306 A1 | 2/2017 | Vo et al. | |
| 2017/0093187 A1* | 3/2017 | Park | H02J 3/32 |
| 2017/0099007 A1 | 4/2017 | Oates et al. | |
| 2017/0163171 A1 | 6/2017 | Park | |
| 2017/0179745 A1 | 6/2017 | Tritschler et al. | |
| 2017/0338654 A1 | 11/2017 | Subramanian | |
| 2017/0366079 A1 | 12/2017 | Bhowmik et al. | |
| 2018/0043789 A1 | 2/2018 | Goetz | |
| 2018/0175744 A1 | 6/2018 | Jasim et al. | |
| 2018/0241239 A1 | 8/2018 | Frost et al. | |
| 2019/0031042 A1 | 1/2019 | Müller | |
| 2019/0131851 A1 | 5/2019 | Herb | |
| 2019/0238088 A1 | 8/2019 | Zhuang et al. | |
| 2019/0288522 A1 | 9/2019 | Hinterberger et al. | |
| 2019/0288526 A1 | 9/2019 | Jaensch et al. | |
| 2019/0288527 A1 | 9/2019 | Jaensch et al. | |
| 2019/0288547 A1 | 9/2019 | Jaensch et al. | |
| 2019/0288617 A1 | 9/2019 | Jaensch et al. | |
| 2019/0312504 A1 | 10/2019 | Kim et al. | |
| 2020/0212687 A1 | 7/2020 | Hinterberger et al. | |
| 2020/0235439 A1 | 7/2020 | Frost et al. | |
| 2020/0244076 A1 | 7/2020 | Wang et al. | |
| 2020/0278936 A1 | 9/2020 | Gopalakrishnan et al. | |
| 2020/0317086 A1 | 10/2020 | Goetz et al. | |
| 2020/0328593 A1 | 10/2020 | Goetz | |
| 2020/0338997 A1 | 10/2020 | Goetz et al. | |
| 2020/0358370 A1 | 11/2020 | Goetz et al. | |
| 2020/0395840 A1 | 12/2020 | Goetz | |
| 2021/0005855 A1 | 1/2021 | Götz et al. | |
| 2021/0146791 A1 | 5/2021 | Hinterberger et al. | |
| 2021/0151726 A1 | 5/2021 | Hinterberger et al. | |
| 2021/0151727 A1 | 5/2021 | Hinterberger et al. | |
| 2021/0151728 A1 | 5/2021 | Hinterberger et al. | |
| 2021/0197676 A1 | 7/2021 | Goetz et al. | |
| 2021/0211066 A1* | 7/2021 | Vavilpalli | H02J 3/48 |
| 2022/0103088 A1 | 3/2022 | Slepchenkov et al. | |
| 2022/0219549 A1 | 7/2022 | Slepchenkov et al. | |
| 2022/0289067 A1 | 9/2022 | Adegbohun | |
| 2023/0009016 A1 | 1/2023 | Slepchenkov et al. | |
| 2023/0019530 A1 | 1/2023 | Slepchenkov et al. | |

FOREIGN PATENT DOCUMENTS

| | | |
|---|---|---|
| CN | 204156591 | 2/2015 |
| CN | 103812377 | 5/2016 |
| DE | 102014008399 | 12/2015 |
| DE | 102016109077 | 11/2017 |
| DE | 102017220175 | 5/2019 |
| DE | 102018109921 | 8/2019 |
| DE | 102018109922 | 10/2019 |
| DE | 102018109925 | 10/2019 |
| DE | 102018109926 | 12/2019 |
| DE | 102018121403 | 3/2020 |
| DE | 102018121490 | 3/2020 |
| DE | 102018121547 | 3/2020 |
| DE | 102018126780 | 4/2020 |
| DE | 102018129111 | 5/2020 |
| DE | 102018126779 | 6/2020 |
| DE | 102019112826 | 6/2020 |
| DE | 102019102306 | 7/2020 |
| DE | 102019102311 | 7/2020 |
| DE | 102019103757 | 7/2020 |
| DE | 102019120615 | 8/2020 |
| DE | 102019112373 | 11/2020 |
| DE | 102019112823 | 11/2020 |
| DE | 102019120616 | 11/2020 |
| DE | 102019120947 | 11/2020 |
| DE | 102019125577 | 11/2020 |
| DE | 102019125578 | 11/2020 |
| DE | 102019120945 | 2/2021 |
| DE | 102019130736 | 5/2021 |
| DE | 102019130737 | 5/2021 |
| DE | 102019132685 | 6/2021 |
| DE | 102020117264 | 6/2021 |
| DE | 102020117435 | 6/2021 |
| DE | 102020118242 | 7/2021 |
| EP | 0907238 | 4/1999 |
| EP | 2290799 | 3/2011 |
| EP | 2658071 | 10/2013 |
| EP | 2693598 | 2/2014 |
| WO | WO 2011/009689 | 1/2011 |
| WO | WO 2011/082855 | 7/2011 |
| WO | WO 2011/082856 | 7/2011 |
| WO | WO 2011/128133 | 10/2011 |
| WO | WO 2012/016735 | 2/2012 |
| WO | WO 2012/038162 | 3/2012 |
| WO | WO 2013/056900 | 4/2013 |
| WO | WO 2014/151178 | 9/2014 |
| WO | WO 2014/193254 | 12/2014 |
| WO | WO 2016/030144 | 3/2016 |
| WO | WO 2018/072837 | 4/2018 |
| WO | WO 2018/095552 | 5/2018 |
| WO | WO 2018/154206 | 8/2018 |
| WO | WO 2018/193173 | 10/2018 |
| WO | WO 2018/210451 | 11/2018 |
| WO | WO 2018/210452 | 11/2018 |
| WO | WO 2018/231810 | 12/2018 |
| WO | WO 2018/232403 | 12/2018 |
| WO | WO 2018/233871 | 12/2018 |
| WO | WO 2019/020215 | 1/2019 |
| WO | WO 2019/161875 | 8/2019 |
| WO | WO 2019/166733 | 9/2019 |
| WO | WO 2019/180699 | 9/2019 |
| WO | WO 2019/183553 | 9/2019 |
| WO | WO 2020/078580 | 4/2020 |
| WO | WO 2020/205511 | 10/2020 |
| WO | WO 2020/205574 | 10/2020 |
| WO | WO 2020/243655 | 12/2020 |
| WO | WO 2022/079289 | 4/2022 |

OTHER PUBLICATIONS

Bode, G.H., et al., "Hysteresis Current Regulation For Single-Phase Multilevel Inverters Using Asynchronous State Machines", 29th Annual Conference of the IEEE Industrial Electronics Society, Piscataway, NJ, 2003, pp. 1203-4208.

Chang, F., et al., "Improving the Overall Efficiency of Automotive Inverters Using a Multilevel Converter Composed of Low Voltage Si MOSFETs", IEEE Transactions on Power Electronics, 2019, vol. 34, No. 4, pp. 3586-3602.

Debnath, S., et al., "Operation, Control, and Applications of the Modular Multilevel Converter: A Review", IEEE Transactions on Power Electronics, 2015, vol. 30, No. 1, pp. 37-53.

EP 18816636.7 Extended Search Report, dated Feb. 19, 2021, 11 pages.

EP 18817541.8 Supplementary Search Report, dated Jan. 20, 2021, 5 pages.

EP 18817541.8 Written Opinion, dated Feb. 2, 2021, 6 pages.

Farr, E., et al., "A Sub-module Capacitor Voltage Balancing Scheme for the Alternate Arm Converter (AAC)", 15th European Conference on IEEE Power Electronics and Applications, 2013, pp. 1-10.

Gelman, V., "Energy Storage That May Be Too Good to Be True", IEEE Vehicular Technology Magazine, 2031, pp. 70-80.

Gupta, R., et al., "Cascaded Multilevel Control of DSTATCOM Using Multiband Hysteresis Modulation", IEEE Power Engineering Society General Meeting, Piscataway, NJ, 2006, pp. 1-7.

Hassanpoor, A., et al., "Tolerance Band Modulation Methods for Modular Multilevel Converters", IEEE Transactions on Power Electronics, 2015, vol. 30, No. 1, pp. 311-326.

(56) References Cited

OTHER PUBLICATIONS

Herrera, V. I., et al., "Optimal Energy Management and Sizing of a Battery—Supercapacitor-Based Light Rail Vehicle With a Multiobjective Approach", IEEE Transactions on Industry Applications, 2016, vol. 52, No. 4, pp. 3367-3377.

Kersten, A., "Battery Loss and Stress Mitigation in a Cascaded H-Bridge Multilevel Inverter for Vehicle Traction Applications by Filter Capacitors", IEEE Transactions on Transportation Electrification, 2019, pp. 1-13.

Khoshkbar-Sadigh, A., et al., "Thermal and Performance Comparison of Active Neutral-Point-Clamped (ANPC) and Dual Flying-Capacitor ANPC (DFC-ANPC) Inverters", IEEE Energy Conversion Congress and Exposition (ECCE), 2019, pp. 5522-5528.

Konstantinou, G., et al., "A Hybrid Modular Multilevel Converter with Partial Embedded Energy Storage", Energies, 2016, vol. 9, No. 12, pp. 1-18.

Li, N., et al., "SOH Balancing Control Method for the MMC Battery Energy Storage System", IEEE Transactions on Industrial Electronics, 2018, vol. 65, No. 8, pp. 6581-6591.

Loh, P. C., et al., "A Reduced Common Mode Hysteresis Current Regulation Strategy for Multilevel Inverters", 18th Annual IEEE Applied Power Electronics Conference and Exposition, Miami Beach, FL, 2003, vol. 1, pp. 576-582.

Loh, P. C., et al., "A Time-Based Double-Band Hysteresis Current Regulation Strategy for Single-Phase Multilevel Inverters", IEEE Transactions on Industry Applications, 2003, vol. 39, No. 3, pp. 883-892.

Maharjan, L., et al., "Fault-Tolerant Operation of a Battery-Energy-Storage System Based on a Multilevel Cascade PWM Converter With Star Configuration", IEEE Transactions On Power Electronics, 2010, vol. 25, No. 9, pp. 2386-2396.

Maharjan, L., et al., "State-of-Charge (SOC)-Balancing Control of a Battery Energy Storage System Based on a Cascade PWM Converter", IEEE Transactions On Power Electronics, 2009, vol. 24, No. 6, pp. 1628-1636.

Méllo, J.P.R., et al., "Multilevel Reduced Controlled Switches AC-DC Power Conversion Cells", IEEE Energy Conversion Congress and Exposition (ECCE), 2015, pp. 3815-3822.

Naderi, R., "Battery Management Converter System and Multilevel Converter Topology and Control", 2016, Dissertation at the University of California, Irvine, pp. 1-211.

Naderi, R., et al., "A Correction to the State-Machine-Decoder for Stacked Multicell Converters", IEEE Applied Power Electronics Conference and Exposition (APEC), 2014, pp. 1545-1549.

Naderi, R., et al., "A New Hybrid Active Neutral Point Clamped Flying Capacitor Multilevel Inverter", IEEE Applied Power Electronics Conference and Exposition (APEC), 2015, pp. 794-798.

Naderi, R., et al., "Dual Flying Capacitor Active-Neutral-Point-Clamped Multilevel Converter", IEEE Transactions On Power Electronics, 2016, vol. 31, No. 9, pp. 6476-6484.

Naderi, R., et al., "Phase-Shifted Carrier PWM Technique for General Cascaded Inverters", IEEE Transactions On Power Electronics, 2008, vol. 23, No. 3, pp. 1257-1269.

P., S., et al., "Seven Level Inverter Topologies: A Comparative Study", International Journal of Innovative Research in Electrical, Electronics, Instrumentation and Control Engineering, 2016, vol. 3, No. 1, pp. 148-162.

Sangiri, J. B., et al., "Modular Multilevel Converter for Multifunctional Battery Management System of Electric Vehicle", 44th Annual Conference of the IEEE Industrial Electronics Society, 2018, pp. 1333-1338.

SG 11201912049P Written Opinion, dated Mar. 10, 2021, 12 pages.

Shimada, M., et al., "Energy-saving Technology for Railway Traction Systems Using Onboard Storage Batteries", Hitachi Review, 2012, vol. 61, No. 7, pp. 312-318.

Tajeddine, K., et al., "A Cascaded H-Bridge Multilevel Inverter with SOC Battery Balancing", International Journal of Advanced Computer Science and Applications, 2017, vol. 8, No. 12, pp. 345-350.

Varghese, K., "Implementation Of Single Phase Seven Level Cascaded Multilevel Inverter With Reduced No of Switches", Project Report'15, retrieved from https://www.academia.edu/12826368/single_phase_seven_level_cascaded_multilevel_inverter, pp. 1-45.

Venu, K., et al., "A Seven Level Single-Phase Cascaded Inverter with Improved Efficiency", International Journal & Magazine of Engineering, Technology, Management and Research, 2016, vol. 3, No. 10, pp. 243-249.

WO PCT/US18/37081 ISR and Written Opinion, dated Oct. 17, 2018, 21 pages.

WO PCT/US18/38089 ISR and Written Opinion, dated Oct. 29, 2018, 18 pages.

WO PCT/US19/23695 ISR and Written Opinion, dated Aug. 12, 2019, 15 pages.

WO PCT/US21/27154 ISR and Written Opinion, dated Oct. 14, 2021, 19 pages.

WO PCT/US21/27159 ISR and Written Opinion, dated Sep. 1, 2021, 10 pages.

WO PCT/US21/32295 ISR and Written Opinion, dated Sep. 14, 2021, 16 pages.

Wu, B., et al., "Analysis of a distributed maximum power point tracking tracker with low input voltage ripple and flexible gain range", IET Power Electron., 2016, vol. 9, No. 6, pp. 1220-1227.

Zhang, L., et al., "Design and Performance Evaluation of the Modular Multilevel Converter (MMC)-based Grid-tied PV-Battery Conversion System", IEEE Energy Conversion Congress and Exposition (ECCE), 2018, pp. 2649-2654.

International Search Report and Written Opinion in International Appln. No. PCT/US2022/036246, dated Dec. 8, 2022, 23 pages.

Tolbert et al., "Charge Balance Control Schemes for Cascade Multi-level Converter in Hybrid Electric Vehicles," IEEE Trans. Indus. Electronics, Oct. 2002, 49(5):1058-1064.

De Simone, "Modular Multilevel Converter with Integrated Storage System for Automotive Applications," Dissertation for the degree of Doctor of Electrical Engineering, Politecnico di Milano, Department of Electronics, Information and Bioengineering, Sep. 21, 2021, 181 pages.

Mayet et al., "Simulation and Control of a New Integrated Battery System for Automotive Applications," Proceedings of PCIM Europe Digital Days 2021, Virtual Event, May 3-7, 2021, 6 pages.

* cited by examiner

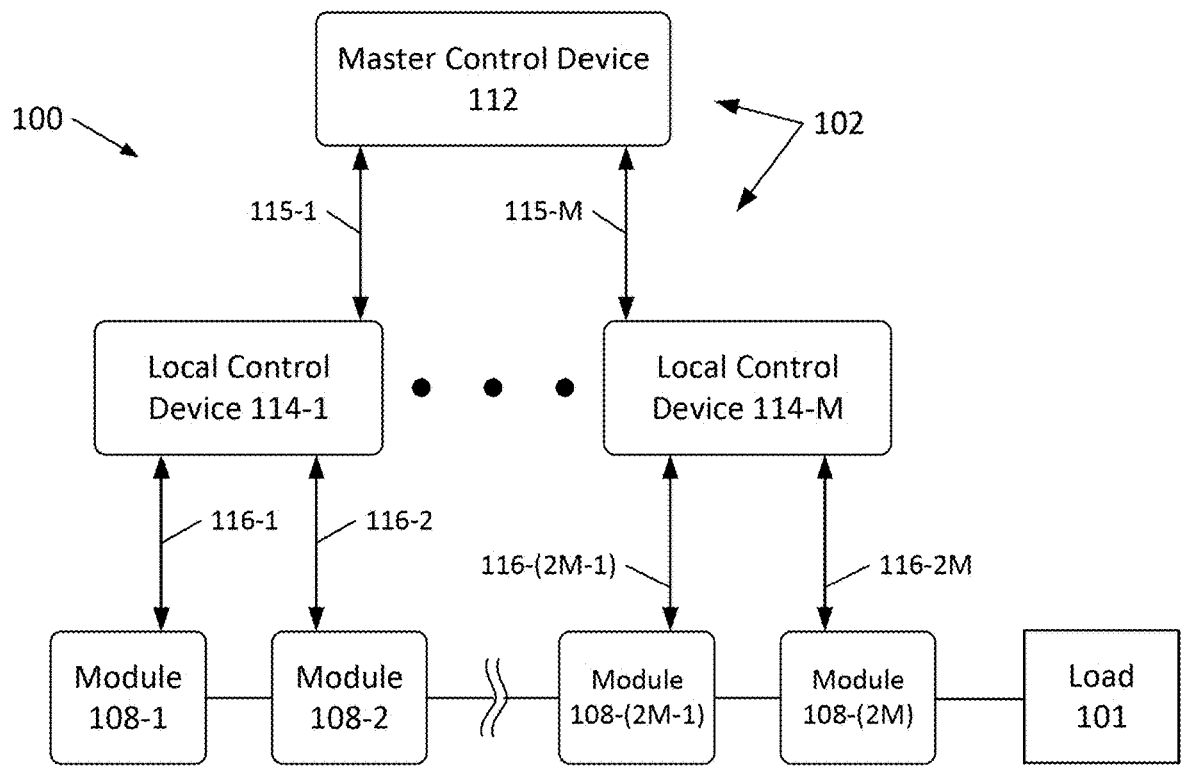
FIG. 1C
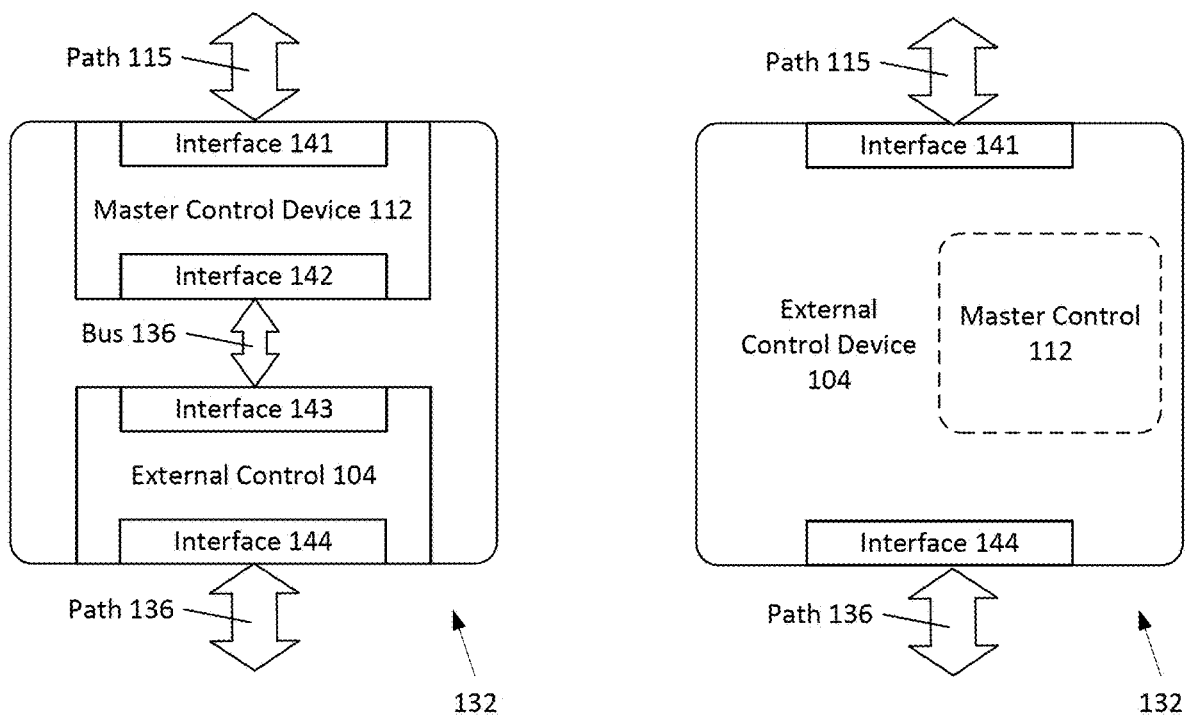
FIG. 1D  FIG. 1E

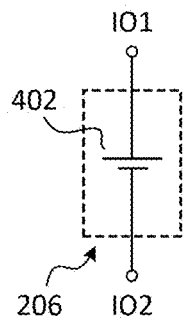
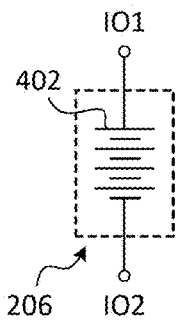
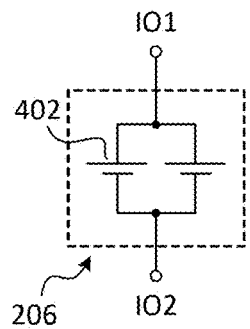
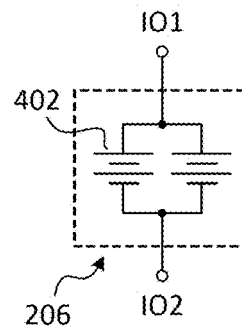
FIG. 4A　　　　FIG. 4B　　　　FIG. 4C　　　　FIG. 4D
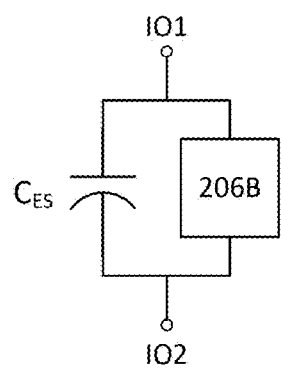
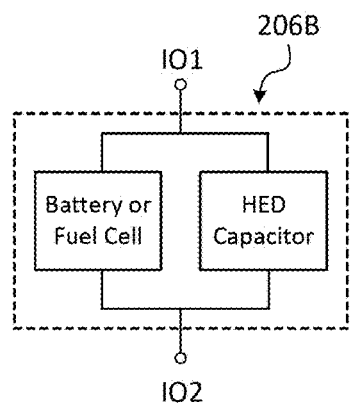
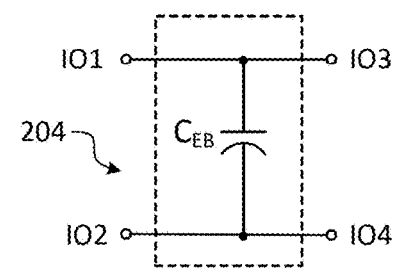
FIG. 4E　　　　FIG. 4F　　　　FIG. 5A
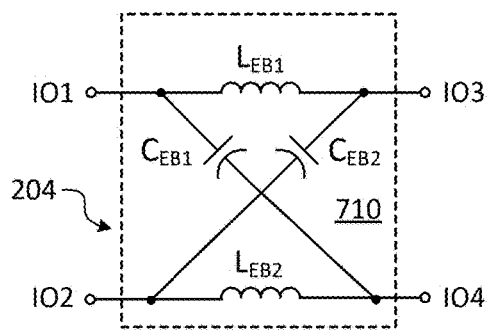
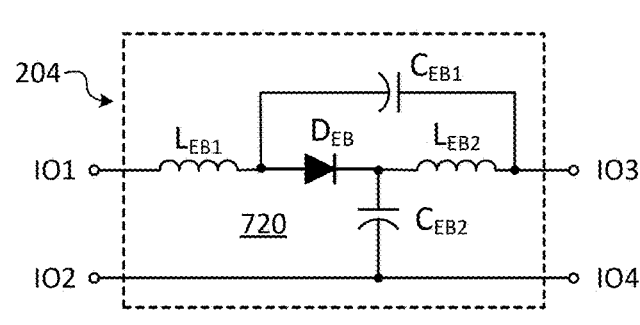
FIG. 5B　　　　　　　FIG. 5C

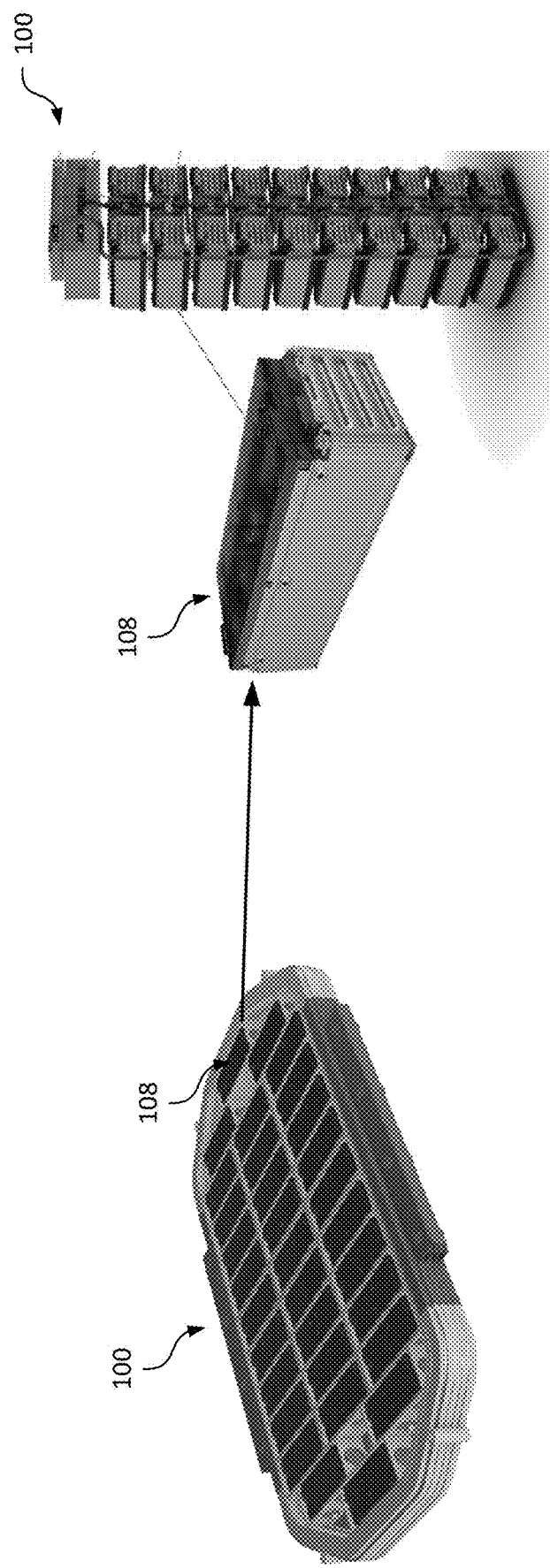

SYSTEMS, DEVICES, AND METHODS FOR MODULE-BASED CASCADED ENERGY SYSTEMS CONFIGURED TO INTERFACE WITH RENEWABLE ENERGY SOURCES

CROSS REFERENCE TO RELATED APPLICATIONS

This patent application is a continuation (and claims the benefit of priority under 35 USC 120) of U.S. patent application Ser. No. 17/950,789, filed Sep. 22, 2022, which is a continuation (and claims the benefit of priority under 35 USC 120) of U.S. patent application Ser. No. 17/858,751, filed Jul. 6, 2022, which claims the benefit of and priority to U.S. Provisional Application No. 63/219,021, filed Jul. 7, 2021, U.S. Provisional Application No. 63/227,646, filed Jul. 30, 2021, and U.S. Provisional Application No. 63/243,061, filed Sep. 10, 2021, all of which are incorporated by reference herein in their entirety for all purposes.

FIELD

The subject matter described herein relates generally to systems, devices, and methods for module-based cascaded energy systems configured to interface with renewable energy sources.

BACKGROUND

The proliferation of photovoltaic sources and a desire to harness energy in a renewable fashion has led to incorporation of these sources in a wide variety of applications and locations. The performance of photovoltaic sources can vary greatly based on design, age, utilization, and environment. The photovoltaic sources require periodic upgrade and/or supplementation to maximize their efficiency. Energy systems that interface with photovoltaic sources, and harness energy from those sources, are typically not easily scaled and/or modified to handle the ever-changing power capabilities of photovoltaic sources in use throughout the world.

For these and other reasons, needs exist for improved systems, devices, and methods for module-based cascaded energy systems that interface with photovoltaic energy sources.

SUMMARY

Example embodiments of systems, devices, and methods are provided herein for energy systems having multiple modules arranged in cascaded fashion for storing power from one or more renewable energy sources, e.g., one or more photovoltaic sources. Each module includes an energy source and converter circuitry that selectively couples the energy source to other modules in the system over an AC interface for generating AC power or for receiving and storing power from a charge source. Each module also includes a DC interface for receiving power from one or more photovoltaic sources. Each module can be controlled by control system to route power from the photovoltaic source to that module's energy source or to the AC interface. The energy systems can be arranged in single phase or multiphase topologies with multiple serial or interconnected arrays. The energy systems can be arranged such that each module receives power from the same single photovoltaic source, or multiple photovoltaic sources.

Each module can also include a DC interface for receiving power from other energy sources, e.g., from fuel cells. Multiphase topologies can be arranged to receive multiphase AC power from renewable energy sources, such as wind turbines. An energy system can include multiple instances of arrays of modules for connection to multiple AC sources, e.g., to a wind turbine and a grid. The modules of the arrays of the multiple instances can be coupled together at their DC interfaces, e.g., in a daisy chain arrangement, such that the modules can exchange or transfer energy.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

FIGS. 1A-1C are block diagrams depicting example embodiments of a modular energy system.

FIGS. 1D-1E are block diagrams depicting example embodiments of control devices for an energy system.

FIGS. 4A-4F are schematic views depicting example embodiments of energy sources.

FIGS. 5A-5C are schematic views depicting example embodiments of energy buffers.

FIGS. 15A-15B depict example embodiments of energy storage systems having multiple energy sources that are used in a first life application and a second life application.

DETAILED DESCRIPTION

Figure 1A:
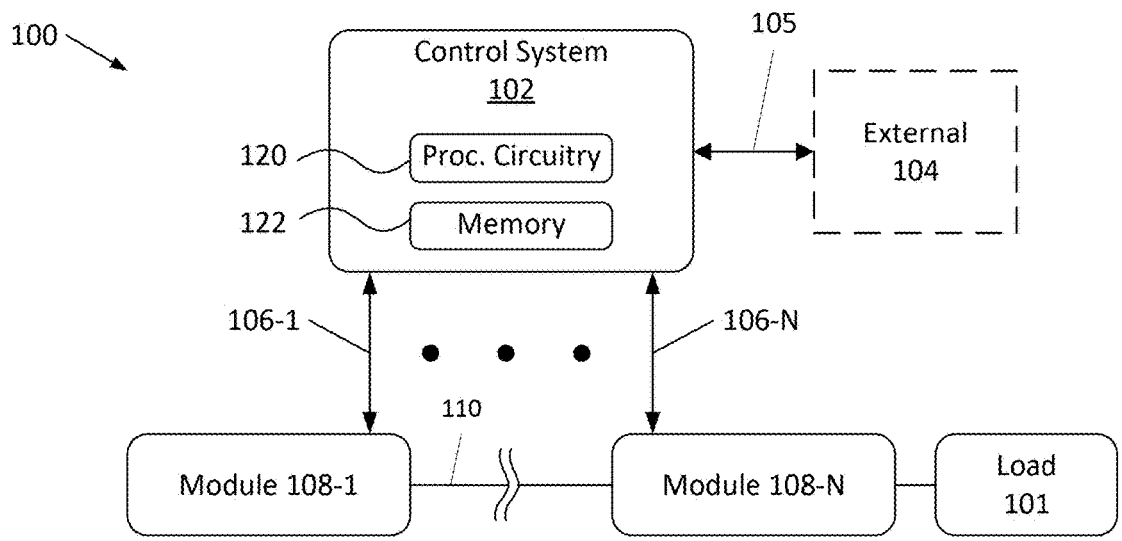

Before the present subject matter is described in detail, it is to be understood that this disclosure is not limited to the particular embodiments described, as such may, of course, vary. The terminology used herein is for the purpose of describing particular embodiments only, and is not intended to be limiting, since the scope of the present disclosure will be limited only by the appended claims.

Before describing the example embodiments pertaining to modular energy systems that interface with photovoltaic sources, it is first useful to describe these underlying systems in greater detail. With reference to FIGS. 1A through 10F, the following sections describe various applications in which embodiments of the modular energy systems can be implemented, embodiments of control systems or devices for the modular energy systems, configurations of the modular energy system embodiments with respect to charging sources and loads, embodiments of individual modules, embodiments of topologies for arrangement of the modules within the systems, embodiments of control methodologies, embodiments of balancing operating characteristics of modules within the systems, and embodiments of the use of interconnection modules.

Examples of Applications

Stationary applications are those in which the modular energy system is located in a fixed location during use, although it may be capable of being transported to alternative locations when not in use. The module-based energy system resides in a static location while providing electrical energy for consumption by one or more other entities, or storing or buffering energy for later consumption. Examples of stationary applications in which the embodiments disclosed herein can be used include, but are not limited to: energy systems for use by or within one or more residential structures or locales, energy systems for use by or within one or more industrial structures or locales, energy systems for use by or within one or more commercial structures or locales, energy systems for use by or within one or more governmental structures or locales (including both military and non-military uses), energy systems for charging the mobile applications described below (e.g., a charge source or a charging station), and systems that convert solar power, wind, geothermal energy, fossil fuels, or nuclear reactions into electricity for storage. Stationary applications often supply loads such as grids and microgrids, motors, and data centers. A stationary energy system can be used in either a storage or non-storage role.

Mobile applications, sometimes referred to as traction applications, are generally ones where a module-based energy system is located on or within an entity, and stores and provides electrical energy for conversion into motive force by a motor to move or assist in moving that entity. Examples of mobile entities with which the embodiments disclosed herein can be used include, but are not limited to, electric and/or hybrid entities that move over or under land, over or under sea, above and out of contact with land or sea (e.g., flying or hovering in the air), or through outer space. Examples of mobile entities with which the embodiments disclosed herein can be used include, but are not limited to, vehicles, trains, trams, ships, vessels, aircraft, and spacecraft. Examples of mobile vehicles with which the embodiments disclosed herein can be used include, but are not limited to, those having only one wheel or track, those having only two-wheels or tracks, those having only three wheels or tracks, those having only four wheels or tracks, and those having five or more wheels or tracks. Examples of mobile entities with which the embodiments disclosed herein can be used include, but are not limited to, a car, a bus, a truck, a motorcycle, a scooter, an industrial vehicle, a mining vehicle, a flying vehicle (e.g., a plane, a helicopter, a drone, etc.), a maritime vessel (e.g., commercial shipping vessels, ships, yachts, boats or other watercraft), a submarine, a locomotive or rail-based vehicle (e.g., a train, a tram, etc.), a military vehicle, a spacecraft, and a satellite.

In describing embodiments herein, reference may be made to a particular stationary application (e.g., grid, microgrid, data centers, cloud computing environments) or mobile application (e.g., an electric car). Such references are made for ease of explanation and do not mean that a particular embodiment is limited for use to only that particular mobile or stationary application. Embodiments of systems providing power to a motor can be used in both mobile and stationary applications. While certain configurations may be more suitable to some applications over others, all example embodiments disclosed herein are capable of use in both mobile and stationary applications unless otherwise noted.

Module-Based Energy System Examples

FIG. 1A is a block diagram depicts an example embodiment of a module-based energy system 100. Here, system 100 includes control system 102 communicatively coupled with N converter-source modules 108-1 through 108-N, over communication paths or links 106-1 through 106-N, respectively. Modules 108 are configured to store energy and output the energy as needed to a load 101 (or other modules 108). In these embodiments, any number of two or more modules 108 can be used (e.g., N is greater than or equal to two). Modules 108 can be connected to each other in a variety of manners as will be described in more detail with respect to FIGS. 7A-7E. For ease of illustration, in FIGS. 1A-1C, modules 108 are shown connected in series, or as a one dimensional array, where the Nth module is coupled to load 101.

System 100 is configured to supply power to load 101. Load 101 can be any type of load such as a motor or a grid. System 100 is also configured to store power received from a charge source. FIG. 1F is a block diagram depicting an example embodiment of system 100 with a power input interface 151 for receiving power from a charge source 150 and a power output interface for outputting power to load 101. In this embodiment system 100 can receive and store power over interface 151 at the same time as outputting power over interface 152. FIG. 1G is a block diagram depicting another example embodiment of system 100 with a switchable interface 154. In this embodiment, system 100 can select, or be instructed to select, between receiving power from charge source 150 and outputting power to load 101. System 100 can be configured to supply multiple loads 101, including both primary and auxiliary loads, and/or receive power from multiple charge sources 150 (e.g., a utility-operated power grid and a local renewable energy source (e.g., solar)).

Figure 1B:
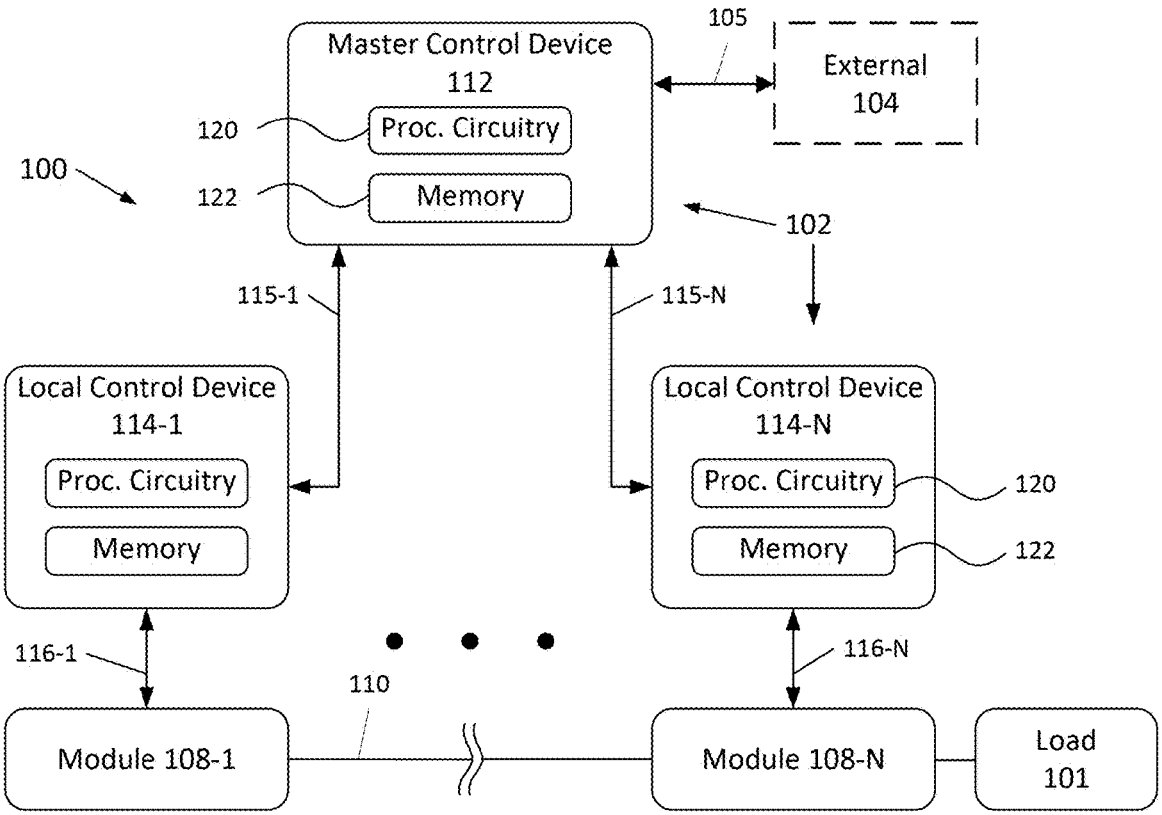
Figure 1F:
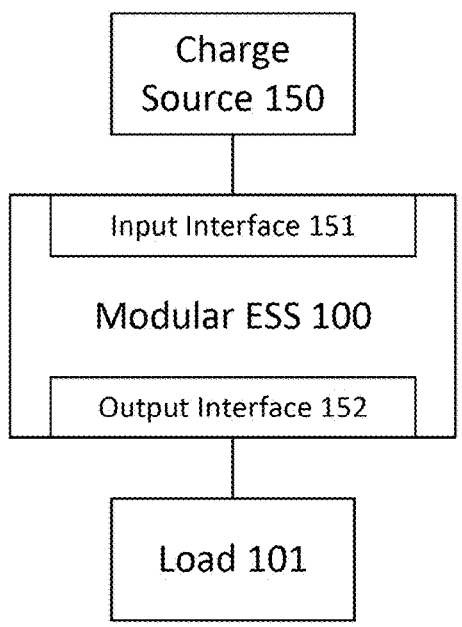
FIGS. 1F-1G are block diagrams depicting example embodiments of modular energy systems coupled with a load and a charge source.
Figure 1G:
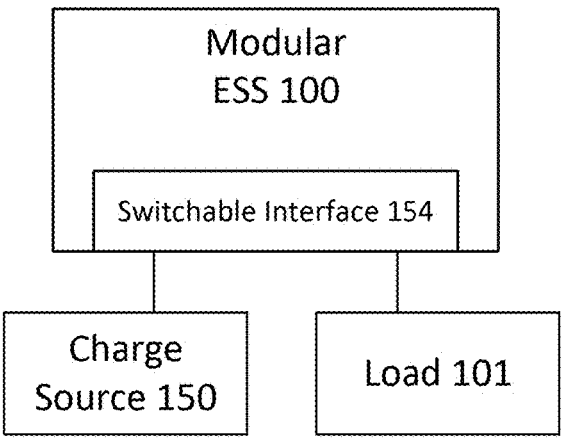

FIG. 1B depicts another example embodiment of system 100. Here, control system 102 is implemented as a master control device (MCD) 112 communicatively coupled with N different local control devices (LCDs) 114-1 through 114-N over communication paths or links 115-1 through 115-N, respectively. Each LCD 114-1 through 114-N is communicatively coupled with one module 108-1 through 108-N over communication paths or links 116-1 through 116-N, respectively, such that there is a 1:1 relationship between LCDs 114 and modules 108.

FIG. 1C depicts another example embodiment of system 100. Here, MCD 112 is communicatively coupled with M different LCDs 114-1 to 114-M over communication paths or links 115-1 to 115-M, respectively. Each LCD 114 can be coupled with and control two or more modules 108. In the example shown here, each LCD 114 is communicatively coupled with two modules 108, such that M LCDs 114-1 to 114-M are coupled with 2M modules 108-1 through 108-2M over communication paths or links 116-1 to 116-2M, respectively.

Control system 102 can be configured as a single device (e.g., FIG. 1A) for the entire system 100 or can be distributed across or implemented as multiple devices (e.g., FIGS. 1B-1C). In some embodiments, control system 102 can be distributed between LCDs 114 associated with the modules 108, such that no MCD 112 is necessary and can be omitted from system 100.

Control system 102 can be configured to execute control using software (instructions stored in memory that are executable by processing circuitry), hardware, or a combination thereof. The one or more devices of control system 102 can each include processing circuitry 120 and memory 122 as shown here. Example implementations of processing circuitry and memory are described further below.

Control system 102 can have a communicative interface for communicating with devices 104 external to system 100 over a communication link or path 105. For example, control system 102 (e.g., MCD 112) can output data or information about system 100 to another control device 104 (e.g., the Electronic Control Unit (ECU) or Motor Control Unit (MCU) of a vehicle in a mobile application, grid controller in a stationary application, etc.).

Communication paths or links 105, 106, 115, 116, and 118 (FIG. 2B) can each be wired (e.g., electrical, optical) or wireless communication paths that communicate data or information bidirectionally, in parallel or series fashion. Data can be communicated in a standardized (e.g., IEEE, ANSI) or custom (e.g., proprietary) format. In automotive applications, communication paths 115 can be configured to communicate according to FlexRay or CAN protocols. Communication paths 106, 115, 116, and 118 can also provide wired power to directly supply the operating power for system 102 from one or more modules 108. For example, the operating power for each LCD 114 can be supplied only by the one or more modules 108 to which that LCD 114 is connected and the operating power for MCD 112 can be supplied indirectly from one or more of modules 108 (e.g., such as through a car's power network).

Control system 102 is configured to control one or more modules 108 based on status information received from the same or different one or more of modules 108. Control can also be based on one or more other factors, such as requirements of load 101. Controllable aspects include, but are not limited to, one or more of voltage, current, phase, and/or output power of each module 108.

Status information of every module 108 in system 100 can be communicated to control system 102, which can independently control every module 108-1 . . . 108-N. Other variations are possible. For example, a particular module 108 (or subset of modules 108) can be controlled based on status information of that particular module 108 (or subset), based on status information of a different module 108 that is not that particular module 108 (or subset), based on status information of all modules 108 other than that particular module 108 (or subset), based on status information of that particular module 108 (or subset) and status information of at least one other module 108 that is not that particular module 108 (or subset), or based on status information of all modules 108 in system 100.

The status information can be information about one or more aspects, characteristics, or parameters of each module 108. Types of status information include, but are not limited to, the following aspects of a module 108 or one or more components thereof (e.g., energy source, energy buffer, converter, monitor circuitry): State of Charge (SOC) (e.g., the level of charge of an energy source relative to its capacity, such as a fraction or percent) of the one or more energy sources of the module, State of Health (SOH) (e.g., a figure of merit of the condition of an energy source compared to its ideal conditions) of the one or more energy sources of the module, temperature of the one or more energy sources or other components of the module, capacity of the one or more energy sources of the module, voltage of the one or more energy sources and/or other components of the module, current of the one or more energy sources and/or other components of the module, State of Power (SOP) (e.g., the available power limitation of the energy source during discharge and/or charge), State of Energy (SOE) (e.g., the present level of available energy of an energy source relative to the maximum available energy of the source), and/or the presence of absence of a fault in any one or more of the components of the module.

LCDs 114 can be configured to receive the status information from each module 108, or determine the status information from monitored signals or data received from or within each module 108, and communicate that information to MCD 112. In some embodiments, each LCD 114 can communicate raw collected data to MCD 112, which then algorithmically determines the status information on the basis of that raw data. MCD 112 can then use the status information of modules 108 to make control determinations accordingly. The determinations may take the form of instructions, commands, or other information (such as a modulation index described herein) that can be utilized by LCDs 114 to either maintain or adjust the operation of each module 108.

For example, MCD 112 may receive status information and assess that information to determine a difference between at least one module 108 (e.g., a component thereof) and at least one or more other modules 108 (e.g., comparable components thereof). For example, MCD 112 may determine that a particular module 108 is operating with one of the following conditions as compared to one or more other modules 108: with a relatively lower or higher SOC, with a relatively lower or higher SOH, with a relatively lower or higher capacity, with a relatively lower or higher voltage, with a relatively lower or higher current, with a relatively lower or higher temperature, or with or without a fault. In such examples, MCD 112 can output control information that causes the relevant aspect (e.g., output voltage, current, power, temperature) of that particular module 108 to be reduced or increased (depending on the condition). In this manner, the utilization of an outlier module 108 (e.g., operating with a relatively lower SOC or higher temperature), can be reduced so as to cause the relevant parameter of that module 108 (e.g., SOC or temperature) to converge towards that of one or more other modules 108.

The determination of whether to adjust the operation of a particular module 108 can be made by comparison of the status information to predetermined thresholds, limits, or conditions, and not necessarily by comparison to statuses of other modules 108. The predetermined thresholds, limits, or conditions can be static thresholds, limits, or conditions, such as those set by the manufacturer that do not change during use. The predetermined thresholds, limits, or conditions can be dynamic thresholds, limits, or conditions, that are permitted to change, or that do change, during use. For example, MCD 112 can adjust the operation of a module 108 if the status information for that module 108 indicates it to be operating in violation (e.g., above or below) of a predetermined threshold or limit, or outside of a predetermined range of acceptable operating conditions. Similarly, MCD 112 can adjust the operation of a module 108 if the status information for that module 108 indicates the presence of an actual or potential fault (e.g., an alarm, or warning) or indicates the absence or removal of an actual or potential fault. Examples of a fault include, but are not limited to, an actual failure of a component, a potential failure of a component, a short circuit or other excessive current condition, an open circuit, an excessive voltage condition, a failure to receive a communication, the receipt of corrupted data, and the like. Depending on the type and severity of the fault, the faulty module's utilization can be decreased to avoid damaging the module, or the module's utilization can be ceased altogether. For example, if a fault occurs in a given module, then MCD 112 or LCD 114 can cause that module to enter a bypass state as described herein.

MCD 112 can control modules 108 within system 100 to achieve or converge towards a desired target. The target can be, for example, operation of all modules 108 at the same or similar levels with respect to each other, or within predetermined thresholds limits, or conditions. This process is also referred to as balancing or seeking to achieve balance in the operation or operating characteristics of modules 108. The term "balance" as used herein does not require absolute equality between modules 108 or components thereof, but rather is used in a broad sense to convey that operation of system 100 can be used to actively reduce disparities in operation (or operative state) between modules 108 that would otherwise exist.

MCD 112 can communicate control information to LCD 114 for the purpose of controlling the modules 108 associated with the LCD 114. The control information can be, e.g., a modulation index and a reference signal as described herein, a modulated reference signal, or otherwise. Each LCD 114 can use (e.g., receive and process) the control information to generate switch signals that control operation of one or more components (e.g., a converter) within the associated module(s) 108. In some embodiments, MCD 112 generates the switch signals directly and outputs them to LCD 114, which relays the switch signals to the intended module component.

All or a portion of control system 102 can be combined with a system external control device 104 that controls one or more other aspects of the mobile or stationary application. When integrated in this shared or common control device (or subsystem), control of system 100 can be implemented in any desired fashion, such as one or more software applications executed by processing circuitry of the shared device, with hardware of the shared device, or a combination thereof. Non-exhaustive examples of external control devices 104 include: a vehicular ECU or MCU having control capability for one or more other vehicular functions (e.g., motor control, driver interface control, traction control, etc.); a grid or micro-grid controller having responsibility for one or more other power management functions (e.g., load interfacing, load power requirement forecasting, transmission and switching, interface with charge sources (e.g., diesel, solar, wind), charge source power forecasting, back up source monitoring, asset dispatch, etc.); and a data center control subsystem (e.g., environmental control, network control, backup control, etc.).

FIGS. 1D and 1E are block diagrams depicting example embodiments of a shared or common control device (or system) 132 in which control system 102 can be implemented. In FIG. 1D, common control device 132 includes master control device 112 and external control device 104. Master control device 112 includes an interface 141 for communication with LCDs 114 over path 115, as well as an interface 142 for communication with external control device 104 over internal communication bus 136. External control device 104 includes an interface 143 for communication with master control device 112 over bus 136, and an interface 144 for communication with other entities (e.g., components of the vehicle or grid) of the overall application over communication path 136. In some embodiments, common control device 132 can be integrated as a common housing or package with devices 112 and 104 implemented as discrete integrated circuit (IC) chips or packages contained therein.

In FIG. 1E, external control device 104 acts as common control device 132, with the master control functionality implemented as a component within device 104. This component 112 can be or include software or other program instructions stored and/or hardcoded within memory of device 104 and executed by processing circuitry thereof. The component can also contain dedicated hardware. The component can be a self-contained module or core, with one or more internal hardware and/or software interfaces (e.g., application program interface (API)) for communication with the operating software of external control device 104. External control device 104 can manage communication with LCDs 114 over interface 141 and other devices over interface 144. In various embodiments, device 104/132 can be integrated as a single IC chip, can be integrated into multiple IC chips in a single package, or integrated as multiple semiconductor packages within a common housing.

In the embodiments of FIGS. 1D and 1E, the master control functionality of system 102 is shared in common device 132, however, other divisions of shared control or permitted. For example, part of the master control functionality can be distributed between common device 132 and a dedicated MCD 112. In another example, both the master control functionality and at least part of the local control functionality can be implemented in common device 132 (e.g., with remaining local control functionality implemented in LCDs 114). In some embodiments, all of control system 102 is implemented in common device (or subsystem) 132. In some embodiments, local control functionality is implemented within a device shared with another component of each module 108, such as a Battery Management System (BMS).

Examples of Modules within Cascaded Energy Systems

Figure 2A:
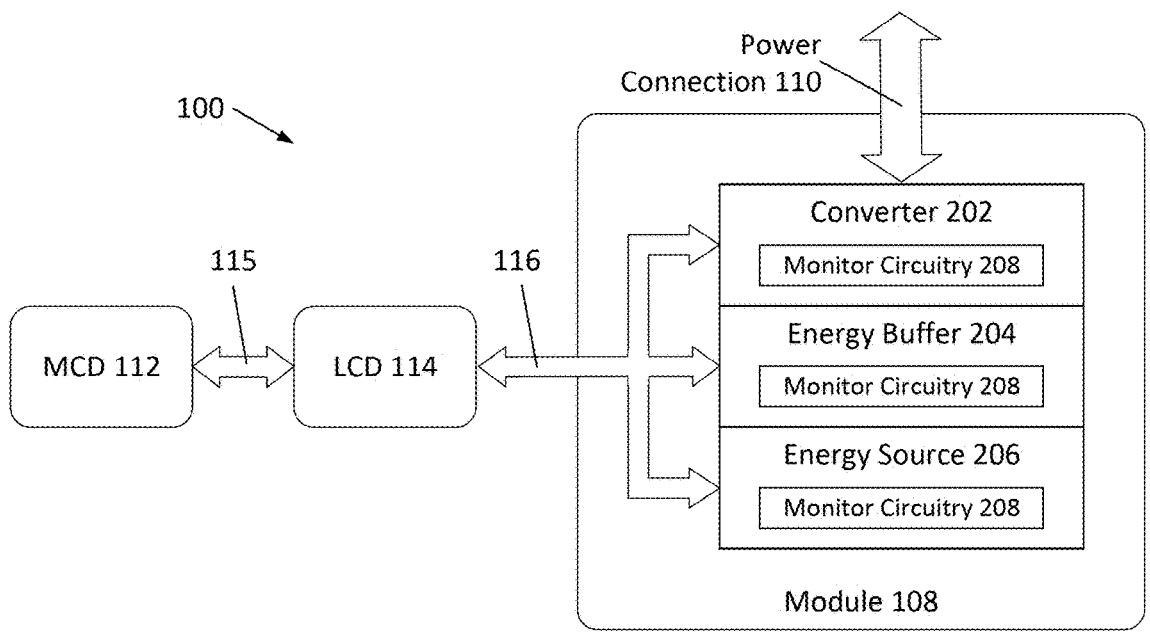
FIGS. 2A-2B are block diagrams depicting example embodiments of a module and control system within an energy system.
Figure 2B:
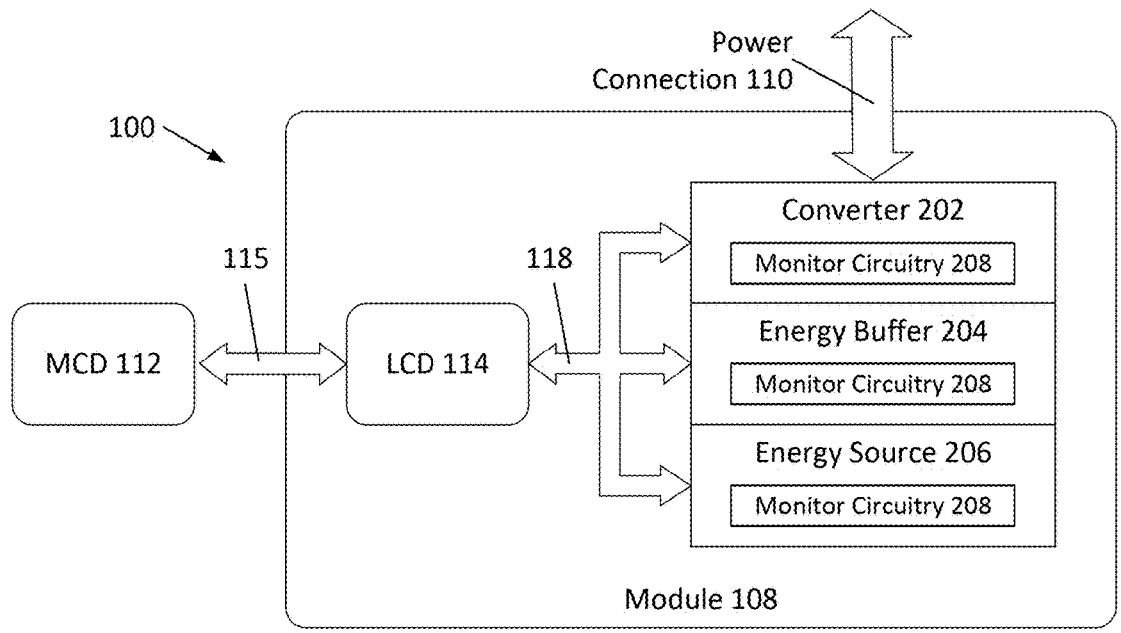

Module 108 can include one or more energy sources and a power electronics converter and, if desired, an energy buffer. FIGS. 2A-2B are block diagrams depicting additional example embodiments of system 100 with module 108 having a power converter 202, an energy buffer 204, and an energy source 206. Converter 202 can be a voltage converter or a current converter. The embodiments are described herein with reference to voltage converters, although the embodiments are not limited to such. Converter 202 can be configured to convert a direct current (DC) signal from energy source 206 into an alternating current (AC) signal and output it over power connection 110 (e.g., an inverter). Converter 202 can also receive an AC or DC signal over connection 110 and apply it to energy source 206 with either polarity in a continuous or pulsed form. Converter 202 can be or include an arrangement of switches (e.g., power transistors) such as a half bridge of full bridge (H-bridge). In some embodiments converter 202 includes only switches and the converter (and the module as a whole) does not include a transformer.

Converter 202 can be also (or alternatively) be configured to perform AC to DC conversion (e.g., a rectifier) such as to charge a DC energy source from an AC source, DC to DC conversion, and/or AC to AC conversion (e.g., in combination with an AC-DC converter). In some embodiments, such as to perform AC-AC conversion, converter 202 can include a transformer, either alone or in combination with one or more power semiconductors (e.g., switches, diodes, thyristors, and the like). In other embodiments, such as those where weight and cost is a significant factor, converter 202 can be configured to perform the conversions with only power switches, power diodes, or other semiconductor devices and without a transformer.

Energy source 206 is preferably a robust energy storage device capable of outputting direct current and having an energy density suitable for energy storage applications for electrically powered devices. Energy source 206 can be an electrochemical battery, such as a single battery cell or multiple battery cells connected together in a battery module or array, or any combination thereof. FIGS. 4A-4D are schematic diagrams depicting example embodiments of energy source 206 configured as a single battery cell 402 (FIG. 4A), a battery module with a series connection of multiple (e.g., four) cells 402 (FIG. 4B), a battery module with a parallel connection of single cells 402 (FIG. 4C), and a battery module with a parallel connection with legs having two cells 402 each (FIG. 4D). A non-exhaustive list of examples of battery types is set forth elsewhere herein.

Energy source 206 can also be a high energy density (HED) capacitor, such as an ultracapacitor or supercapacitor. An HED capacitor can be configured as a double layer capacitor (electrostatic charge storage), pseudocapacitor (electrochemical charge storage), hybrid capacitor (electrostatic and electrochemical), or otherwise, as opposed to a solid dielectric type of a typical electrolytic capacitor. The HED capacitor can have an energy density of 10 to 100 times (or higher) that of an electrolytic capacitor, in addition to a higher capacity. For example, HED capacitors can have a specific energy greater than 1.0 watt hours per kilogram (Wh/kg), and a capacitance greater than 10-100 farads (F). As with the batteries described with respect to FIGS. 4A-4D, energy source 206 can be configured as a single HED capacitor or multiple HED capacitors connected together in an array (e.g., series, parallel, or a combination thereof).

Figure 11A:
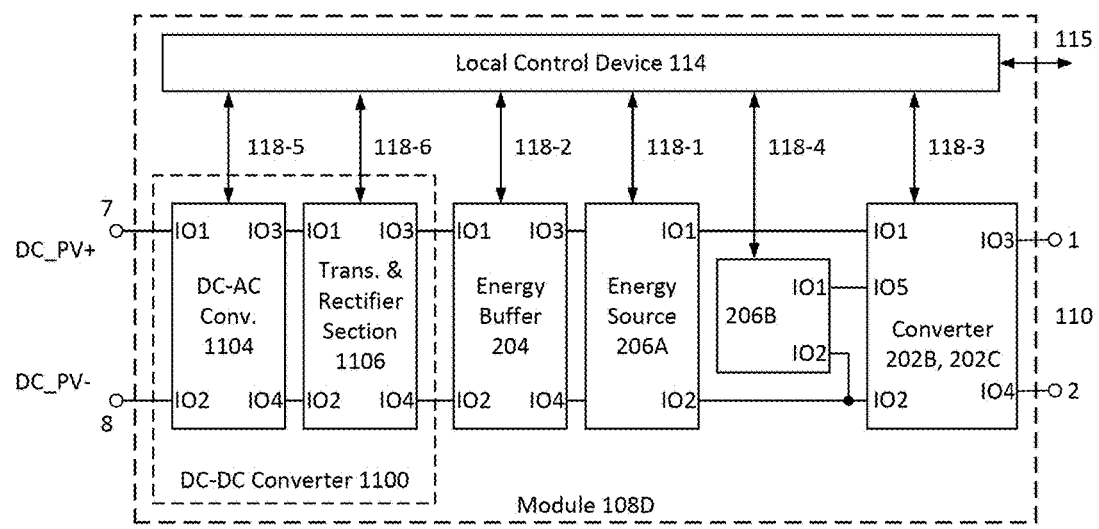
FIGS. 11A-11B are block diagrams depicting example embodiments of converter modules.
Figure 11B:
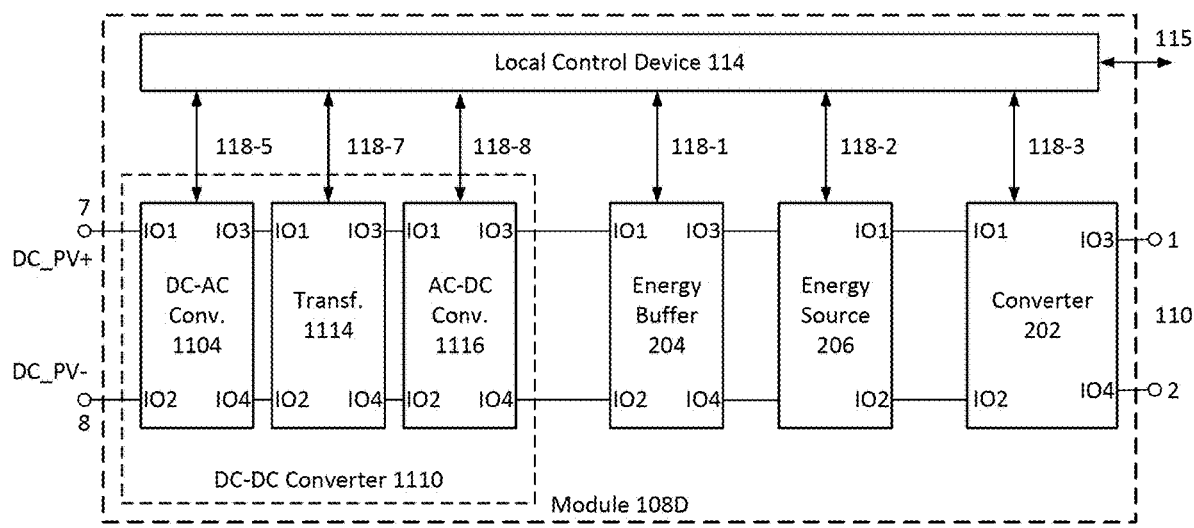
Figure 11C:
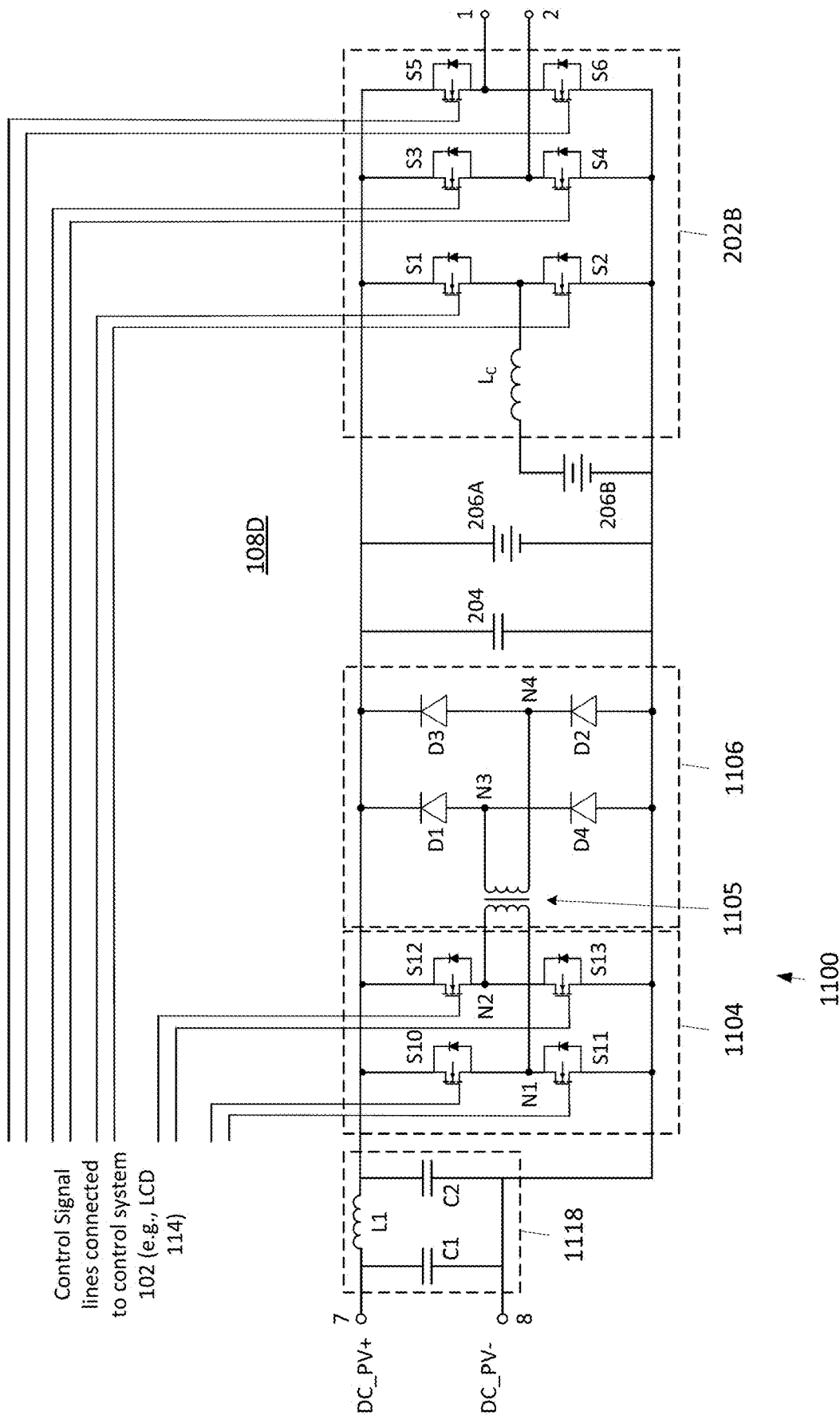
FIGS. 11C-11E are schematic diagrams depicting example embodiments of converter modules.
Figure 11D:
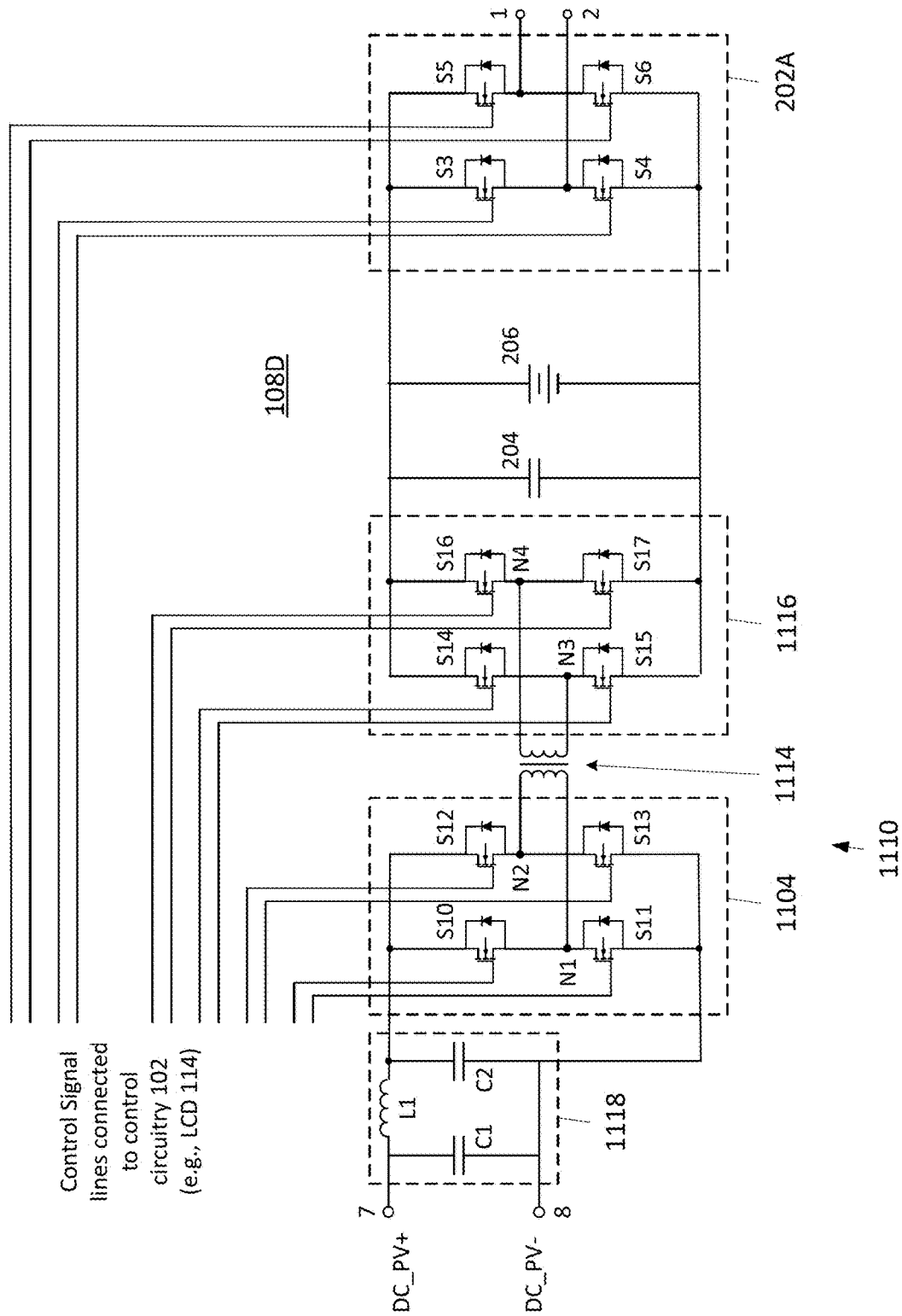
Figure 11E:
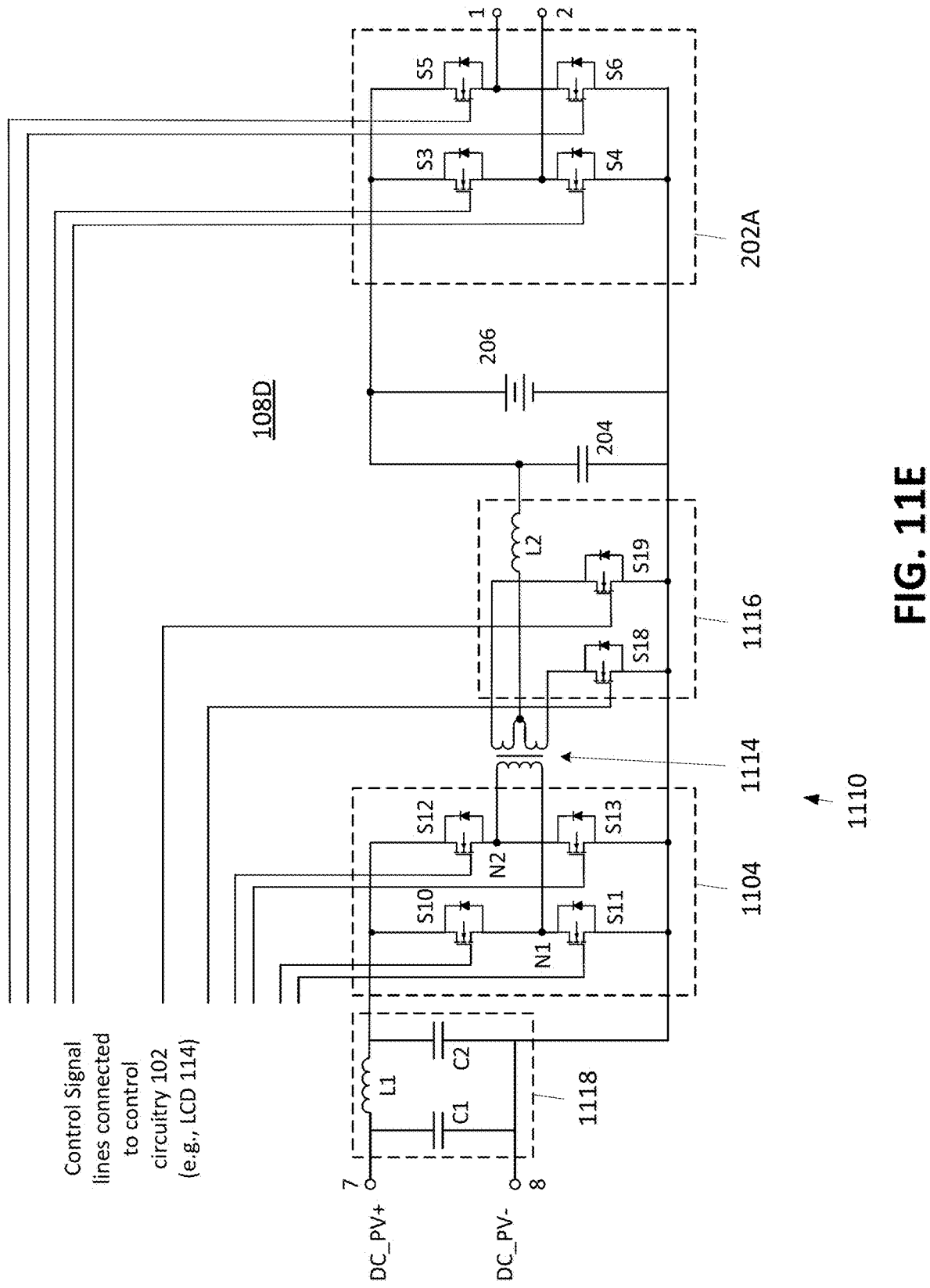
Figure 11F:
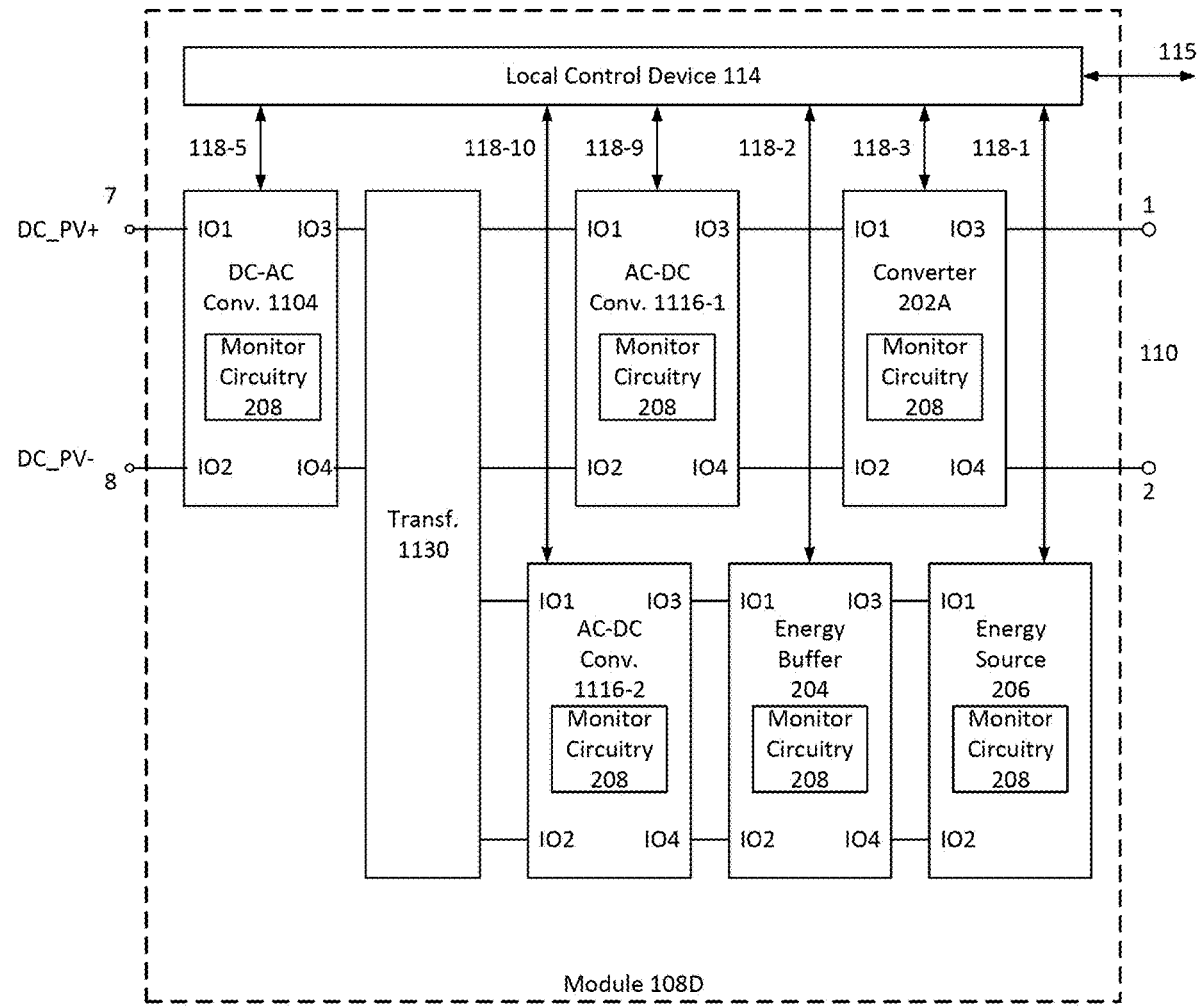
FIG. 11F is a block diagram depicting an example embodiment of a converter module.
Figure 11G:
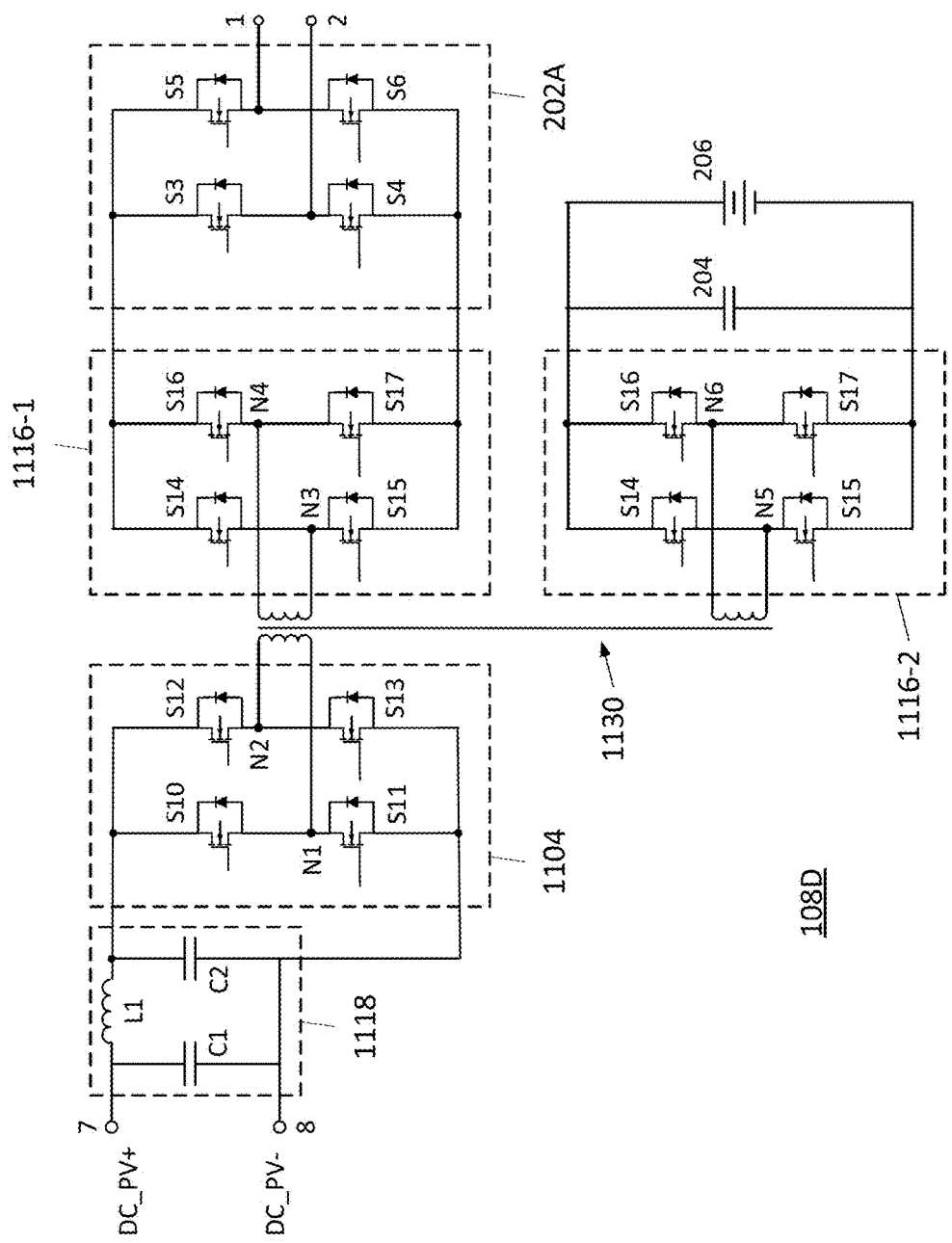
FIG. 11G is a schematic diagram depicting an example embodiment of a converter module.
Figure 11H:
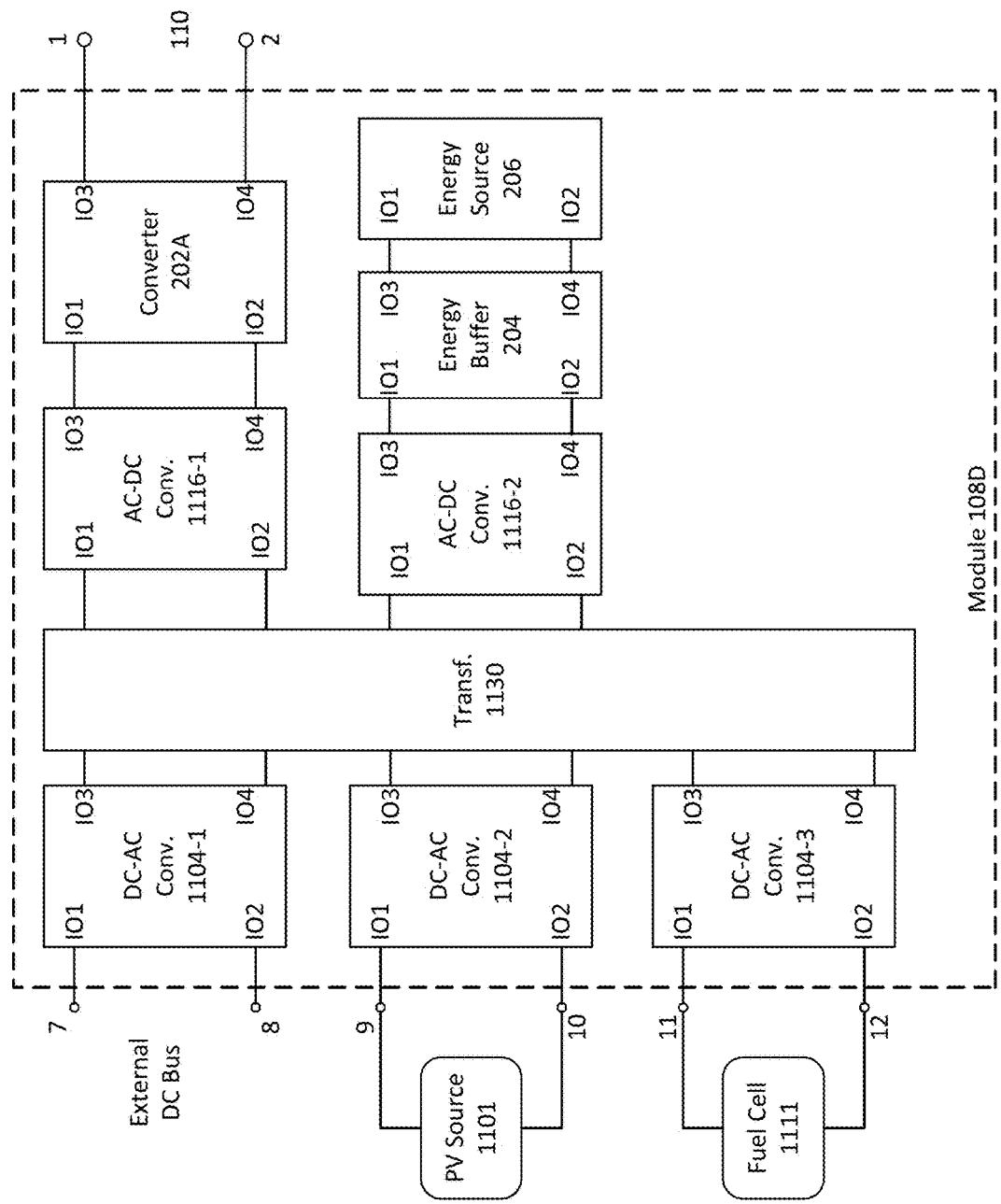
FIG. 11H is a block diagram depicting an example embodiment of a converter module.

Energy source 206 can also be a fuel cell 1111 (FIG. 11H). Fuel cell 1111 can be a single fuel cell, multiple fuel cells connected in series or parallel, or a fuel cell module.

Examples of fuel cell types include proton-exchange membrane fuel cells (PEMFC), phosphoric acid fuel cells (PAFC), solid acid fuel cells, alkaline fuel cells, high temperature fuel cells, solid oxide fuel cells, molten electrolyte fuel cells, and others. As with the batteries described with respect to FIGS. 4A-4D, energy source 206 can be configured as a single fuel cell or multiple fuel cells connected together in an array (e.g., series, parallel, or a combination thereof). The aforementioned examples of source classes (e.g., batteries, capacitors, and fuel cells) and types (e.g., chemistries and/or structural configurations within each class) are not intended to form an exhaustive list, and those of ordinary skill in the art will recognize other variants that fall within the scope of the present subject matter. The fuel cell need not be located within the physical housing of the module 108.

Energy buffer 204 can dampen or filter fluctuations in current across the DC line or link (e.g., $+V_{DCL}$ and $-V_{DCL}$ as described below), to assist in maintaining stability in the DC link voltage. These fluctuations can be relatively low (e.g., kilohertz) or high (e.g., megahertz) frequency fluctuations or harmonics caused by the switching of converter 202, or other transients. These fluctuations can be absorbed by buffer 204 instead of being passed to source 206 or to ports IO3 and IO4 of converter 202.

Power connection 110 is a connection for transferring energy or power to, from and through module 108. Module 108 can output energy from energy source 206 to power connection 110, where it can be transferred to other modules of the system or to a load. Module 108 can also receive energy from other modules 108 or a charging source (DC charger, single phase charger, multi-phase charger). Signals can also be passed through module 108 bypassing energy source 206. The routing of energy or power into and out of module 108 is performed by converter 202 under the control of LCD 114 (or another entity of system 102).

In the embodiment of FIG. 2A, LCD 114 is implemented as a component separate from module 108 (e.g., not within a shared module housing) and is connected to and capable of communication with converter 202 via communication path 116. In the embodiment of FIG. 2B, LCD 114 is included as a component of module 108 and is connected to and capable of communication with converter 202 via internal communication path 118 (e.g., a shared bus or discrete connections). LCD 114 can also be capable of receiving signals from, and transmitting signals to, energy buffer 204 and/or energy source 206 over paths 116 or 118.

Module 108 can also include monitor circuitry 208 configured to monitor (e.g., collect, sense, measure, and/or determine) one or more aspects of module 108 and/or the components thereof, such as voltage, current, temperature or other operating parameters that constitute status information (or can be used to determine status information by, e.g., LCD 114). A main function of the status information is to describe the state of the one or more energy sources 206 of the module 108 to enable determinations as to how much to utilize the energy source in comparison to other sources in system 100, although status information describing the state of other components (e.g., voltage, temperature, and/or presence of a fault in buffer 204, temperature and/or presence of a fault in converter 202, presence of a fault elsewhere in module 108, etc.) can be used in the utilization determination as well. Monitor circuitry 208 can include one or more sensors, shunts, dividers, fault detectors, Coulomb counters, controllers or other hardware and/or software configured to monitor such aspects. Monitor circuitry 208 can be separate from the various components 202, 204, and 206, or can be integrated with each component 202, 204, and 206 (as shown in FIGS. 2A-2B), or any combination thereof. In some embodiments, monitor circuitry 208 can be part of or shared with a Battery Management System (BMS) for a battery energy source 206. Discrete circuitry is not needed to monitor each type of status information, as more than one type of status information can be monitored with a single circuit or device, or otherwise algorithmically determined without the need for additional circuits.

LCD 114 can receive status information (or raw data) about the module components over communication paths 116, 118. LCD 114 can also transmit information to module components over paths 116, 118. Paths 116 and 118 can include diagnostics, measurement, protection, and control signal lines. The transmitted information can be control signals for one or more module components. The control signals can be switch signals for converter 202 and/or one or more signals that request the status information from module components. For example, LCD 114 can cause the status information to be transmitted over paths 116, 118 by requesting the status information directly, or by applying a stimulus (e.g., voltage) to cause the status information to be generated, in some cases in combination with switch signals that place converter 202 in a particular state.

Figure 2C:
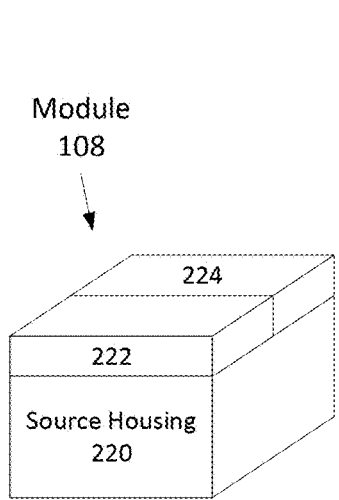
FIG. 2C is a block diagram depicting an example embodiment of a physical configuration of a module.

The physical configuration or layout of module 108 can take various forms. In some embodiments, module 108 can include a common housing in which all module components, e.g., converter 202, buffer 204, and source 206, are housed, along with other optional components such as an integrated LCD 114. In other embodiments, the various components can be separated in discrete housings that are secured together. FIG. 2C is a block diagram depicting an example embodiment of a module 108 having a first housing 220 that holds an energy source 206 of the module and accompanying electronics such as monitor circuitry, a second housing 222 that holds module electronics such as converter 202, energy buffer 204, and other accompany electronics such as monitor circuitry, and a third housing 224 that holds LCD 114 (not shown) for the module 108. In alternative embodiments the module electronics and LCD 114 can be housed within the same single housing. In still other embodiments, the module electronics, LCD 114, and energy source(s) can be housed within the same single housing for the module 108. Electrical connections between the various module components can proceed through the housings 220, 222, 224 and can be exposed on any of the housing exteriors for connection with other devices such as other modules 108 or MCD 112.

Figure 2D:
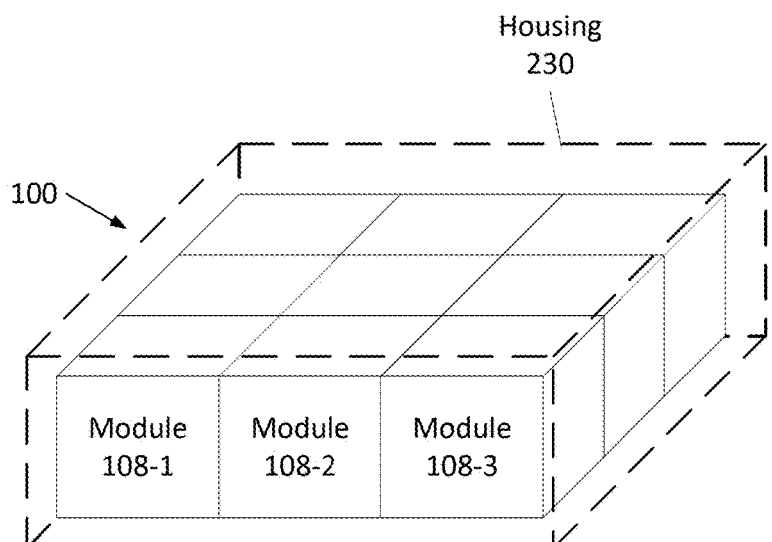
FIG. 2D is a block diagram depicting an example embodiment of a physical configuration of a modular energy system.

Modules 108 of system 100 can be physically arranged with respect to each other in various configurations that depend on the needs of the application and the number of loads. For example, in a stationary application where system 100 provides power for a microgrid, modules 108 can be placed in one or more racks or other frameworks. Such configurations may be suitable for larger mobile applications as well, such as maritime vessels. Alternatively, modules 108 can be secured together and located within a common housing, referred to as a pack. A rack or a pack may have its own dedicated cooling system shared across all modules. Pack configurations are useful for smaller mobile applications such as electric cars. System 100 can be implemented with one or more racks (e.g., for parallel supply to a microgrid) or one or more packs (e.g., serving different motors of the vehicle), or combination thereof. FIG. 2D is a block diagram depicting an example embodiment of system 100 configured as a pack with nine modules 108 electrically and physically coupled together within a common housing 230.

Examples of these and further configurations are described in Int'l. Appl. No. PCT/US20/25366, filed Mar. 27, 2020 and titled Module-Based Energy Systems Capable of Cascaded and Interconnected Configurations, and Methods Related Thereto, which is incorporated by reference herein in its entirety for all purposes.

Figure 3A:
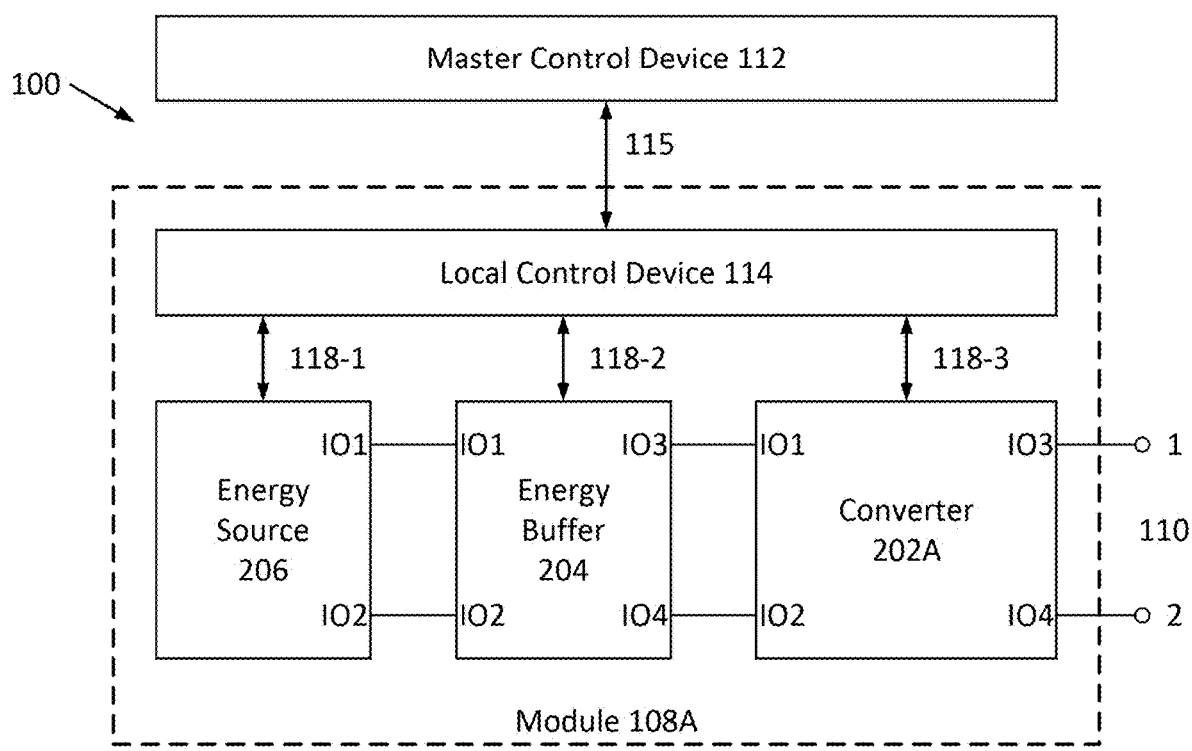
FIGS. 3A-3C are block diagrams depicting example embodiments of modules having various electrical configurations.
Figure 3B:
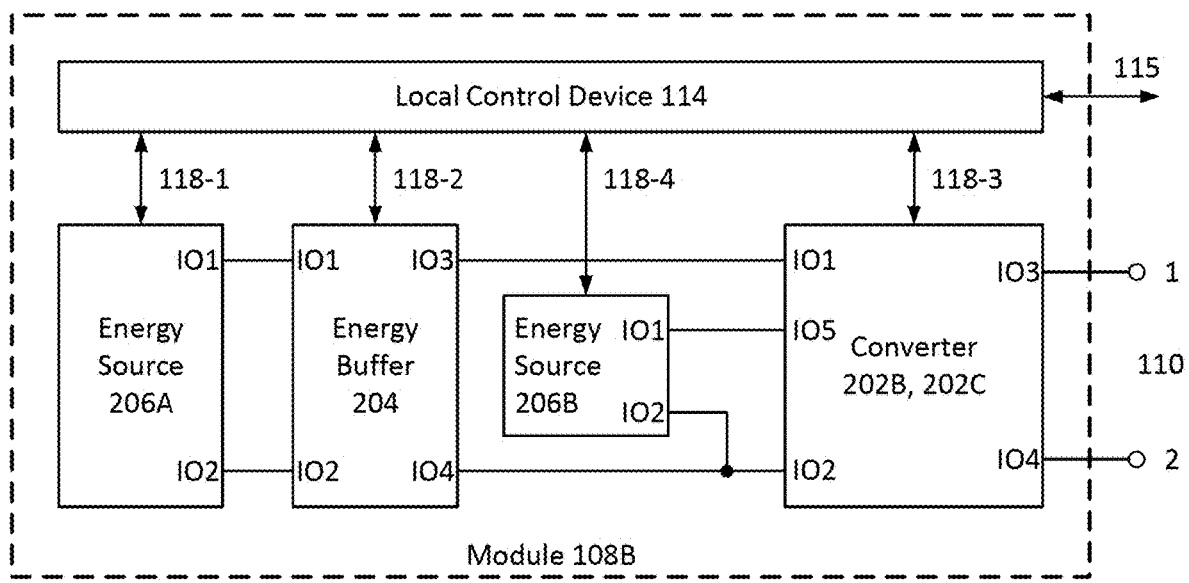
Figure 3C:
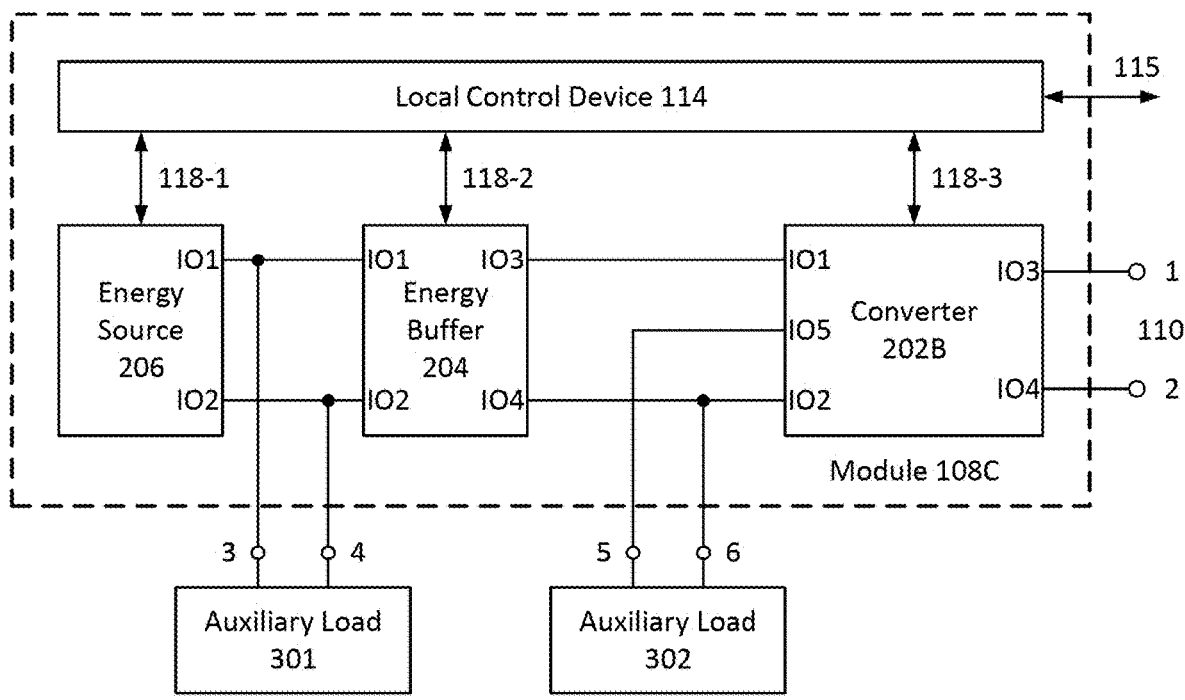

FIGS. 3A-3C are block diagrams depicting example embodiments of modules 108 having various electrical configurations. These embodiments are described as having one LCD 114 per module 108, with the LCD 114 housed within the associated module, but can be configured otherwise as described herein. FIG. 3A depicts a first example configuration of a module 108A within system 100. Module 108A includes energy source 206, energy buffer 204, and converter 202A. Each component has power connection ports (e.g., terminals, connectors) into which power can be input and/or from which power can be output, referred to herein as IO ports. Such ports can also be referred to as input ports or output ports depending on the context.

Energy source 206 can be configured as any of the energy source types described herein (e.g., a battery as described with respect to FIGS. 4A-4D, an HED capacitor, fuel cell 1111, or otherwise). Ports IO1 and IO2 of energy source 206 can be connected to ports IO1 and IO2, respectively, of energy buffer 204. Energy buffer 204 can be configured to buffer or filter high and low frequency energy pulsations arriving at buffer 204 through converter 202, which can otherwise degrade the performance of module 108. The topology and components for buffer 204 are selected to accommodate the maximum permissible amplitude of these high frequency voltage pulsations. Several (non-exhaustive) example embodiments of energy buffer 204 are depicted in the schematic diagrams of FIGS. 5A-5C. In FIG. 5A, buffer 204 is an electrolytic and/or film capacitor $C_{EB}$, in FIG. 5B buffer 204 is a Z-source network 710, formed by two inductors $L_{EB1}$ and $L_{EB2}$ and two electrolytic and/or film capacitors $C_{EB1}$ and $C_{EB2}$, and in FIG. 5C buffer 204 is a quasi Z-source network 720, formed by two inductors $L_{EB1}$ and $L_{EB2}$, two electrolytic and/or film capacitors $C_{EB1}$ and $C_{EB2}$ and a diode $D_{EB}$.

Figure 6A:
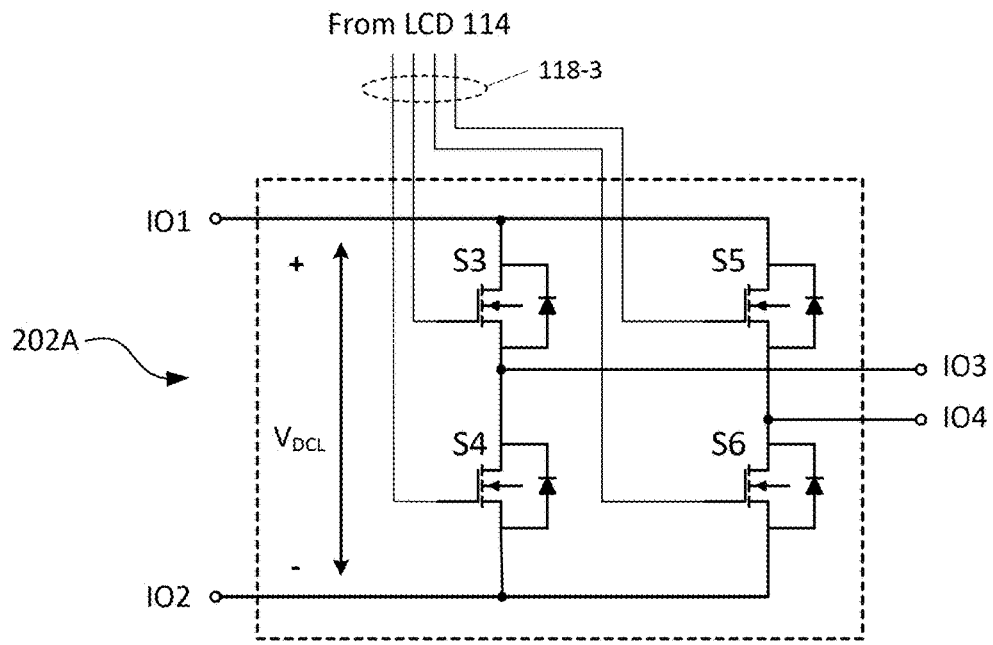
FIGS. 6A-6C are schematic views depicting example embodiments of converters.

Ports IO3 and IO4 of energy buffer 204 can be connected to ports IO1 and IO2, respectively, of converter 202A, which can be configured as any of the power converter types described herein. FIG. 6A is a schematic diagram depicting an example embodiment of converter 202A configured as a DC-AC converter that can receive a DC voltage at ports IO1 and IO2 and switch to generate pulses at ports IO3 and IO4. Converter 202A can include multiple switches, and here converter 202A includes four switches S3, S4, S5, S6 arranged in a full bridge configuration. Control system 102 or LCD 114 can independently control each switch via control input lines 118-3 to each gate.

The switches can be any suitable switch type, such as power semiconductors like the metal-oxide-semiconductor field-effect transistors (MOSFETs) shown here, insulated gate bipolar transistors (IGBTs), or gallium nitride (GaN) transistors. Semiconductor switches can operate at relatively high switching frequencies, thereby permitting converter 202 to be operated in pulse-width modulated (PWM) mode if desired, and to respond to control commands within a relatively short interval of time. This can provide a high tolerance of output voltage regulation and fast dynamic behavior in transient modes.

In this embodiment, a DC line voltage $V_{DCL}$ can be applied to converter 202 between ports IO1 and IO2. By connecting $V_{DCL}$ to ports IO3 and IO4 by different combinations of switches S3, S4, S5, S6, converter 202 can generate three different voltage outputs at ports IO3 and IO4: $+V_{DCL}$, 0, and $-V_{DCL}$. A switch signal provided to each switch controls whether the switch is on (closed) or off (open). To obtain $+V_{DCL}$, switches S3 and S6 are turned on while S4 and S5 are turned off, whereas $-V_{DCL}$ can be obtained by turning on switches S4 and S5 and turning off S3 and S6. The output voltage can be set to zero (including near zero) or a reference voltage by turning on S3 and S5 with S4 and S6 off, or by turning on S4 and S6 with S3 and S5 off. These voltages can be output from module 108 over power connection 110. Ports IO3 and IO4 of converter 202 can be connected to (or form) module IO ports 1 and 2 of power connection 110, so as to generate the output voltage for use with output voltages from other modules 108.

Figure 8A:
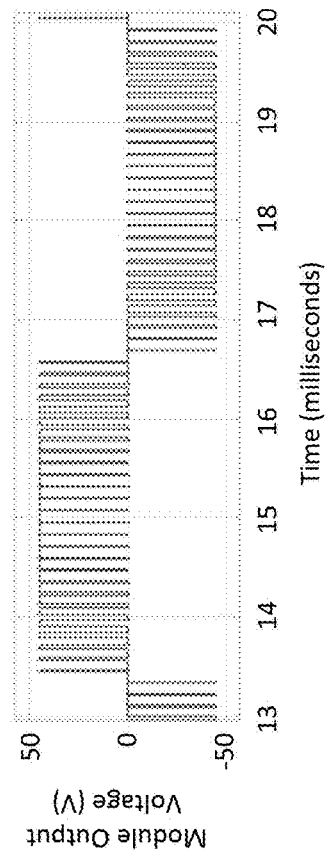
FIG. 8A is a plot depicting an example output voltage of a module.

The control or switch signals for the embodiments of converter 202 described herein can be generated in different ways depending on the control technique utilized by system 100 to generate the output voltage of converter 202. In some embodiments, the control technique is a PWM technique such as space vector pulse-width modulation (SVPWM) or sinusoidal pulse-width modulation (SPWM), or variations thereof. FIG. 8A is a graph of voltage versus time depicting an example of an output voltage waveform 802 of converter 202. For ease of description, the embodiments herein will be described in the context of a PWM control technique, although the embodiments are not limited to such. Other classes of techniques can be used. One alternative class is based on hysteresis, examples of which are described in Int'l Publ. Nos. WO 2018/231810A1, WO 2018/232403A1, and WO 2019/183553A1, which are incorporated by reference herein for all purposes.

Each module 108 can be configured with multiple energy sources 206 (e.g., two, three, four, or more). Each energy source 206 of module 108 can be controllable (switchable) to supply power to connection 110 (or receive power from a charge source) independent of the other sources 206 of the module. For example, all sources 206 can output power to connection 110 (or be charged) at the same time, or only one (or a subset) of sources 206 can supply power (or be charged) at any one time. In some embodiments, the sources 206 of the module can exchange or transfer energy between them, e.g., one source 206 can charge another source 206. Each of the sources 206 can be configured as any energy source described herein (e.g., battery, HED capacitor, fuel cell 1111). Each of the sources 206 can be the same class (e.g., each can be a battery, each can be an HED capacitor, or each can be fuel cell 1111), or a different class (e.g., a first source can be a battery and a second source can be an HED capacitor or fuel cell 1111, or a first source can be an HED capacitor and a second source can be fuel cell 1111).

FIG. 3B is a block diagram depicting an example embodiment of a module 108B in a dual energy source configuration with a primary energy source 206A and secondary energy source 206B. Ports IO1 and IO2 of primary source 202A can be connected to ports IO1 and IO2 of energy buffer 204. Module 108B includes a converter 202B having an additional IO port. Ports IO3 and IO4 of buffer 204 can be connected ports IO1 and IO2, respectively, of converter 202B. Ports IO1 and IO2 of secondary source 206B can be connected to ports IO5 and IO2, respectively, of converter 202B (also connected to port IO4 of buffer 204).

In this example embodiment of module 108B, primary energy source 202A, along with the other modules 108 of system 100, supplies the average power needed by the load. Secondary source 202B can serve the function of assisting energy source 202 by providing additional power at load power peaks, or absorbing excess power, or otherwise.

As mentioned both primary source 206A and secondary source 206B can be utilized simultaneously or at separate times depending on the switch state of converter 202B. If at the same time, an electrolytic and/or a film capacitor ($C_{ES}$) can be placed in parallel with source 206B as depicted in FIG. 4E to act as an energy buffer for the source 206B, or energy source 206B can be configured to utilize an HED capacitor in parallel with another energy source (e.g., a battery or fuel cell 1111) as depicted in FIG. 4F.

Figure 6B:
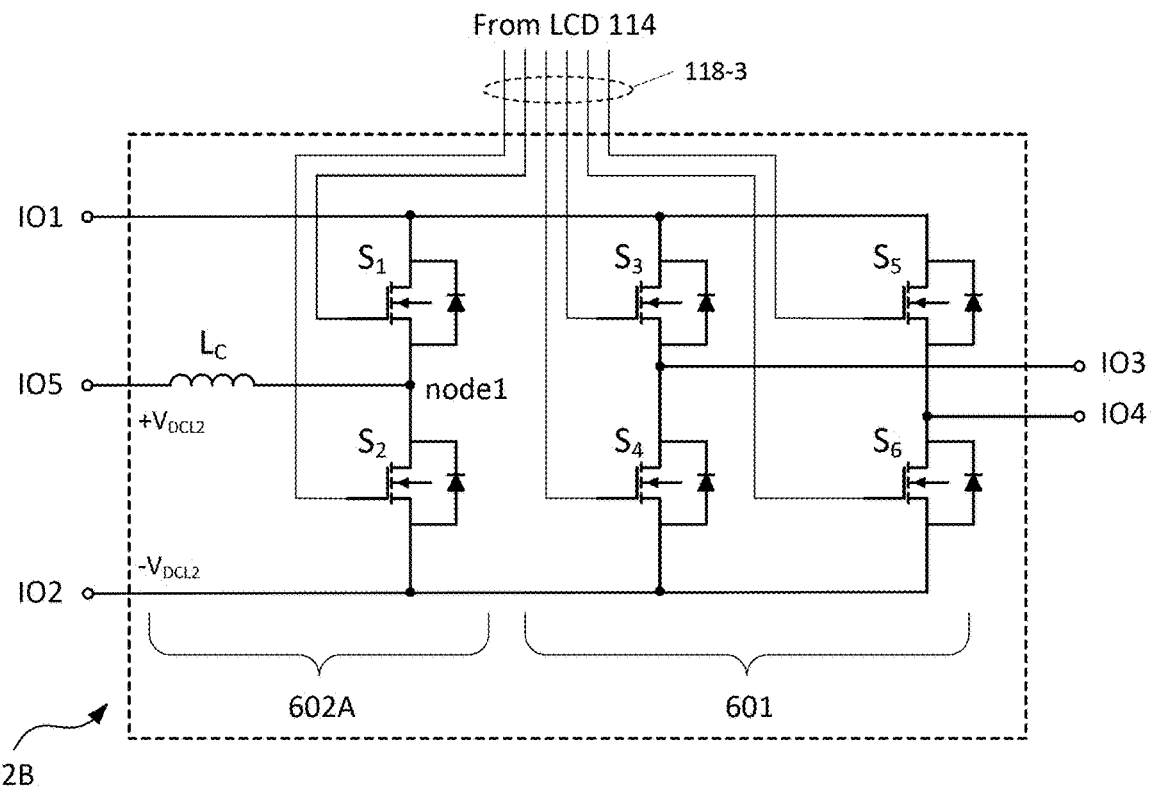
Figure 6C:
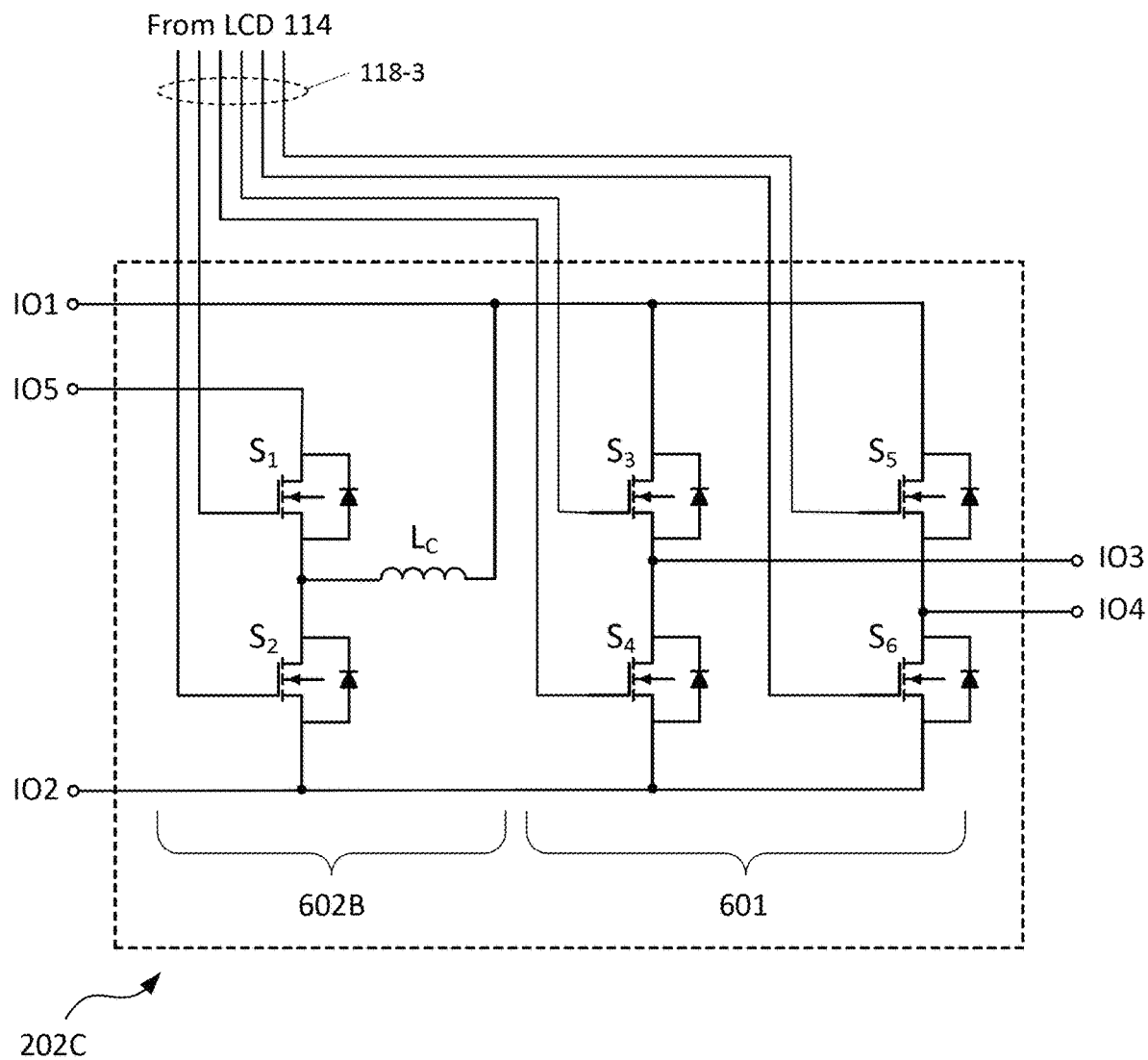

FIGS. 6B and 6C are schematic views depicting example embodiments of converters 202B and 202C, respectively. Converter 202B includes switch circuitry portions 601 and 602A. Portion 601 includes switches S3 through S6 configured as a full bridge in similar manner to converter 202A, and is configured to selectively couple IO1 and IO2 to either of IO3 and IO4, thereby changing the output voltages of module 108B. Portion 602A includes switches S1 and S2 configured as a half bridge and coupled between ports IO1 and IO2. A coupling inductor $L_C$ is connected between port IO5 and a node1 present between switches S1 and S2 such that switch portion 602A is a bidirectional converter that can regulate (boost or buck) voltage (or inversely current). Switch portion 602A can generate two different voltages at node1, which are +$V_{DCL2}$ and 0, referenced to port IO2, which can be at virtual zero potential. The current drawn from or input to energy source 202B can be controlled by regulating the voltage on coupling inductor $L_C$, using, for example, a pulse-width modulation technique or a hysteresis control method for commutating switches S1 and S2. Other techniques can also be used.

Converter 202C differs from that of 202B as switch portion 602B includes switches S1 and S2 configured as a half bridge and coupled between ports IO5 and IO2. A coupling inductor $L_C$ is connected between port IO1 and a node1 present between switches S1 and S2 such that switch portion 602B is configured to regulate voltage.

Control system 102 or LCD 114 can independently control each switch of converters 202B and 202C via control input lines 118-3 to each gate. In these embodiments and that of FIG. 6A, LCD 114 (not MCD 112) generates the switching signals for the converter switches. Alternatively, MCD 112 can generate the switching signals, which can be communicated directly to the switches, or relayed by LCD 114. In some embodiments, driver circuitry for generating the switching signals can be present in or associated with MCD 112 and/or LCD 114.

The aforementioned zero voltage configuration for converter 202 (turning on S3 and S5 with S4 and S6 off, or turning on S4 and S6 with S3 and S5 off) can also be referred to as a bypass state for the given module. This bypass state can be entered if a fault is detected in the given module, or if a system fault is detected warranting shut-off of more than one (or all modules) in an array or system. A fault in the module can be detected by LCD 114 and the control switching signals for converter 202 can be set to engage the bypass state without intervention by MCD 112. Alternatively, fault information for a given module can be communicated by LCD 114 to MCD 112, and MCD 112 can then make a determination whether to engage the bypass state, and if so, can communicate instructions to engage the bypass state to the LCD 114 associated with the module having the fault, at which point LCD 114 can output switching signals to cause engagement of the bypass state.

In embodiments where a module 108 includes three or more energy sources 206, converters 202B and 202C can be scaled accordingly such that each additional energy source 206B is coupled to an additional IO port leading to an additional switch circuitry portion 602A or 602B, depending on the needs of the particular source. For example a dual source converter 202 can include both switch portions 202A and 202B.

Modules 108 with multiple energy sources 206 are capable of performing additional functions such as energy sharing between sources 206, energy capture from within the application (e.g., regenerative braking), charging of the primary source by the secondary source even while the overall system is in a state of discharge, and active filtering of the module output. The active filtering function can also be performed by modules having a typical electrolytic capacitor instead of a secondary energy source. Examples of these functions are described in more detail in Int'l. Appl. No. PCT/US20/25366, filed Mar. 27, 2020 and titled Module-Based Energy Systems Capable of Cascaded and Interconnected Configurations, and Methods Related Thereto, and Int'l. Publ. No. WO 2019/183553, filed Mar. 22, 2019, and titled Systems and Methods for Power Management and Control, both of which are incorporated by reference herein in their entireties for all purposes.

Each module 108 can be configured to supply one or more auxiliary loads with its one or more energy sources 206. Auxiliary loads are loads that require lower voltages than the primary load 101. Examples of auxiliary loads can be, for example, an on-board electrical network of an electric vehicle, or an HVAC system of an electric vehicle. The load of system 100 can be, for example, one of the phases of the electric vehicle motor or electrical grid. This embodiment can allow a complete decoupling between the electrical characteristics (terminal voltage and current) of the energy source and those of the loads.

FIG. 3C is a block diagram depicting an example embodiment of a module 108C configured to supply power to a first auxiliary load 301 and a second auxiliary load 302, where module 108C includes an energy source 206, energy buffer 204, and converter 202B coupled together in a manner similar to that of FIG. 3B. First auxiliary load 301 requires a voltage equivalent to that supplied from source 206. Load 301 is coupled to IO ports 3 and 4 of module 108C, which are in turn coupled to ports IO1 and IO2 of source 206. Source 206 can output power to both power connection 110 and load 301. Second auxiliary load 302 requires a constant voltage lower than that of source 206. Load 302 is coupled to IO ports 5 and 6 of module 108C, which are coupled to ports IO5 and IO2, respectively, of converter 202B. Converter 202B can include switch portion 602 having coupling inductor $L_C$ coupled to port IO5 (FIG. 6B). Energy supplied by source 206 can be supplied to load 302 through switch portion 602 of converter 202B. It is assumed that load 302 has an input capacitor (a capacitor can be added to module 108C if not), so switches S1 and S2 can be commutated to regulate the voltage on and current through coupling inductor $L_C$ and thus produce a stable constant voltage for load 302. This regulation can step down the voltage of source 206 to the lower magnitude voltage is required by load 302.

Module 108C can thus be configured to supply one or more first auxiliary loads in the manner described with respect to load 301, with the one or more first loads coupled to IO ports 3 and 4. Module 108C can also be configured to supply one or more second auxiliary loads in the manner described with respect to load 302. If multiple second auxiliary loads 302 are present, then for each additional load 302 module 108C can be scaled with additional dedicated module output ports (like 5 and 6), an additional dedicated switch portion 602, and an additional converter IO port coupled to the additional portion 602.

Energy source 206 can thus supply power for any number of auxiliary loads (e.g., 301 and 302), as well as the corresponding portion of system output power needed by primary load 101. Power flow from source 206 to the various loads can be adjusted as desired.

Module 108 can be configured as needed with two or more energy sources 206 (FIG. 3B) and to supply first and/or second auxiliary loads (FIG. 3C) through the addition of a switch portion 602 and converter port IO5 for each additional source 206B or second auxiliary load 302. Additional module IO ports (e.g., 3, 4, 5, 6) can be added as needed. Module 108 can also be configured as an interconnection module to exchange energy (e.g., for balancing) between two or more arrays, two or more packs, or two or more systems 100 as described further herein. This interconnection functionality can likewise be combined with multiple source and/or multiple auxiliary load supply capabilities.

Control system 102 can perform various functions with respect to the components of modules 108A, 108B, and 108C. These functions can include management of the utilization (amount of use) of each energy source 206, protection of energy buffer 204 from over-current, over-voltage and high temperature conditions, and control and protection of converter 202.

For example, to manage (e.g., adjust by increasing, decreasing, or maintaining) utilization of each energy source 206, LCD 114 can receive one or more monitored voltages, temperatures, and currents from each energy source 206 (or monitor circuitry). The monitored voltages can be at least one of, preferably all, voltages of each elementary component independent of the other components (e.g., each individual battery cell, HED capacitor, and/or fuel cell 1111) of the source 206, or the voltages of groups of elementary components as a whole (e.g., voltage of the battery array, HED capacitor array, and/or fuel cell array). Similarly the monitored temperatures and currents can be at least one of, preferably all, temperatures and currents of each elementary component independent of the other components of the source 206, or the temperatures and currents of groups of elementary components as a whole, or any combination thereof. The monitored signals can be status information, with which LCD 114 can perform one or more of the following: calculation or determination of a real capacity, actual State of Charge (SOC) and/or State of Health (SOH) of the elementary components or groups of elementary components; set or output a warning or alarm indication based on monitored and/or calculated status information; and/or transmission of the status information to MCD 112. LCD 114 can receive control information (e.g., a modulation index, synchronization signal) from MCD 112 and use this control information to generate switch signals for converter 202 that manage the utilization of the source 206.

To protect energy buffer 204, LCD 114 can receive one or more monitored voltages, temperatures, and currents from energy buffer 204 (or monitor circuitry). The monitored voltages can be at least one of, preferably all, voltages of each elementary component of buffer 204 (e.g., of $C_{EB}$, $C_{EB1}$, $C_{EB2}$, $L_{EB1}$, $L_{EB2}$, $D_{EB}$) independent of the other components, or the voltages of groups of elementary components or buffer 204 as a whole (e.g., between IO1 and IO2 or between IO3 and IO4). Similarly the monitored temperatures and currents can be at least one of, preferably all, temperatures and currents of each elementary component of buffer 204 independent of the other components, or the temperatures and currents of groups of elementary components or of buffer 204 as a whole, or any combination thereof. The monitored signals can be status information, with which LCD 114 can perform one or more of the following: set or output a warning or alarm indication; communicate the status information to MCD 112; or control converter 202 to adjust (increase or decrease) the utilization of source 206 and module 108 as a whole for buffer protection.

To control and protect converter 202, LCD 114 can receive the control information from MCD 112 (e.g., a modulated reference signal, or a reference signal and a modulation index), which can be used with a PWM technique in LCD 114 to generate the control signals for each switch (e.g., S1 through S6). LCD 114 can receive a current feedback signal from a current sensor of converter 202, which can be used for overcurrent protection together with one or more fault status signals from driver circuits (not shown) of the converter switches, which can carry information about fault statuses (e.g., short circuit or open circuit failure modes) of all switches of converter 202. Based on this data, LCD 114 can make a decision on which combination of switching signals to be applied to manage utilization of module 108, and potentially bypass or disconnect converter 202 (and the entire module 108) from system 100.

If controlling a module 108C that supplies a second auxiliary load 302, LCD 114 can receive one or more monitored voltages (e.g., the voltage between IO ports 5 and 6) and one or more monitored currents (e.g., the current in coupling inductor $L_C$, which is a current of load 302) in module 108C. Based on these signals, LCD 114 can adjust the switching cycles (e.g., by adjustment of modulation index or reference waveform) of S1 and S2 to control (and stabilize) the voltage for load 302.

Cascaded Energy System Topology Examples

Figure 7C:
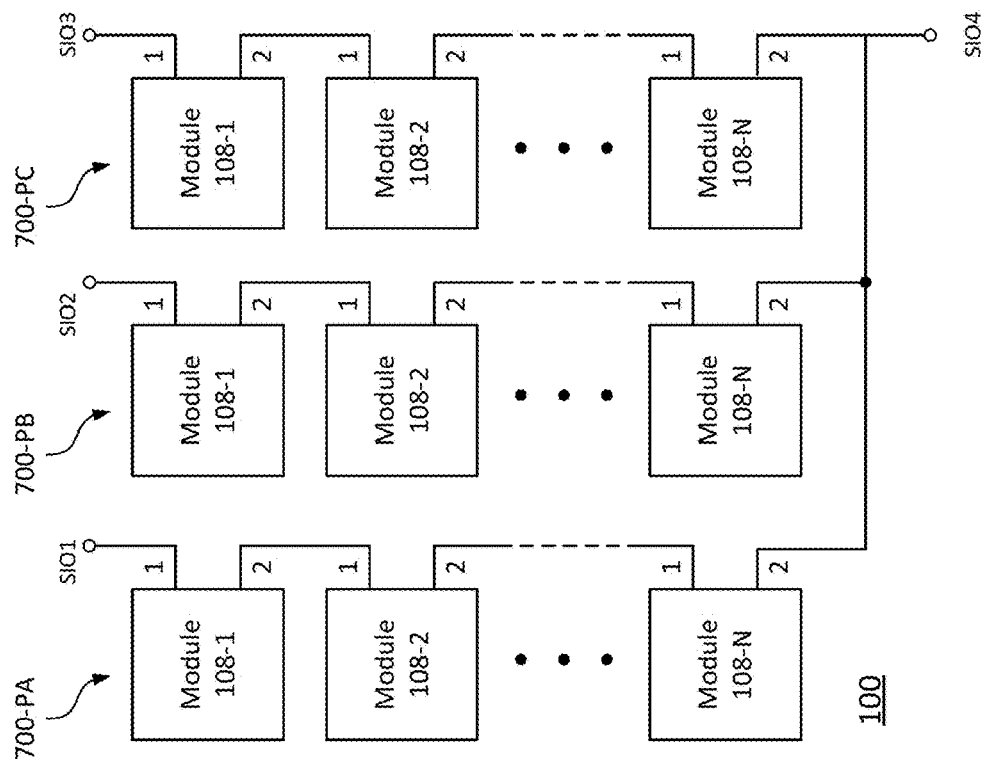
FIGS. 7A-7E are block diagrams depicting example embodiments of modular energy systems having various topologies.
Figure 7A:
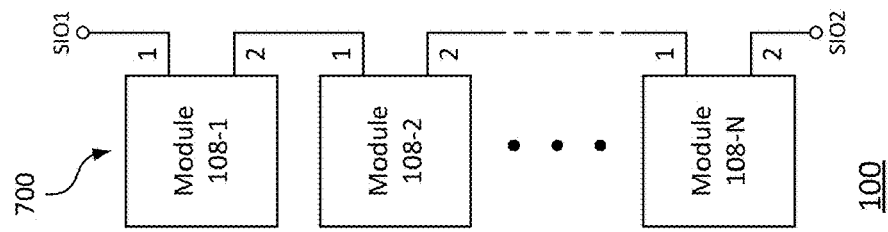
Figure 8B:
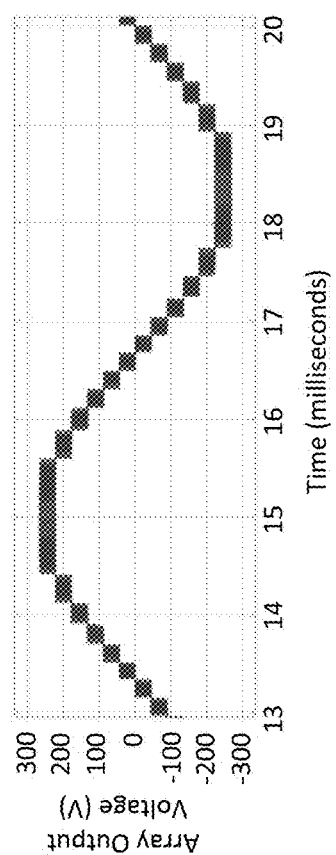
FIG. 8B is a plot depicting an example multilevel output voltage of an array of modules.

Two or more modules 108 can be coupled together in a cascaded array that outputs a voltage signal formed by a superposition of the discrete voltages generated by each module 108 within the array. FIG. 7A is a block diagram depicting an example embodiment of a topology for system 100 where N modules 108-1, 108-2 ... 108-N are coupled together in series to form a serial array 700. In this and all embodiments described herein, N can be any integer greater than one. Array 700 includes a first system IO port SIO1 and a second system IO port SIO2 across which is generated an array output voltage. Array 700 can be used as a DC or single phase AC energy source for DC or AC single-phase loads, which can be connected to SIO1 and SIO2 of array 700. FIG. 8A is a plot of voltage versus time depicting an example output signal produced by a single module 108 having a 48 volt energy source. FIG. 8B is a plot of voltage versus time depicting an example single phase AC output signal generated by array 700 having six 48V modules 108 coupled in series.

System 100 can be arranged in a broad variety of different topologies to meet varying needs of the applications. System 100 can provide multi-phase power (e.g., two-phase, three-phase, four-phase, five-phase, six-phase, etc.) to a load by use of multiple arrays 700, where each array can generate an AC output signal having a different phase angle.

Figure 7B:
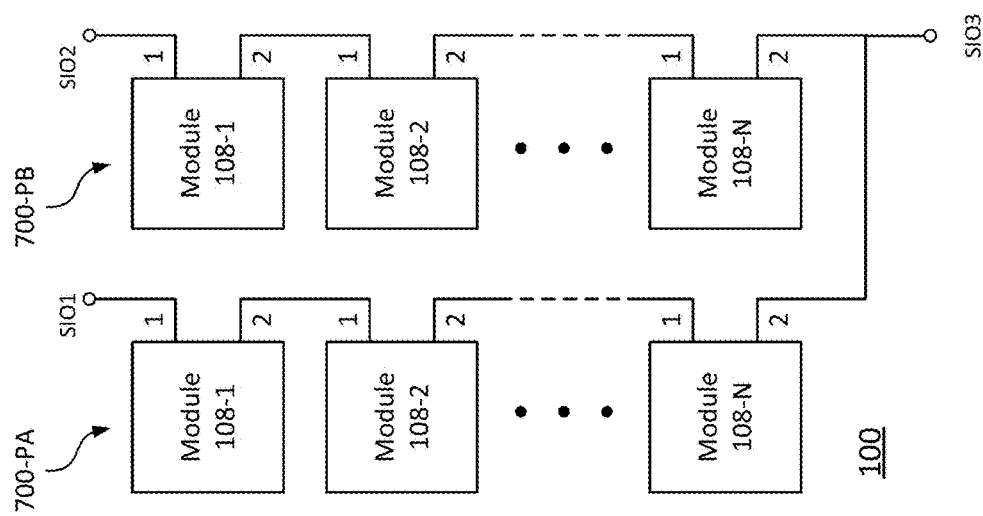

FIG. 7B is a block diagram depicting system 100 with two arrays 700-PA and 700-PB coupled together. Each array 700 is one-dimensional, formed by a series connection of N modules 108. The two arrays 700-PA and 700-PB can each generate a single-phase AC signal, where the two AC signals have different phase angles PA and PB (e.g., 180 degrees apart). IO port 1 of module 108-1 of each array 700-PA and 700-PB can form or be connected to system IO ports SIO1 and SIO2, respectively, which in turn can serve as a first output of each array that can provide two phase power to a load (not shown). Or alternatively ports SIO1 and SIO2 can be connected to provide single phase power from two parallel arrays. IO port 2 of module 108-N of each array 700-PA and 700-PB can serve as a second output for each array 700-PA and 700-PB on the opposite end of the array from system IO ports SIO1 and SIO2, and can be coupled together at a common node and optionally used for an additional system IO port SIO3 if desired, which can serve as a neutral. This common node can be referred to as a rail, and IO port 2 of modules 108-N of each array 700 can be referred to as being on the rail side of the arrays.

FIG. 7C is a block diagram depicting system 100 with three arrays 700-PA, 700-PB, and 700-PC coupled together. Each array 700 is one-dimensional, formed by a series connection of N modules 108. The three arrays 700-1 and 700-2 can each generate a single-phase AC signal, where the three AC signals have different phase angles PA, PB, PC (e.g., 120 degrees apart). IO port 1 of module 108-1 of each array 700-PA, 700-PB, and 700-PC can form or be connected to system 10 ports SIO1, SIO2, and SIO3, respectively, which in turn can provide three phase power to a load (not shown). IO port 2 of module 108-N of each array 700-PA, 700-PB, and 700-PC can be coupled together at a common node and optionally used for an additional system IO port SIO4 if desired, which can serve as a neutral.

The concepts described with respect to the two-phase and three-phase embodiments of FIGS. 7B and 7C can be extended to systems 100 generating still more phases of power. For example, a non-exhaustive list of additional examples includes: system 100 having four arrays 700, each of which is configured to generate a single phase AC signal having a different phase angle (e.g., 90 degrees apart); system 100 having five arrays 700, each of which is configured to generate a single phase AC signal having a different phase angle (e.g., 72 degrees apart); and system 100 having six arrays 700, each array configured to generate a single phase AC signal having a different phase angle (e.g., 60 degrees apart).

System 100 can be configured such that arrays 700 are interconnected at electrical nodes between modules 108 within each array. FIG. 7D is a block diagram depicting system 100 with three arrays 700-PA, 700-PB, and 700-PC coupled together in a combined series and delta arrangement. Each array 700 includes a first series connection of M modules 108, where M is two or greater, coupled with a second series connection of N modules 108, where N is two or greater. The delta configuration is formed by the interconnections between arrays, which can be placed in any desired location. In this embodiment, IO port 2 of module 108-(M+N) of array 700-PC is coupled with IO port 2 of module 108-M and IO port 1 of module 108-(M+1) of array 700-PA, IO port 2 of module 108-(M+N) of array 700-PB is coupled with IO port 2 of module 108-M and IO port 1 of module 108-(M+1) of array 700-PC, and IO port 2 of module 108-(M+N) of array 700-PA is coupled with IO port 2 of module 108-M and IO port 1 of module 108-(M+1) of array 700-PB.

Figure 7E:
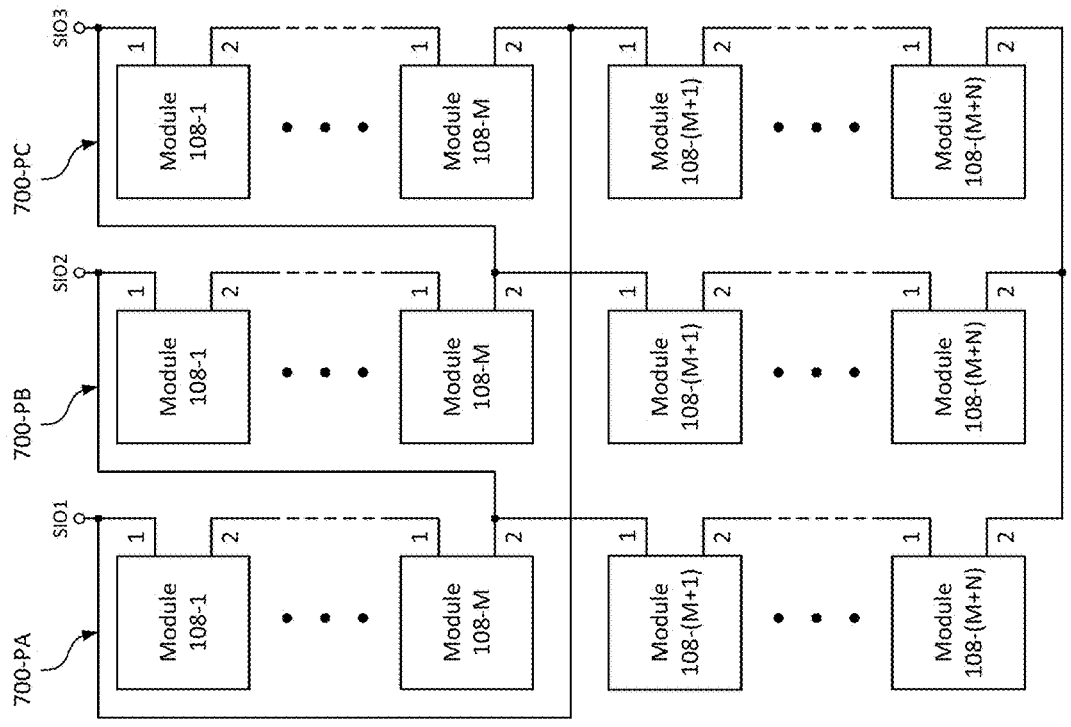
Figure 7D:
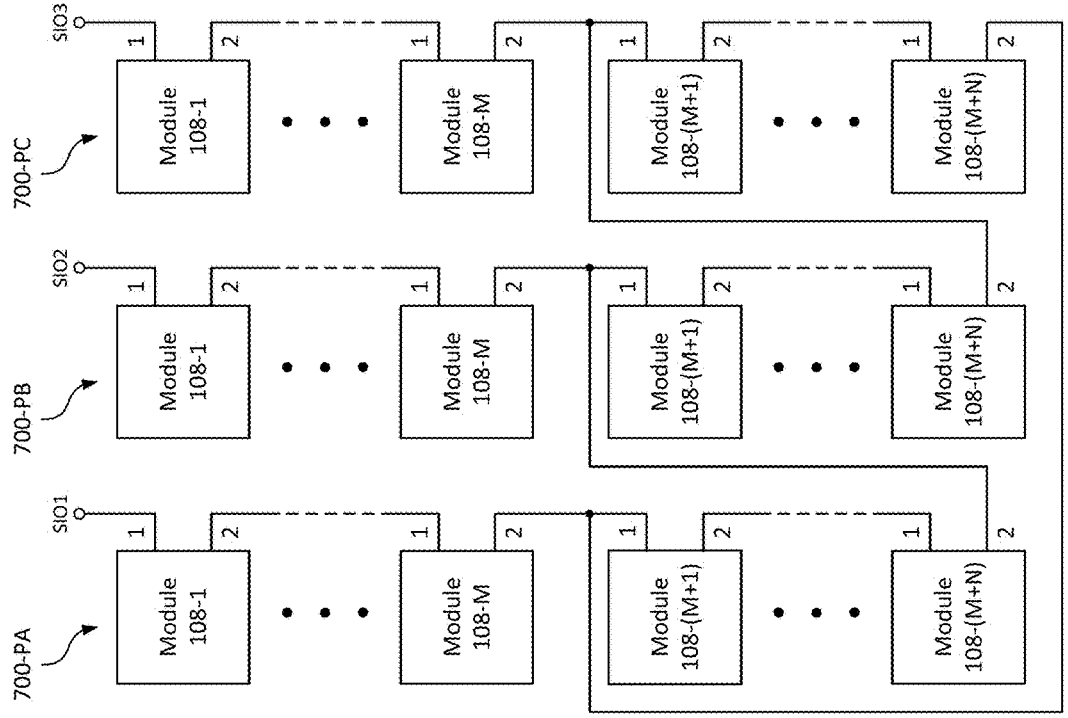

FIG. 7E is a block diagram depicting system 100 with three arrays 700-PA, 700-PB, and 700-PC coupled together in a combined series and delta arrangement. This embodiment is similar to that of FIG. 7D except with different cross connections. In this embodiment, IO port 2 of module 108-M of array 700-PC is coupled with IO port 1 of module 108-1 of array 700-PA, IO port 2 of module 108-M of array 700-PB is coupled with IO port 1 of module 108-1 of array 700-PC, and IO port 2 of module 108-M of array 700-PA is coupled with IO port 1 of module 108-1 of array 700-PB. The arrangements of FIGS. 7D and 7E can be implemented with as little as two modules in each array 700. Combined delta and series configurations enable an effective exchange of energy between all modules 108 of the system (interphase balancing) and phases of power grid or load, and also allows reducing the total number of modules 108 in an array 700 to obtain the desired output voltages.

In the embodiments described herein, although it is advantageous for the number of modules 108 to be the same in each array 700 within system 100, such is not required and different arrays 700 can have differing numbers of modules 108. Further, each array 700 can have modules 108 that are all of the same configuration (e.g., all modules are 108A, all modules are 108B, all modules are 108C, or others) or different configurations (e.g., one or more modules are 108A, one or more are 108B, and one or more are 108C, or otherwise). As such, the scope of topologies of system 100 covered herein is broad.

Control Methodology Examples

As mentioned, control of system 100 can be performed according to various methodologies, such as hysteresis or PWM. Several examples of PWM include space vector modulation and sine pulse width modulation, where the switching signals for converter 202 are generated with a phase shifted carrier technique that continuously rotates utilization of each module 108 to equally distribute power among them.

Figure 8C:
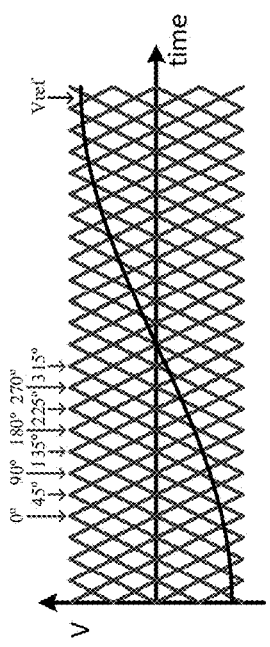
FIG. 8C is a plot depicting an example reference signal and carrier signals usable in a pulse width modulation control technique.
Figure 8D:
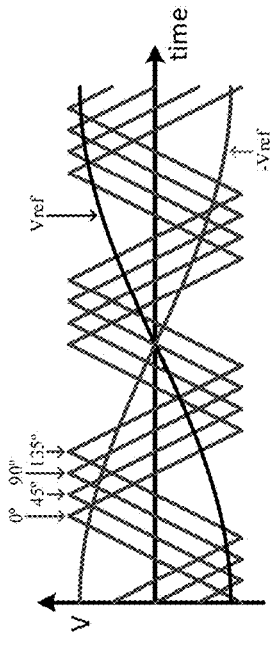
FIG. 8D is a plot depicting example reference signals and carrier signals usable in a pulse width modulation control technique.
Figure 8E:
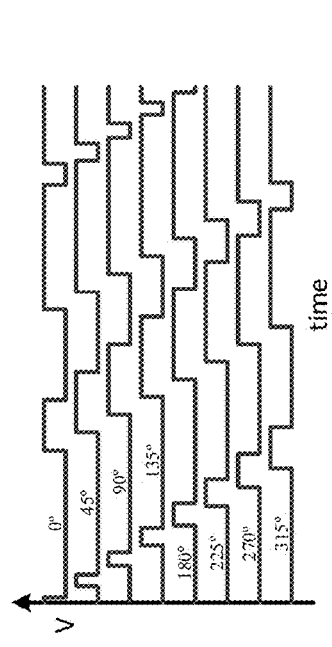
FIG. 8E is a plot depicting example switch signals generated according to a pulse width modulation control technique.
Figure 8F:
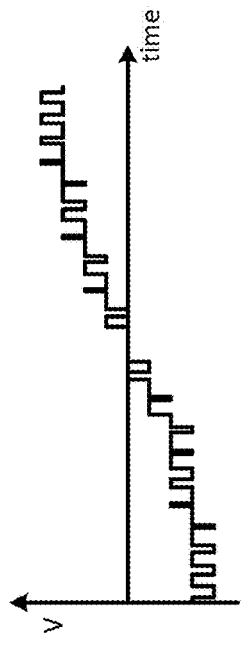
FIG. 8F as a plot depicting an example multilevel output voltage generated by superposition of output voltages from an array of modules under a pulse width modulation control technique.

FIGS. 8C-8F are plots depicting an example embodiment of a phase-shifted PWM control methodology that can generate a multilevel output PWM waveform using incrementally shifted two-level waveforms. An X-level PWM waveform can be created by the summation of $(X-1)/2$ two-level PWM waveforms. These two-level waveforms can be generated by comparing a reference waveform Vref to carriers incrementally shifted by $360°/(X-1)$. The carriers are triangular, but the embodiments are not limited to such. A nine-level example is shown in FIG. 8C (using four modules 108). The carriers are incrementally shifted by $360°/(9-1)=45°$ and compared to Vref. The resulting two-level PWM waveforms are shown in FIG. 8E. These two-level waveforms may be used as the switching signals for semiconductor switches (e.g., S1 though S6) of converters 202. As an example with reference to FIG. 8E, for a one-dimensional array 700 including four modules 108 each with a converter 202, the 0° signal is for control of S3 and the 180° signal for S6 of the first module 108-1, the 45° signal is for S3 and the 225° signal for S6 of the second module 108-2, the 90 signal is for S3 and the 270 signal is for S6 of the third module 108-3, and the 135 signal is for S3 and the 315 signal is for S6 of the fourth module 108-4. The signal for S3 is complementary to S4 and the signal for S5 is complementary to S6 with sufficient dead-time to avoid shoot through of each half-bridge. FIG. 8F depicts an example single phase AC waveform produced by superposition (summation) of output voltages from the four modules 108.

An alternative is to utilize both a positive and a negative reference signal with the first $(N-1)/2$ carriers. A nine-level example is shown in FIG. 8D. In this example, the 0° to 135° switching signals (FIG. 8E) are generated by comparing +Vref to the 0° to 135° carriers of FIG. 8D and the 180° to 315° switching signals are generated by comparing −Vref to the 0° to 135° carriers of FIG. 8D. However, the logic of the comparison in the latter case is reversed. Other techniques such as a state machine decoder may also be used to generate gate signals for the switches of converter 202.

In multi-phase system embodiments, the same carriers can be used for each phase, or the set of carriers can be shifted as a whole for each phase. For example, in a three phase system with a single reference voltage (Vref), each array 700 can use the same number of carriers with the same relative offsets as shown in FIGS. 8C and 8D, but the carriers of the second phase are shift by 120 degrees as compared to the carriers of the first phase, and the carriers of the third phase are shifted by 240 degrees as compared to the carriers of the first phase. If a different reference voltage is available for each phase, then the phase information can be carried in the reference voltage and the same carriers can be used for each phase. In many cases the carrier frequencies will be fixed, but in some example embodiments, the carrier frequencies can be adjusted, which can help to reduce losses in EV motors under high current conditions.

The appropriate switching signals can be provided to each module by control system 102. For example, MCD 112 can provide Vref and the appropriate carrier signals to each LCD 114 depending upon the module or modules 108 that LCD 114 controls, and the LCD 114 can then generate the switching signals. Or all LCDs 114 in an array can be provided with all carrier signals and the LCD can select the appropriate carrier signals.

The relative utilizations of each module 108 can adjusted based on status information to perform balancing or of one or more parameters as described herein. Balancing of parameters can involve adjusting utilization to minimize parameter divergence over time as compared to a system where individual module utilization adjustment is not performed. The utilization can be the relative amount of time a module 108 is discharging when system 100 is in a discharge state, or the relative amount of time a module 108 is charging when system 100 is in a charge state.

As described herein, modules 108 can be balanced with respect to other modules in an array 700, which can be referred to as intra array or intraphase balancing, and different arrays 700 can be balanced with respect to each other, which can be referred to as interarray or interphase balancing. Arrays 700 of different subsystems can also be balanced with respect to each other. Control system 102 can simultaneously perform any combination of intraphase balancing, interphase balancing, utilization of multiple energy sources within a module, active filtering, and auxiliary load supply.

Figure 9A:
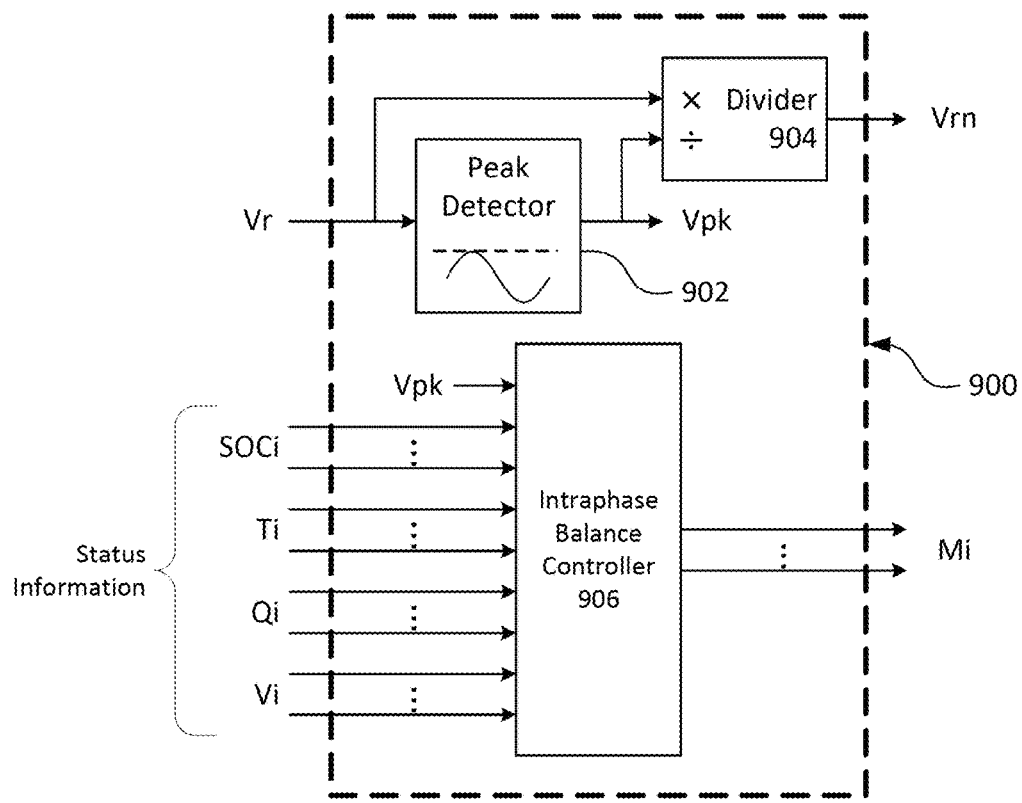
FIGS. 9A-9B are block diagrams depicting example embodiments of controllers for a modular energy system.

FIG. 9A is a block diagram depicting an example embodiment of an array controller 900 of control system 102 for a single-phase AC or DC array. Array controller 900 can include a peak detector 902, a divider 904, and an intraphase (or intra array) balance controller 906. Array controller 900 can receive a reference voltage waveform (Vr) and status information about each of the N modules 108 in the array (e.g., state of charge (SOCi), temperature (Ti), capacity (Qi), and voltage (Vi)) as inputs, and generate a normalized reference voltage waveform (Vrn) and modulation indexes (Mi) as outputs. Peak detector 902 detects the peak (Vpk) of Vr, which can be specific to the phase that controller 900 is operating with and/or balancing. Divider 904 generates Vrn by dividing Vr by its detected Vpk. Intraphase balance controller 906 uses Vpk along with the status information (e.g., SOCi, Ti, Qi, Vi, etc.) to generate modulation indexes Mi for each module 108 within the array 700 being controlled.

The modulation indexes and Vrn can be used to generate the switching signals for each converter 202. The modulation index can be a number between zero and one (inclusive of zero and one). For a particular module 108, the normalized reference Vrn can be modulated or scaled by Mi, and this modulated reference signal (Vrnm) can be used as Vref (or −Vref) according to the PWM technique described with respect to FIGS. 8C-8F, or according to other techniques. In this manner, the modulation index can be used to control the PWM switching signals provided to the converter switching circuitry (e.g., S3-S6 or S1-S6), and thus regulate the operation of each module 108. For example, a module 108 being controlled to maintain normal or full operation may receive an Mi of one, while a module 108 being controlled to less than normal or full operation may receive an Mi less than one, and a module 108 controlled to cease power output may receive an Mi of zero. This operation can be performed in various ways by control system 102, such as by MCD 112 outputting Vrn and Mi to the appropriate LCDs 114 for modulation and switch signal generation, by MCD 112 performing modulation and outputting the modulated Vrnm to the appropriate LCDs 114 for switch signal generation, or by MCD 112 performing modulation and switch signal generation and outputting the switch signals to the LCDs or the converters 202 of each module 108 directly. Vrn can be sent continually with Mi sent at regular intervals, such as once for every period of the Vrn, or one per minute, etc.

Controller 906 can generate an Mi for each module 108 using any type or combination of types of status information (e.g., SOC, temperature (T), Q, SOH, voltage, current) described herein. For example, when using SOC and T, a module 108 can have a relatively high Mi if SOC is relatively high and temperature is relatively low as compared to other modules 108 in array 700. If either SOC is relatively low or T is relatively high, then that module 108 can have a relatively low Mi, resulting in less utilization than other modules 108 in array 700. Controller 906 can determine Mi such that the sum of module voltages does not exceed Vpk. For example, Vpk can be the sum of the products of the voltage of each module's source 206 and Mi for that module (e.g., $Vpk=M_1V_1+M_2V_2+M_3V_3 \ldots +M_NV_N$, etc). A different combination of modulation indexes, and thus respective voltage contributions by the modules, may be used but the total generated voltage should remain the same.

Controller 900 can control operation, to the extent it does not prevent achieving the power output requirements of the system at any one time (e.g., such as during maximum acceleration of an EV), such that SOC of the energy source(s) in each module 108 remains balanced or converges to a balanced condition if they are unbalanced, and/or such that temperature of the energy source(s) or other component (e.g., energy buffer) in each module remains balanced or converges to a balanced condition if they are unbalanced. Power flow in and out of the modules can be regulated such that a capacity difference between sources does not cause an SOC deviation. Balancing of SOC and temperature can indirectly cause some balancing of SOH. Voltage and current can be directly balanced if desired, but in many embodiments the main goal of the system is to balance SOC and temperature, and balancing of SOC can lead to balance of voltage and current in a highly symmetric systems where modules are of similar capacity and impedance.

Since balancing all parameters may not be possible at the same time (e.g., balancing of one parameter may further unbalance another parameter), a combination of balancing any two or more parameters (SOC, T, Q, SOH, V, I) may be applied with priority given to either one depending on the requirements of the application. Priority in balancing can be given to SOC over other parameters (T, Q, SOH, V, I), with exceptions made if one of the other parameters (T, Q, SOH, V, I) reaches a severe unbalanced condition outside a threshold.

Figure 9B:
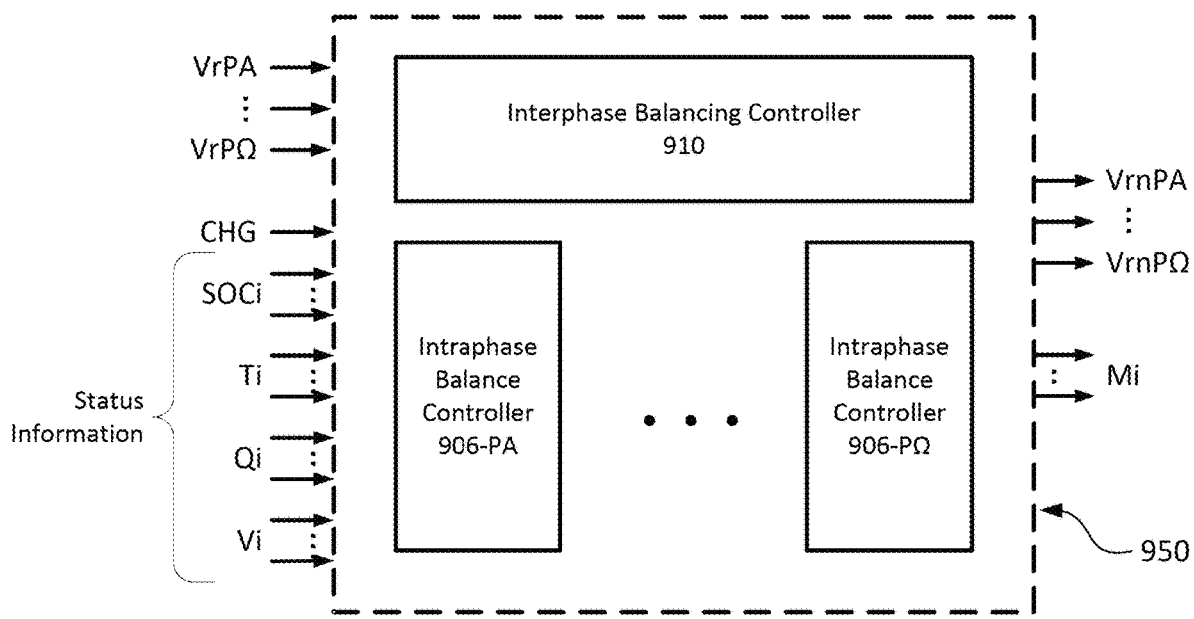

Balancing between arrays 700 of different phases (or arrays of the same phase, e.g., if parallel arrays are used) can be performed concurrently with intraphase balancing. FIG. 9B depicts an example embodiment of an $\Omega$-phase (or $\Omega$-array) controller 950 configured for operation in an $\Omega$-phase system 100, having at least $\Omega$ arrays 700, where $\Omega$ is any integer greater than one. Controller 950 can include one interphase (or interarray) controller 910 and $\Omega$ intraphase balance controllers 906-PA . . . 906-Pa for phases PA through P$\Omega$, as well as peak detector 902 and divider 904 (FIG. 9A) for generating normalized references VrnPA through VrnP$\Omega$ from each phase-specific reference VrPA through VrP$\Omega$. Intraphase controllers 906 can generate Mi for each module 108 of each array 700 as described with respect to FIG. 9A. Interphase balance controller 910 is configured or programmed to balance aspects of modules 108 across the entire multi-dimensional system, for example, between arrays of different phases. This may be achieved through injecting common mode to the phases (e.g., neutral point shifting) or through the use of interconnection modules (described herein) or through both. Common mode injection involves introducing a phase and amplitude shift to the reference signals VrPA through VrP$\Omega$ to generate normalized waveforms VrnPA through VrnP$\Omega$ to compensate for unbalance in one or more arrays, and is described further in Int'l. Appl. No. PCT/US20/25366 incorporated herein.

Controllers 900 and 950 (as well as balance controllers 906 and 910) can be implemented in hardware, software or a combination thereof within control system 102. Controllers 900 and 950 can be implemented within MCD 112, distributed partially or fully among LCDs 114, or may be implemented as discrete controllers independent of MCD 112 and LCDs 114.

Interconnection (IC) Module Examples

Modules 108 can be connected between the modules of different arrays 700 for the purposes of exchanging energy between the arrays, acting as a source for an auxiliary load, or both. Such modules are referred to herein as interconnection (IC) modules 108IC. IC module 108IC can be implemented in any of the already described module configurations (108A, 108B, 108C) and others to be described herein. IC modules 108IC can include any number of one or more energy sources, an optional energy buffer, switch circuitry for supplying energy to one or more arrays and/or for supplying power to one or more auxiliary loads, control circuitry (e.g., a local control device), and monitor circuitry for collecting status information about the IC module itself or its various loads (e.g., SOC of an energy source, temperature of an energy source or energy buffer, capacity of an energy source, SOH of an energy source, voltage and/or current measurements pertaining to the IC module, voltage and/or current measurements pertaining to the auxiliary load(s), etc.).

Figures 10A, 10B:
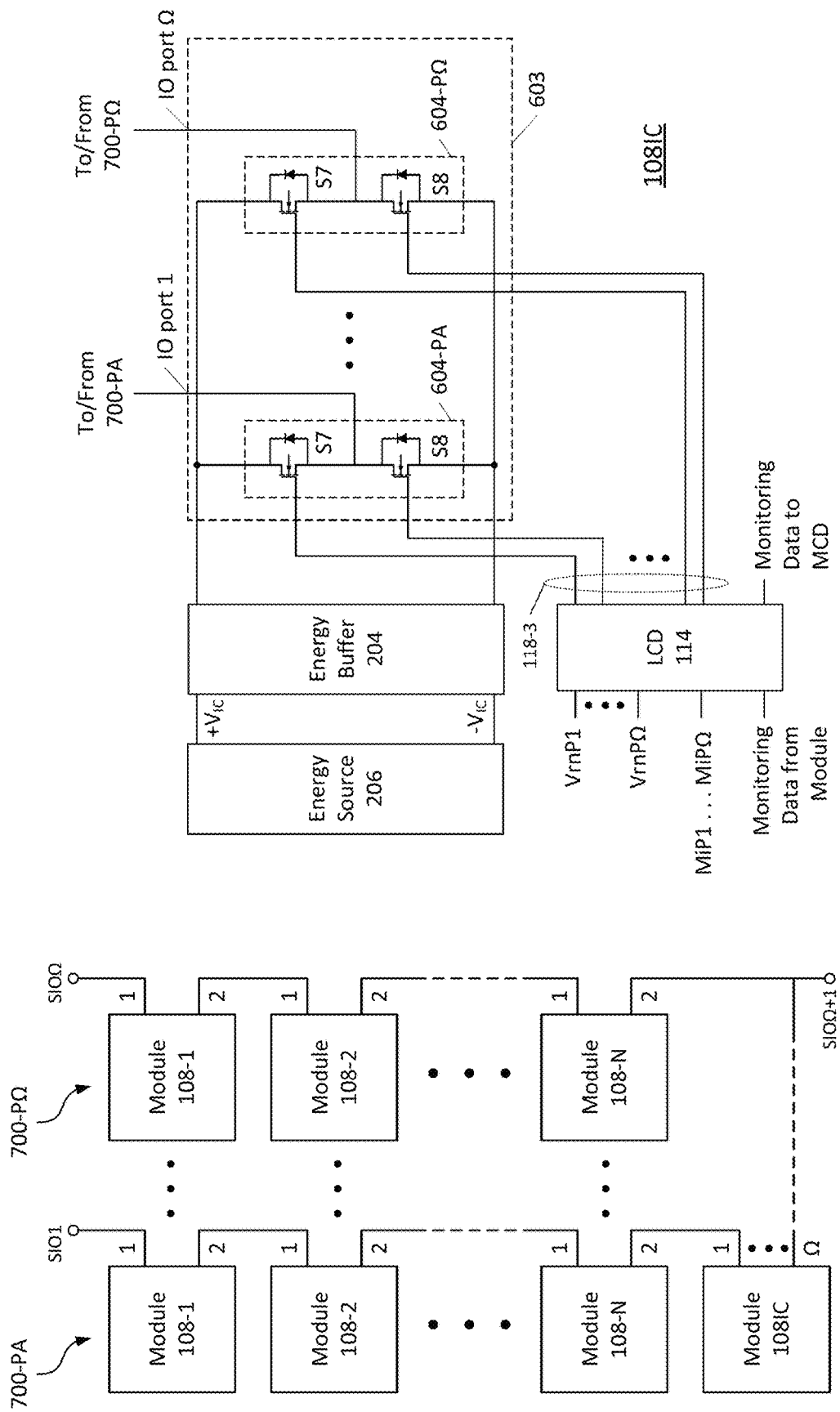
FIG. 10A is a block diagram depicting an example embodiment of a multiphase modular energy system having interconnection module.
FIG. 10B is a schematic diagram depicting an example embodiment of an interconnection module in the multiphase embodiment of FIG. 10A.

FIG. 10A is a block diagram depicting an example embodiment of a system 100 capable of producing $\Omega$-phase power with $\Omega$ arrays 700-PA through 700-Pa, where $\Omega$ can be any integer greater than one. In this and other embodiments, IC module 108IC can be located on the rail side of arrays 700 such the arrays 700 to which module 108IC are connected (arrays 700-PA through 700-P$\Omega$ in this embodiment) are electrically connected between module 108IC and outputs (e.g., SIO1 through SIO$\Omega$) to the load. Here, module 108IC has $\Omega$ IO ports for connection to IO port 2 of each module 108-N of arrays 700-PA through 700-P$\Omega$. In the configuration depicted here, module 108IC can perform interphase balancing by selectively connecting the one or more energy sources of module 108IC to one or more of the arrays 700-PA through 700-P$\Omega$ (or to no output, or equally to all outputs, if interphase balancing is not required). System 100 can be controlled by control system 102 (not shown, see FIG. 1A).

FIG. 10B is a schematic diagram depicting an example embodiment of module 108IC. In this embodiment module 108IC includes an energy source 206 connected with energy buffer 204 that in turn is connected with switch circuitry 603. Switch circuitry 603 can include switch circuitry units 604-PA through 604-P$\Omega$ for independently connecting energy source 206 to each of arrays 700-PA through 700-P$\Omega$, respectively. Various switch configurations can be used for each unit 604, which in this embodiment is configured as a half-bridge with two semiconductor switches S7 and S8. Each half bridge is controlled by control lines 118-3 from LCD 114. This configuration is similar to module 108A described with respect to FIG. 3A. As described with respect to converter 202, switch circuitry 603 can be configured in any arrangement and with any switch types (e.g., MOSFET, IGBT, Silicon, GaN, etc.) suitable for the requirements of the application.

Switch circuitry units 604 are coupled between positive and negative terminals of energy source 206 and have an output that is connected to an IO port of module 108IC. Units 604-PA through 604-P$\Omega$ can be controlled by control system 102 to selectively couple voltage $+V_{IC}$ or $-V_{IC}$ to the respective module I/O ports 1 through $\Omega$. Control system 102 can control switch circuitry 603 according to any desired control technique, including the PWM and hysteresis techniques mentioned herein. Here, control circuitry 102 is implemented as LCD 114 and MCD 112 (not shown). LCD 114 can receive monitoring data or status information from monitor circuitry of module 108IC. This monitoring data and/or other status information derived from this monitoring data can be output to MCD 112 for use in system control as described herein. LCD 114 can also receive timing information (not shown) for purposes of synchronization of modules 108 of the system 100 and one or more carrier signals (not shown), such as the sawtooth signals used in PWM (FIGS. 8C-8D).

For interphase balancing, proportionally more energy from source 206 can be supplied to any one or more of arrays 700-PA through 700-P$\Omega$ that is relatively low on charge as compared to other arrays 700. Supply of this supplemental energy to a particular array 700 allows the energy output of those cascaded modules 108-1 thru 108-N in that array 700 to be reduced relative to the unsupplied phase array(s).

For example, in some example embodiments applying PWM, LCD 114 can be configured to receive the normalized voltage reference signal (Vrn) (from MCD 112) for each of the one or more arrays 700 that module 108IC is coupled to, e.g., VrnPA through VrnP$\Omega$. LCD 114 can also receive modulation indexes MiPA through MiP$\Omega$ for the switch units 604-PA through 604-PQ for each array 700, respectively, from MCD 112. LCD 114 can modulate (e.g., multiply) each respective Vrn with the modulation index for the switch section coupled directly to that array (e.g., VrnA multiplied by MiA) and then utilize a carrier signal to generate the control signal(s) for each switch unit 604. In other embodiments, MCD 112 can perform the modulation and output modulated voltage reference waveforms for each unit 604 directly to LCD 114 of module 108IC. In still other embodiments, all processing and modulation can occur by a single control entity that can output the control signals directly to each unit 604.

This switching can be modulated such that power from energy source 206 is supplied to the array(s) 700 at appropriate intervals and durations. Such methodology can be implemented in various ways.

Based on the collected status information for system 100, such as the present capacity (Q) and SOC of each energy source in each array, MCD 112 can determine an aggregate charge for each array 700 (e.g., aggregate charge for an array can be determined as the sum of capacity times SOC for each module of that array). MCD 112 can determine whether a balanced or unbalanced condition exists (e.g., through the use of relative difference thresholds and other metrics described herein) and generate modulation indexes MiPA through MiPΩ accordingly for each switch unit 604-PA through 604-PΩ.

During balanced operation, Mi for each switch unit 604 can be set at a value that causes the same or similar amount of net energy over time to be supplied by energy source 206 and/or energy buffer 204 to each array 700. For example, Mi for each switch unit 604 could be the same or similar, and can be set at a level or value that causes the module 108IC to perform a net or time average discharge of energy to the one or more arrays 700-PA through 700-PΩ during balanced operation, so as to drain module 108IC at the same rate as other modules 108 in system 100. In some embodiments, Mi for each unit 604 can be set at a level or value that does not cause a net or time average discharge of energy during balanced operation (causes a net energy discharge of zero). This can be useful if module 108IC has a lower aggregate charge than other modules in the system.

When an unbalanced condition occurs between arrays 700, then the modulation indexes of system 100 can be adjusted to cause convergence towards a balanced condition or to minimize further divergence. For example, control system 102 can cause module 108IC to discharge more to the array 700 with low charge than the others, and can also cause modules 108-1 through 108-N of that low array 700 to discharge relatively less (e.g., on a time average basis). The relative net energy contributed by module 108IC increases as compared to the modules 108-1 through 108-N of the array 700 being assisted, and also as compared to the amount of net energy module 108IC contributes to the other arrays. This can be accomplished by increasing Mi for the switch unit 604 supplying that low array 700, and by decreasing the modulation indexes of modules 108-1 through 108-N of the low array 700 in a manner that maintains Vout for that low array at the appropriate or required levels, and maintaining the modulation indexes for other switch units 604 supplying the other higher arrays relatively unchanged (or decreasing them).

The configuration of module 108IC in FIGS. 10A-10B can be used alone to provide interphase or interarray balancing for a single system, or can be used in combination with one or more other modules 108IC each having an energy source and one or more switch portions 604 coupled to one or more arrays. For example, a module 108IC with Ω switch portions 604 coupled with Ω different arrays 700 can be combined with a second module 108IC having one switch portion 604 coupled with one array 700 such that the two modules combine to service a system 100 having Ω+1 arrays 700. Any number of modules 108IC can be combined in this fashion, each coupled with one or more arrays 700 of system 100.

Figure 10C:
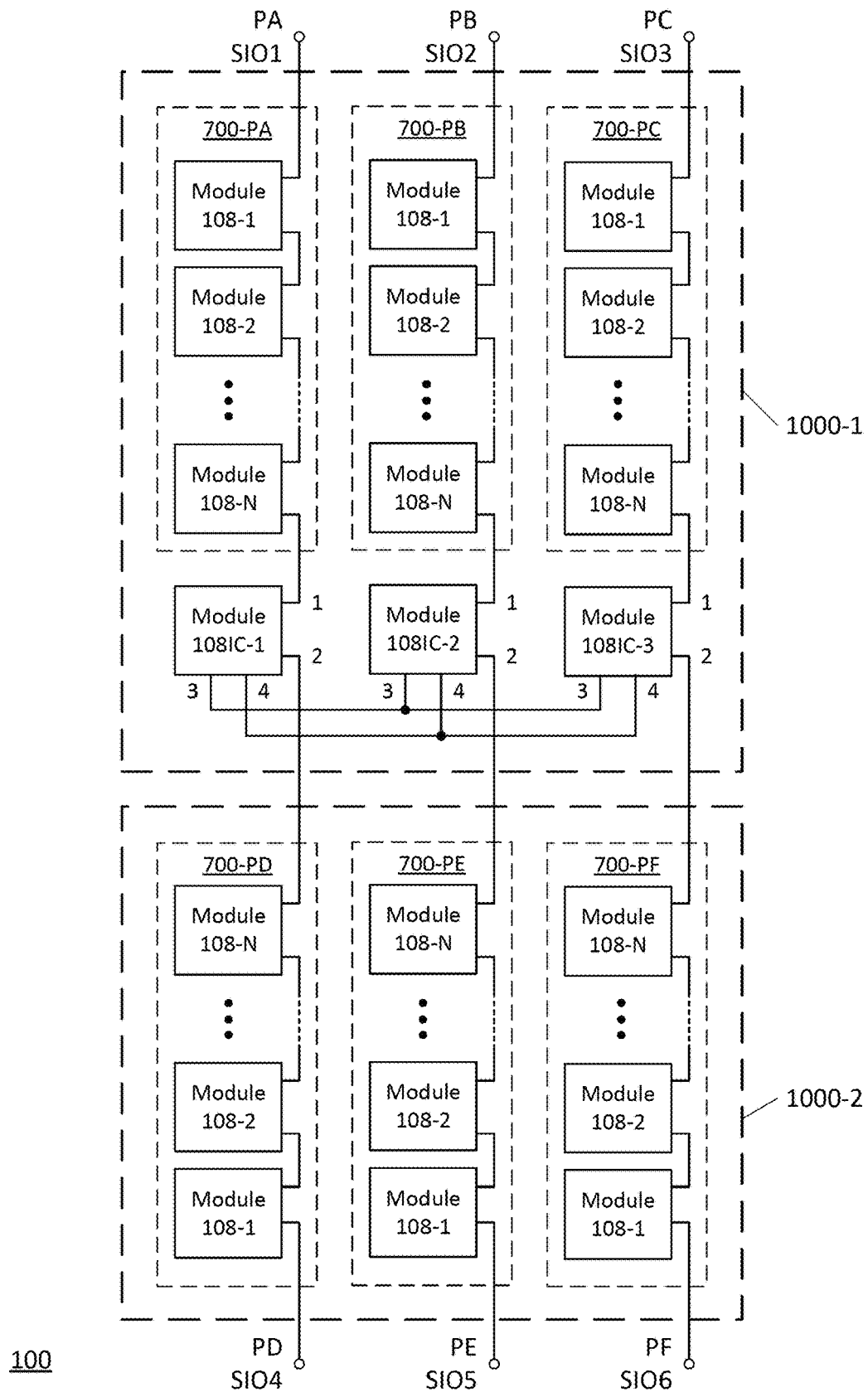
FIG. 10C is a block diagram depicting an example embodiment of a modular energy system having two subsystems connected together by interconnection modules.

Furthermore, IC modules can be configured to exchange energy between two or more subsystems of system 100. FIG. 10C is a block diagram depicting an example embodiment of system 100 with a first subsystem 1000-1 and a second subsystem 1000-2 interconnected by IC modules. Specifically, subsystem 1000-1 is configured to supply three-phase power, PA, PB, and PC, to a first load (not shown) by way of system I/O ports SIO1, SIO2, and SIO3, while subsystem 1000-2 is configured to supply three-phase power PD, PE, and PF to a second load (not shown) by way of system I/O ports SIO4, SIO5, and SIO06, respectively. For example, subsystems 1000-1 and 1000-2 can be configured as different packs supplying power for different motors of an EV or as different racks supplying power for different microgrids.

In this embodiment each module 108IC is coupled with a first array of subsystem 1000-1 (via IO port 1) and a first array of subsystem 1000-2 (via IO port 2), and each module 108IC can be electrically connected with each other module 108IC by way of I/O ports 3 and 4, which are coupled with the energy source 206 of each module 108IC as described with respect to module 108C of FIG. 3C. This connection places sources 206 of modules 108IC-1, 108IC-2, and 108IC-3 in parallel, and thus the energy stored and supplied by modules 108IC is pooled together by this parallel arrangement. Other arrangements such as serious connections can also be used. Modules 108IC are housed within a common enclosure of subsystem 1000-1, however the interconnection modules can be external to the common enclosure and physically located as independent entities between the common enclosures of both subsystems 1000.

Each module 108IC has a switch unit 604-1 coupled with IO port 1 and a switch unit 604-2 coupled with I/O port 2, as described with respect to FIG. 10B. Thus, for balancing between subsystems 1000 (e.g., inter-pack or inter-rack balancing), a particular module 108IC can supply relatively more energy to either or both of the two arrays to which it is connected (e.g., module 108IC-1 can supply to array 700-PA and/or array 700-PD). The control circuitry can monitor relative parameters (e.g., SOC and temperature) of the arrays of the different subsystems and adjust the energy output of the IC modules to compensate for imbalances between arrays or phases of different subsystems in the same manner described herein as compensating for imbalances between two arrays of the same rack or pack. Because all three modules 108IC are in parallel, energy can be efficiently exchanged between any and all arrays of system 100. In this embodiment, each module 108IC supplies two arrays 700, but other configurations can be used including a single IC module for all arrays of system 100 and a configuration with one dedicated IC module for each array 700 (e.g., six IC modules for six arrays, where each IC module has one switch unit 604). In all cases with multiple IC modules, the energy sources can be coupled together in parallel so as to exchange energy as described herein.

In systems with IC modules between phases, interphase balancing can also be performed by neutral point shifting (or common mode injection) as described above. Such a combination allows for more robust and flexible balancing under a wider range of operating conditions. System 100 can determine the appropriate circumstances under which to perform interphase balancing with neutral point shifting alone, interphase energy injection alone, or a combination of both simultaneously.

Figure 10D:
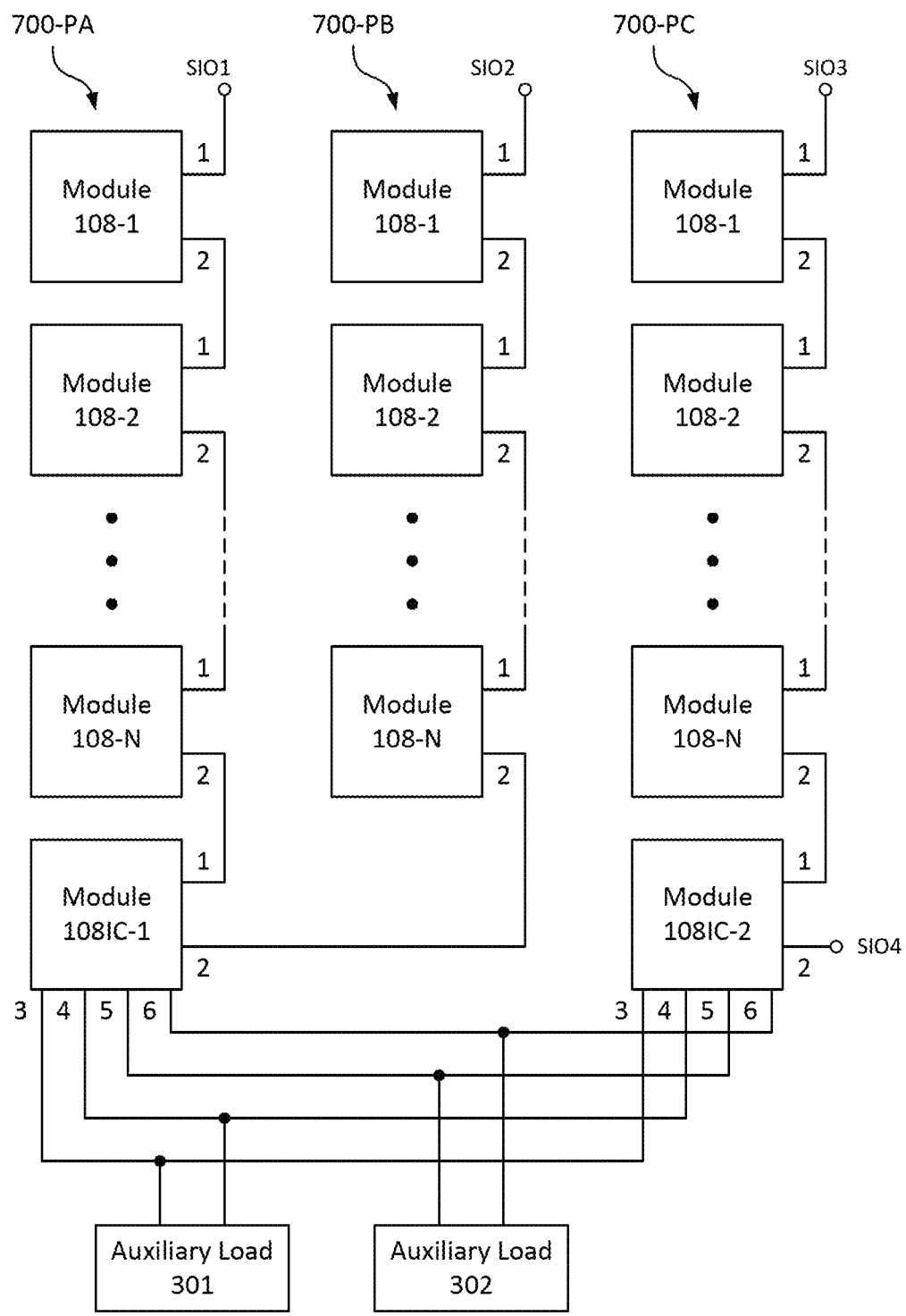
FIG. 10D is a block diagram depicting an example embodiment of a three-phase modular energy system having interconnection modules supplying auxiliary loads.
Figure 10E:
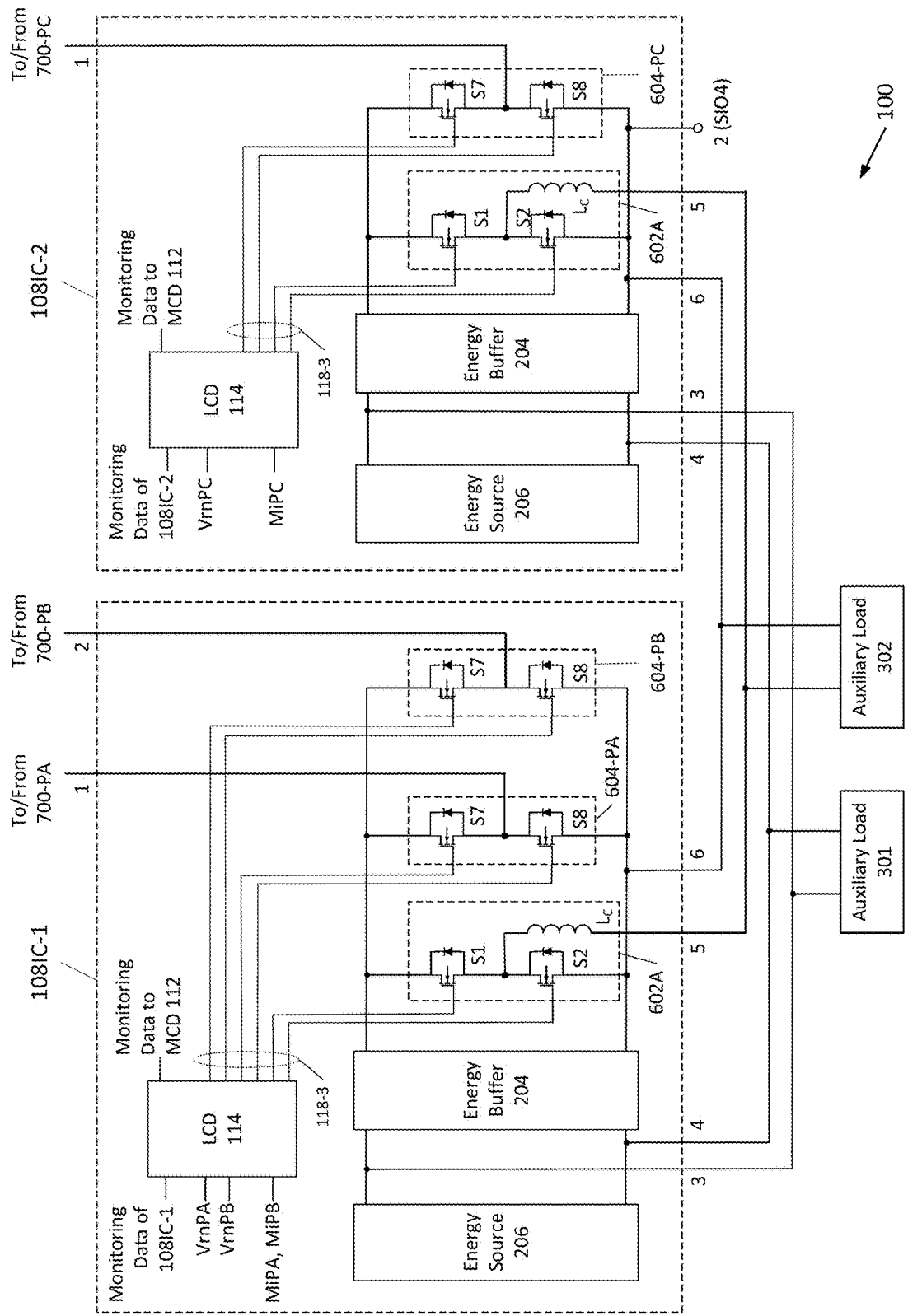
FIG. 10E is a schematic view depicting an example embodiment of the interconnection modules in the multiphase embodiment of FIG. 10D.

IC modules can also be configured to supply power to one or more auxiliary loads 301 (at the same voltage as source 206) and/or one or more auxiliary loads 302 (at voltages stepped down from source 302). FIG. 10D is a block diagram depicting an example embodiment of a three-phase system 100A with two modules 108IC connected to perform interphase balancing and to supply auxiliary loads 301 and 302. FIG. 10E is a schematic diagram depicting this example embodiment of system 100 with emphasis on modules 108IC-1 ad 108IC-2. Here, control circuitry 102 is again implemented as LCD 114 and MCD 112 (not shown). The LCDs 114 can receive monitoring data from modules 108IC (e.g., SOC of ES1, temperature of ES1, Q of ES1, voltage of auxiliary loads 301 and 302, etc.) and can output this and/or other monitoring data to MCD 112 for use in system control as described herein. Each module 108IC can include a switch portion 602A (or 602B described with respect to FIG. 6C) for each load 302 being supplied by that module, and each switch portion 602 can be controlled to maintain the requisite voltage level for load 302 by LCD 114 either independently or based on control input from MCD 112. In this embodiment, each module 108IC includes a switch portion 602A connected together to supply the one load 302, although such is not required.

Figure 10F:
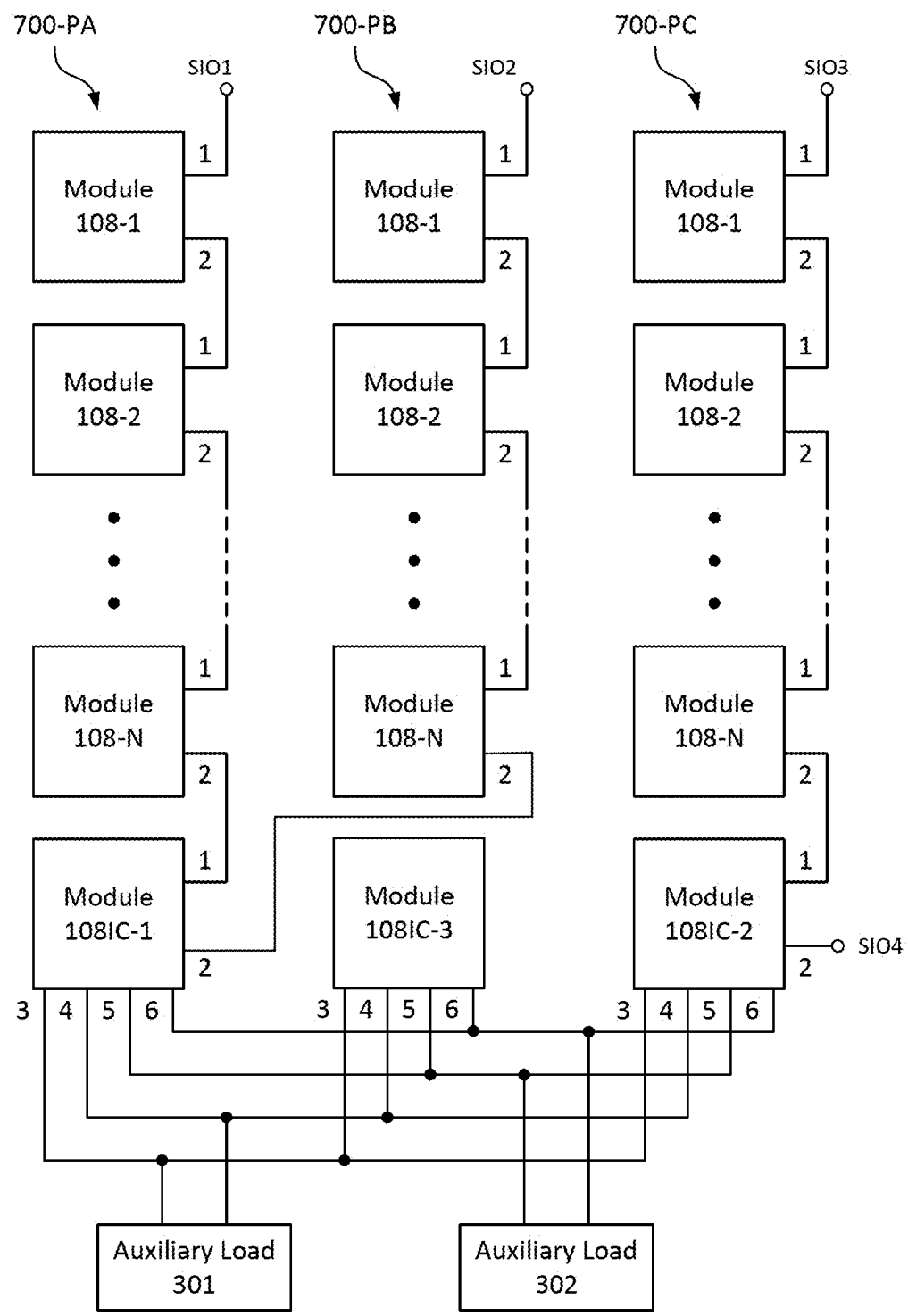
FIG. 10F is a block diagram depicting another example embodiment of a three-phase modular energy system having interconnection modules supplying auxiliary loads.

FIG. 10F is a block diagram depicting another example embodiment of a three-phase system configured to supply power to one or more auxiliary loads 301 and 302 with modules 108IC-1, 108IC-2, and 108IC-3. In this embodiment, modules 108IC-1 and 108IC-2 are configured in the same manner as described with respect to FIGS. 10D-10E. Module 108IC-3 is configured in a purely auxiliary role and does not actively inject voltage or current into any array 700 of system 100. In this embodiment, module 108IC-3 can be configured like module 108C of FIG. 3B, having a converter 202B,C (FIGS. 6B-6C) with one or more auxiliary switch portions 602A, but omitting switch portion 601. As such, the one or more energy sources 206 of module 108IC-3 are interconnected in parallel with those of modules 108IC-1 and 108IC-2, and thus this embodiment of system 100 is configured with additional energy for supplying auxiliary loads 301 and 302, and for maintaining charge on the sources 206A of modules 108IC-1 and 108IC-2 through the parallel connection with the source 206 of module 108IC-3.

The energy source 206 of each IC module can be at the same voltage and capacity as the sources 206 of the other modules 108-1 through 108-N of the system, although such is not required. For example, a relatively higher capacity can be desirable in an embodiment where one module 108IC applies energy to multiple arrays 700 (FIG. 10A) to allow the IC module to discharge at the same rate as the modules of the phase arrays themselves. If the module 108IC is also supplying an auxiliary load, then an even greater capacity may be desired so as to permit the IC module to both supply the auxiliary load and discharge at relatively the same rate as the other modules.

Interfacing with Renewable Energy Sources

System 100 can be configured to interface with renewable energy sources including, but not limited to, energy harvesting devices like photovoltaic (PV) cells and wind turbines. PV cells convert solar energy into electrical energy and output that electrical energy as a voltage or current that can be used to supply a load or grid or stored for later use. PV cells can be arranged and grouped together in numerous different configurations, such as rigid or flexible panels or modules. Multiple panels or modules can be grouped together in a larger PV array. The PV cells in each panel or module are electrically connected to produce the optimal voltage or current, and the panels or modules can be electrically connected to produce the optimal voltage or current as an array. Arrangements of one or more PV cells, whether as a panel, module, array or otherwise, will be referred to herein as a PV source 1101. PV sources can be used in a wide variety of applications, predominantly as solar arrays located in residential, commercial, industrial, municipal, and dedicated-energy harvesting locations for renewable energy harvesting, where that energy can be buffered in a stationary energy storage system and/or supplied directly to a load or grid. PV sources can also be placed directly on electric vehicles for storage therein and/or use directly by the EV motor(s). Thus, the PV-interfacing embodiments described herein are applicable in both mobile and stationary applications.

A wind turbine converts wind energy into electrical energy and outputs that electrical energy as a voltage or current that can be used to supply a load or grid or stored for later use. Wind turbines can also be arranged and grouped together in different configurations. For example, a wind farm can include a group of wind turbines in a same location. The wind turbines in a wind farm can be connected together to produce an optimal voltage or current. Arrangements of one or more wind turbines will be referred to herein as a wind source 1112.

Example embodiments of module configurations are described with an additional DC interface for receiving energy from PV sources 1101. FIG. 11A is a block diagram depicting an example embodiment of module 108D configured for use with one or more PV sources 1101. Module 108D can include any number of one or more energy sources 206, such as one or more batteries, one or more high energy density (HED) capacitors, and/or one or more fuel cells 1111. If multiple batteries are included those batteries can have the same or different electrochemistries as described herein. Similarly, different types of HED capacitors and fuel cells 1111 can be used. Each battery can be a single cell or multiple cells connected in series, parallel or a combination thereof to arrive at the desired voltage and current characteristics. As shown in FIG. 11A, module 108D includes a first source 206A and a second source 206B, and the sources can be batteries of different types (e.g., such as an LTO battery and an LFP battery) or one can be a battery and the other can be an HED capacitor, or any other combination as described herein. Alternatively, module 108D can get be configured with just source 206A in combination with converter 202A as described with respect to FIG. 3A. Additional energy sources 206 can be added to such a configuration by placing them in parallel or in series with sources 206A and 206B.

Module 108D includes converter 202B or 202C coupled with energy sources 206A and 206B in a manner similar to that described with respect to module 108B of FIG. 3B. Energy source 206A is coupled with energy buffer 204, which in turn is coupled with an isolated DC-DC converter 1100. Module 108D includes I/O ports 7 and 8 that connect with PV source 1101 and receive the signals DC_PV+ and DC_PV− respectively, via lines 1102. These signals carry the voltage and current generated by PV source 1101. These signals are input to DC-AC converter 1104 of converter 1100 where they are converted to high-frequency AC form and then input to transformer and rectifier section 1106. I/O ports 7 and 8 provide a DC interface for receiving energy from PV source 1101.

Transformer and rectifier section 1106 can include a high-frequency transformer and a one phase diode rectifier. The DC voltage on ports 7 and 8 may be a voltage that is lower than the total voltage supplied by PV source 1101 as many such modules 108 may be receiving charge from PV source 1101 simultaneously. Transformer and rectifier section 1106 can modify the voltage of the AC signal from converter 1104, if necessary, and convert the AC signal back into DC form to charge sources 206A and 206B. Section 1106 also provides high-voltage isolation to the other components 202, 204, 206 and 114 of module 108D.

Unidirectionality can be provided by virtue of the diode rectifier which permits current to be received from charge source 150 and passed to buffer 204 but does not permit outputting current in the opposite manner. For example, charge can be transferred back to each module 108 (e.g., from a charge source 150) through power connection 110 and routed to either of sources 206A and 206B by way of converter 202B,C. Presence of unidirectional DC-DC isolated converter 1200 (diode rectifier) will prevent that recovered energy from passing through module 108D back to PV source 1101 via lines 1102. Ports 1 and 2 and power connection 110 provide an AC interface to an AC bus connected to a load or bus.

LCD 114 can monitor the status of converter 1100, particularly converter 1104 and section 1106, over data connections 118-5 and 118-6, respectively. As with the other components of module 108D, monitor circuitry for converter 1104 and section 1106 can be included to measure currents, voltages, temperatures, faults, and the like. These connections 118-5 and 118-6 can also supply control signals to control switching of converter 1104 and to control any active elements within section 1106. Isolation of LCD 114 can be maintained by isolation circuitry present on lines 118-5 and 118-6 (e.g., isolated gate drivers and isolated sensors).

LCD 114 can also monitor the status of source 206A, buffer 204, converter 202B,C, and source 206B over data connections 118-1, 118-2, 118-3, and 118-4, respectively. These connections 118-1, 118-2, 118-3, and 118-4 can also supply signals, e.g., control signals, from LCD 114 to source 206A, buffer 204, converter 202B,C, and source 206B, respectively.

FIG. 11B is a block diagram depicting another example embodiment of a module 108D. In this embodiment, module 108D has DC-DC isolated converter 1110 instead of converter 1100, and also only one source 206 (though additional sources 206 can be included). Converter 1110 can route current from ports 7 and 8 to energy source 206. Converter 1110 is connected between I/O ports 7 and 8 and buffer 204 and includes DC-AC converter 1104, connected to transformer 1114, which in turn is connected to AC-DC converter 1116. Converter 1104 can convert the DC voltage at ports 7 and 8 into a high-frequency AC voltage, which transformer 1114 can modify to a lower voltage if needed, and output that modified AC voltage to AC-DC converter 1116, which can convert the AC signal back into DC form for provision to source 206A, or module ports 1 and 2. Transformer 1114 can also isolate module components 202, 204, 206, 208, and 114 from the high voltage at ports 7 and 8. As with the other components of module 108D, monitor circuitry for converter 1104, transformer 1114, and converter 1116 can be included to measure currents, voltages, temperatures, faults, and the like. LCD 114 can monitor the status of converter 1110, particularly converter 1104, transformer 1114 (e.g., monitor circuitry or an active component associated therewith), and converter 1116, over data connections 118-5, 118-7, and 118-8, respectively. These connections 118-5, 118-7, and 118-8 can also supply control signals to control switching of converter 1104 and/or converter 1116, and to control any controllable elements associated with transformer 1114. Isolation of LCD 114 can be maintained by isolation circuitry present on lines 118-5, 118-7, and 118-8 (e.g., isolated gate drivers and isolated sensors).

LCD 114 can also monitor the status of buffer 204, source 206, and converter 202 over data connections 118-1, 118-2, and 118-3, respectively. These connections 118-1, 118-2, and 118-3 can also supply signals, e.g., control signals, from LCD 114 to buffer 204, source 206, and converter 202, respectively.

Furthermore, for electrochemical battery sources 206, the length of the charge pulses applied to sources 206 by AC-DC converter 1116 can be maintained to have a certain length, e.g., less than 5 milliseconds, to promote the occurrence of the electrochemical storage reaction in the cells without the occurrence of significant side reactions that can lead to degradation. The charge methodology can incorporate active feedback from each energy source to ensure that battery degradation, if detected, is mitigated by lowering voltage or pausing the charge routine for that module, or otherwise. Such pulses can be applied at high C rates (e.g., 5C-15C and greater) to enable fast charging of the sources 206. The duration and frequency of the charge pulses can be controlled by control system 102. Examples of such techniques that can be used with all embodiments described herein are described in Int'l Appl. No. PCT/US20/35437, titled Advanced Battery Charging on Modular Levels of Energy Storage Systems, which is incorporated by reference herein for all purposes.

FIG. 11C is a schematic diagram depicting an example embodiment of module 108D of FIG. 11A. Converter 202B is coupled with secondary source 206B, and in other embodiments can be configured like converter 202C (FIG. 6C). Buffer 204 is configured here as a capacitor. I/O ports 7 and 8 are coupled to an LC circuit 1118, which is in turn coupled to converter 1100, specifically DC-AC converter 1104, which is configured as a full bridge converter with switches S10, S11, S12, and S13. In the embodiments described herein, LC circuit 1118 can be a distributed DC filter that can filter harmonics from DC lines 1102, provide a current slowing function if desired, and/or perform other functions. The voltage across LC circuit 1118 can be controlled for purposes of matching voltage with a PV source 1101 (e.g., power point tracking), and/or for balancing by adjusting the amount of relative energy received by each module 108D. The full bridge outputs from nodes N1 and N2 are connected to a primary winding of transformer 1105 within section 1106. A secondary winding of transformer 1105 is coupled with nodes N3 and N4 of the diode rectifier of section 1204, having diodes D1-D4. The switches of converter 1104 can be semiconductor switches configured as MOSFETs, IGBT's, GaN devices, or others as described herein. LCD 114 or another element of control system 102 can provide the switching signals for control of switches S1-S6 and S10-S13. Along with the other functions described herein, converter 202B can be controlled to independently route current from ports 7 and 8 to source 206B for charging, or to I/O ports 1 and 2 for powering a load or a grid.

FIG. 11D is a schematic diagram depicting an example embodiment of module 108D of FIG. 11B. Converter 202B is coupled with secondary source 206B, and in other embodiments can be configured like converter 202C (FIG. 6C). Buffer 204 is configured as a capacitor. I/O ports 7 and 8 are coupled to an LC circuit 1118, which is in turn coupled to converter 1110, specifically DC-AC converter 1104, which is configured as a full bridge converter with switches S10, S11, S12, and S13. The full bridge outputs from nodes N1 and N2 are connected to a primary winding of transformer 1114. A secondary winding of transformer 1114 is coupled with nodes N3 and N4 of a second full bridge circuit configured as AC-DC converter 1116, having switches S14, S15, S16, and S17. The switches of converter 1110 can be semiconductor switches configured as MOSFETs, IGBT's, GaN devices, or others as described herein. LCD 114 or another element of control system 102 can provide the switching signals for control of switches S3-S6 and S10-S17. Along with the other functions described herein, converter 202B can be controlled to independently route current from ports 7 and 8 to source 206 for charging, or to I/O ports 1 and 2 for powering a load or a grid.

FIG. 11E is a schematic diagram depicting another example embodiment of module 108D of FIG. 11B, where AC-DC converter 1116 is configured as a push-pull converter with a first terminal of source 206 connected to one side of dual secondary windings of transformer 1114 through an inductor L2, and switches S18 and S19 connected between the opposite side of dual secondary windings and a common node (e.g., node 4) coupled with the opposite terminal of source 206. The push-pull configuration only requires two switches and thus is more cost-effective than a full bridge converter, although the switches have larger voltages applied across them.

FIG. 11F is a block diagram depicting another example embodiment of a module 108D. In this embodiment, module 108D can have one or more transformers located between connections to PV source 1101, power connection 110, and one or more energy sources 206. Here, a transformer 1130 can be used to transfer energy from PV source 1101 to either or both of power connection 110 and energy source 206, and also to transfer energy back-and-forth between power connection 110 and energy source 206. DC-AC converter 1104 is connected between ports 7 and 8 and transformer 1130. A first AC-DC converter 1116-1 is connected between transformer 1130 and converter 202A. AC-DC converter 1116-1 can convert an AC signal from transformer 1130 to a DC voltage provided to converter 202A, which can then convert the DC voltage to an AC signal output to power connection 110 over ports 1 and 2. These elements can also operate in the reverse, taking an AC signal from power connection 110 and converting the AC signal to a DC voltage by converter 202A, which is provided to AC-DC converter 1116-1 for conversion to an AC signal applied to transformer 1130. A second AC-DC converter 1116-2 is connected between transformer 1130 and energy buffer 204 and energy source 206. AC-DC converter 1116-2 can convert an AC signal from transformer 1130 to a DC voltage that is then provided to energy buffer 204 and energy source 206 to charge energy source 206. Conversely, a DC voltage provided by energy source 206 and/or energy buffer 204 can be applied to AC-DC converter 1116-2, which then converts the DC voltage to an AC voltage applied to transformer 1130.

Thus, in this and the other embodiments described herein, energy supplied by the various energy providers 1101, 110, and 206 can be transferred to transformer 1130 in the form of magnetic flux and selectively removed from transformer 1130 by AC-DC converter's 1116 for output from power connection 110 or charging of source 206. Each of converters 1104, 1116, and 202 can be locally controlled and monitored by control system 102 (e.g., LCD 114) as described elsewhere herein, and coordination of operation between modules 108D can be achieved under the higher level control of control system 102 (e.g., MCD 112 communicating with each LCD 114). Control system 102 can monitor and/or estimate the energy provided by elements or interfaces to transformer 1130 and control the extraction of energy by elements or interfaces from transformer 1130 such that they are equal. In addition to permitting energy exchange or transfer between various sources and sinks, transformer 1130 also provides isolation and protection to PV source 1101, converters 1104, 1116, and 202A, buffer 204, source 206, and power connection 110.

LCD 114 can monitor the status of converters 202A, 1104, 1116-1, and 1116-2, over data connections 118-3, 118-5, 118-9, and 118-10, respectively. These connections 118-3, 118-5, 118-9, and 118-10 can also supply control signals to control switching of converter converters 202A, 1104, 1116-1, and 1116-2. Isolation of LCD 114 can be maintained by isolation circuitry present on lines 118-3, 118-5, 118-9, and 118-10 (e.g., isolated gate drivers and isolated sensors).

LCD 114 can also monitor the status of source 206 and buffer 204 over data connections 118-1 and 118-2, respectively. These connections 118-1 and 118-2 can also supply signals, e.g., control signals, from LCD 114 to source 206 and buffer 204, respectively.

Each component 202A, 204, 205, 1104, and 1116 can include monitor circuitry 208 configured to monitor (e.g., collect, sense, measure, and/or determine) one or more aspects of the component, such as voltage, current, temperature or other operating parameters that constitute status information (or can be used to determine status information by, e.g., LCD 114).

Additional energy sources 206 can be applied to module 108D of FIG. 11F as needed. For example, additional energy sources 206 can be placed in parallel or series with that shown in FIG. 11F. Alternatively or additionally, an additional AC-DC converter 1116-2, buffer 204, and source 206, can be connected to transformer 1130. Multiple sets of these components can be connected to transformer 1130.

FIG. 11G is a schematic view depicting an embodiment of module 108D of FIG. 11F. The operation of the majority of these components has already been described and is not repeated herein. In this embodiment, the core of transformer 1130 includes connections to three separate windings, each connected to one of converters 1104, 1116-1, and 1116-2. Transformer 1130 and converters 1104 and 1116 can alternatively be implemented as push-pull converters, or a combination of full bridges and push-pull converters.

FIG. 11H is a block diagram depicting an example embodiment of a converter module 108D. This embodiment is similar to module 108D of FIG. 11F, but includes multiple DC interfaces. A first DC interface includes ports 7 and 8 for connection to a DC bus. A second DC interface includes ports 9 and 10 for connecting to PV source 1101. A third DC interface includes ports 11 and 12 configured to connect to fuel cell 1111.

Module 108D also includes DC-AC converters 1104 connected to the DC bus and to PV source 1101 and fuel cell 1111. Ports 7 and 8 can be coupled to a DC bus, e.g., a high voltage DC bus, that supplies DC power from ports 7 and 8 to one or more DC loads, e.g., EVs connected to an EV charging station. DC-AC converter 1104-1 can convert an AC signal from transformer 1130 to a DC voltage provided to the DC bus. DC-AC converter 1104-1 can also operate in reverse, converting a DC signal of the DC bus to an AC signal that is applied to transformer 1130, in which case DC power is received at ports 7 and 8 and transferred to one or more of power interface 110, energy source 206, and/or fuel cell 1111 (if configured as a rechargeable fuel cell).

DC-AC converter 1104-2 is connected between transformer 1130 and PV source 1101 via ports 9 and 10. DC-AC converter 1104-2 can convert a DC signal from PV source 1101 to an AC signal that is applied to transformer 1130.

DC-AC converter 1104-3 is connected between transformer 1130 and a fuel cell 1111 via ports 11 and 12. DC-AC converter 1104-2 can convert a DC signal from fuel cell 1111 to an AC signal that is applied to transformer 1130.

Module 108D can include other DC sources (e.g., other PV sources, other fuel cell sources, battery sources, HED capacitor sources, etc.) coupled to transformer 1130 using DC-AC converters 104, e.g., one or more additional PV sources 1101 or fuel cells 1111. In some embodiments, one or more of DC-AC converters 1104 can be omitted. For example, an embodiment can include DC-AC converter 1104-1 connected to the DC bus and DC-AC converter 1104-2 connected to PV source 1101, but without DC-AC converter 1104-3 connected to fuel cell 1111. Each DC-AC converter 1104 can be coupled to a separate winding of transformer 1130. To accommodate additional DC interfaces and/or AC interfaces, additional windings can also be used.

Transformer 1130 can modify the AC voltage provided by DC-AC converters 1104, to a lower or higher voltage, and output that modified AC voltage to AC-DC converters 1116. AC-DC converters 1116-1 and 116-2 can operate as described herein, e.g., with reference to FIG. 11H. Flux supplied by the various energy sources 1101, 1111, 110, 206, and the DC bus can be transferred to transformer 1130 and selectively removed from transformer 1130 by AC-DC converters 1116 for output from power connection 110 or for charging of source 206.

This example embodiment enables the DC bus, PV source 1101, fuel cell 1111, or an AC source connected to converter 202A to charge source 206. Source 206 can then be discharged, converted to an AC signal by AC-DC converter 1116-2 and applied to transformer 1130. Transformer 1130 can modify the AC voltage (to a higher or lower voltage) and DC-AC converter 1104-1 can convert the modified AC voltage to a DC signal for powering loads of the DC bus.

Transformer 1130 can thus act as an energy hub where each entity (e.g., external DC bus, PV source 1101, fuel cell 1111, interface 110, or energy source 206) can independently receive energy from the hub or provide energy to the hub according to the state of that entity and the system. For example, when PV source 1101 is producing energy, that energy can be placed on transformer 1130 in the form of flux and extracted by converter 1116-2 and routed to source 206 for storage, extracted by converter 1116-1 and routed to interface 110, and/or extracted by converter 1104-1 and routed to the external DC bus, each of which can occur at separate times or concurrently. Fuel cell 1111 can supply energy to transformer 1130 like PV source 1101, which can then be extracted in the same fashion by the other converters 1116 and/or 1104-1 at different times or concurrently. Similarly, energy can be provided by the external DC bus and routed to source 206 and/or interface 110 at separate times or concurrently. Still further, energy can be provided by interface 110 and routed to source 206 and/or the external DC bus at separate times or concurrently. The provision of energy to the hub and removal of energy from the hub is managed by control system 102, such as by MCD 112 providing instructions to LCD 114 of each particular module 102D, where LCD 114 then generates the control signals for the power electronics (e.g., MOSFETs, IGBTs, GaN devices) within each DC-AC converter 1104 and AC-DC converter 1116 of the module 102D. Control system 102 can monitor and/or estimate the energy flows input and output from transformer 1130 to ensure they are equal or substantially equal.

Figure 11I:
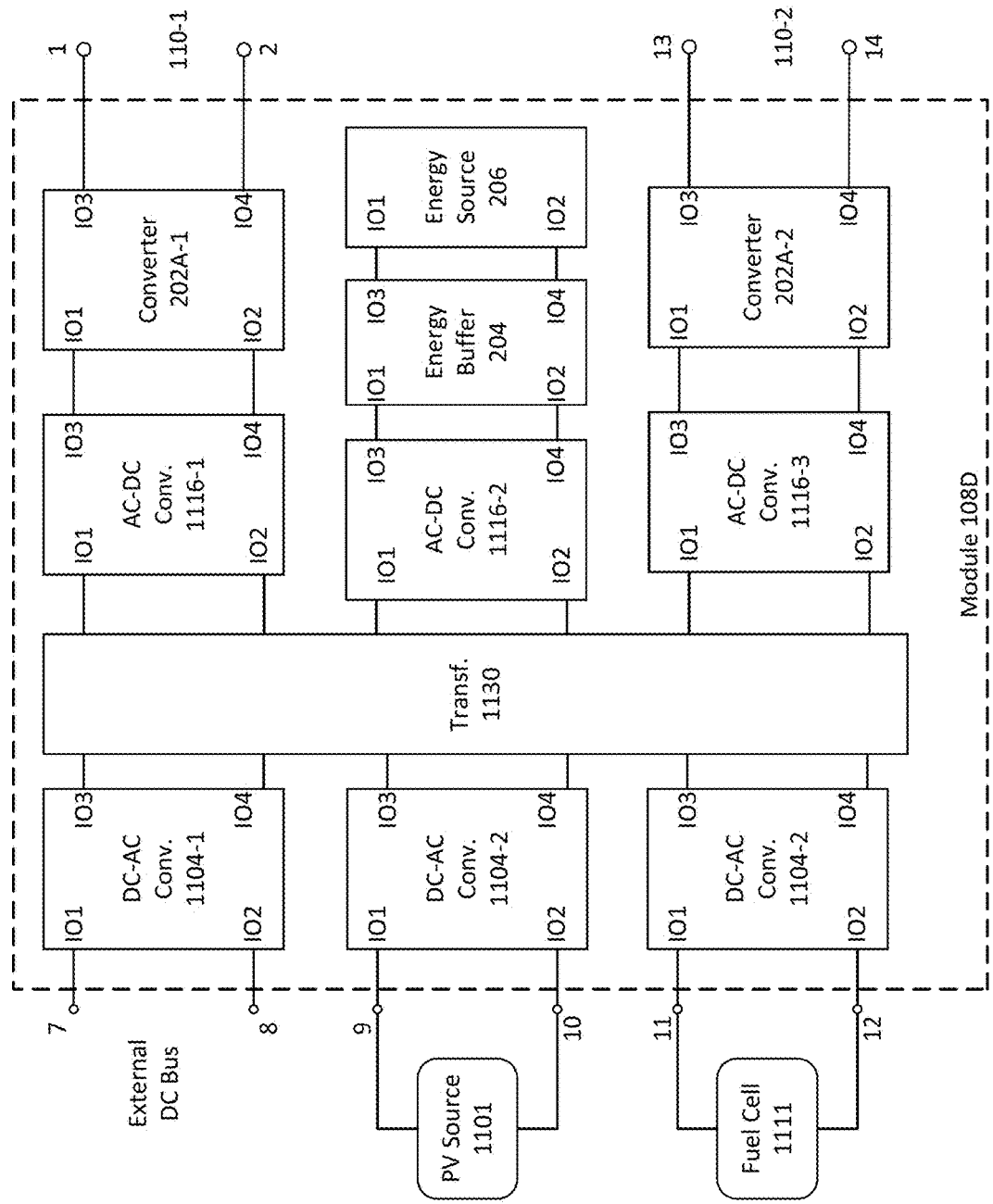
FIG. 11I is a block diagram depicting an example embodiment of a converter module.

FIG. 11I is a block diagram depicting an example embodiment of a converter module 108D. This embodiment is similar to module 108D of FIG. 11H, but includes multiple AC interfaces 110. A first AC interface includes ports 1 and 2 and power connection 110-1. A second AC interface includes ports 13 and 14 can power connection 110-2.

A first AC-DC converter 1116-1 is connected between transformer 1130 and converter 202A. As described with reference to FIG. 11F, AC-DC converter 1116-1 can convert an AC signal from transformer 1130 to a DC voltage provided to converter 202A-1, which can then convert the DC voltage to an AC signal output to power connection 110-1 over ports 1 and 2. A third AC-DC converter 1116-3 is connected between transformer 1130 and converter 202A-2. AC-DC converter 1116-3 can convert an AC signal from transformer 1130 to a DC voltage provided to converter 202A-3, which can then convert the DC voltage to an AC signal output to power connection 110-3 over ports 1 and 2.

AC-DC converters 1116-1 and 1116-3 can also operate in reverse. AC-DC converter 1116-1 can convert a DC signal from converter 202A-1 to an AC signal that is applied to transformer 1130. Similarly, AC-DC converter 1116-3 can convert a DC signal from converter 202A-3 to an AC signal that is applied to transformer 1130.

This example embodiment enables module 108D to supply AC power to and/or receive AC power from two power connections 110. Module 108D can be connected to two AC buses. For example, power connection 110-1 can be coupled to a first AC bus using ports 1 and 2 and power connection 110-2 can be coupled to a second AC bus different from the first bus using ports 13 and 14. Each AC bus can be connected to a different AC source or AC load. For example, one AC bus can be connected to a grid and the other AC bus can be connected to a different AC source, e.g., a wind source 1112 (e.g., as depicted in FIG. 12K). In another example, one AC bus can be connected to a grid and the other AC bus can be connected to a load.

Although this example includes AC-DC converters 1116-1 and 1116-3 and converters 202A-1 and 202A-2 for supplying AC power to and/or receiving AC power from two power connections 110, module 108D can include more than two power connections and corresponding AC-DC converters 1116-1 and 1116-3 to connect to more than two power connections 110. Other modules 108D described herein can also include two or more of the same or similar AC interfaces for connecting to two or more power connections 110.

Figure 11J:
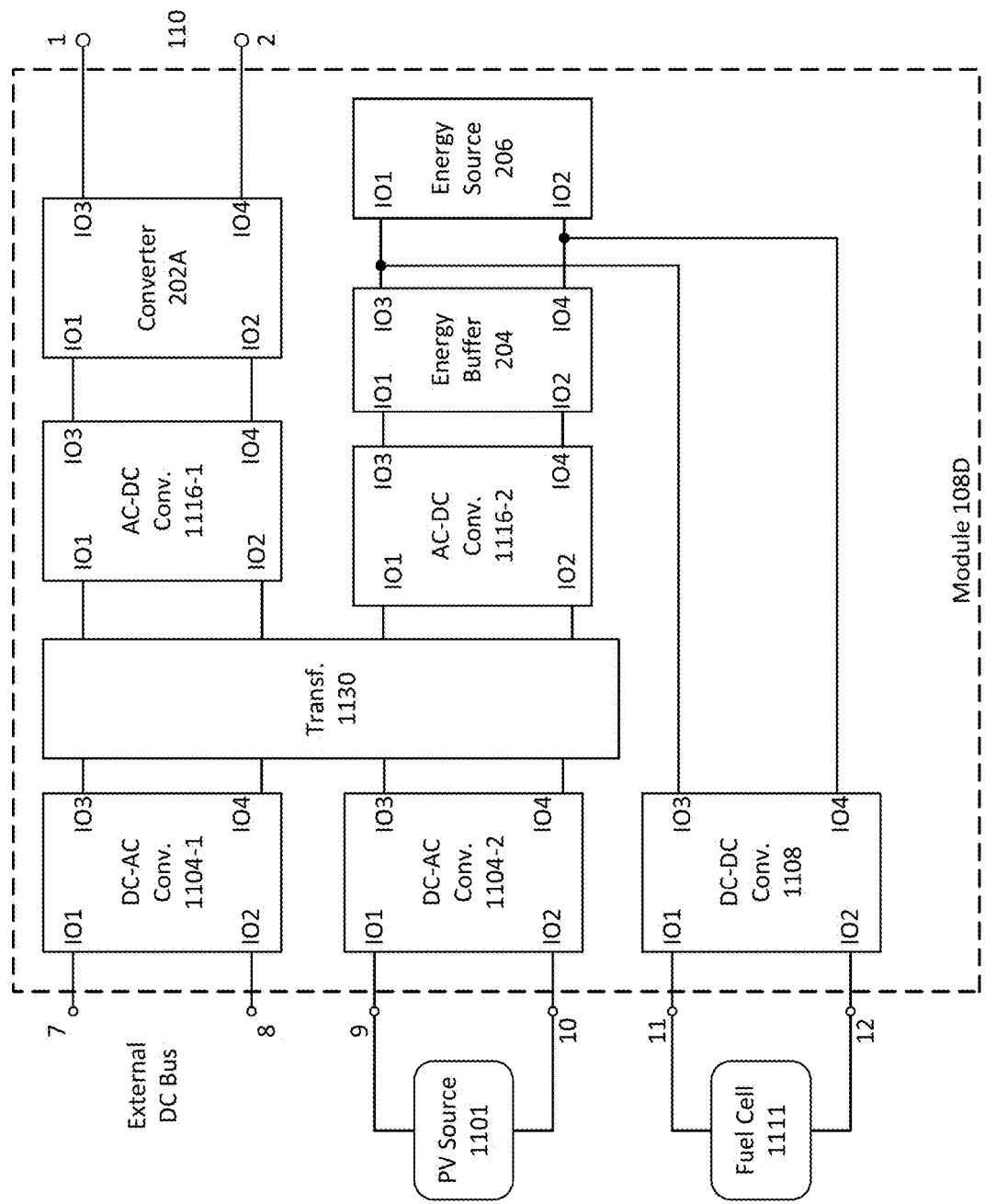
FIG. 11J is a block diagram depicting an example embodiment of a converter module.

FIG. 11J is a block diagram depicting another example embodiment of a converter module 108D. This embodiment is similar to module 108D of FIG. 11H, except fuel cell 1111 is connected to energy source 206 by way of a DC-DC converter 1108 that does not include a transformer, and the electrical path between fuel cell 1111 and source 206 does not traverse any transformer (e.g., 1130). Such a configuration can be used in instances where electrical isolation is not required between fuel cell 1111 and source 206. Energy can be supplied by fuel cell 1111 and can flow into source 206 to charge source 206, and/or can flow to transformer 1130 to be directed to another element of the module 108D or system as desired based on the current state of operation. Such transformer-less connections can be used between other elements of modules 108D (e.g., between two sources 206) in instances where isolation is similarly not necessary.

Any and all of the configurations of system 100 described herein can be configured to receive energy from one or more PV sources 1101 using modules having a DC interface, such as the embodiments of module 108D just described. System 100 can be configured with a single array 700 or multiple arrays 700, each having any number of two or more modules 108D, and those one or more arrays 700 can be electrically connected to a load and/or a grid. Each module 108D of a single array 700 can be integrated with and electrically connected to a different PV source 1101 and can be configured to receive energy from that dedicated PV source 1101. Alternatively, or additionally, each module 108D of a single array 700 can be electrically connected to the same PV source 1101 and configured to receive energy over a common DC bus connected to that PV source 1101. In embodiments with multiple arrays 700, all arrays 700 of system 100 can be electrically connected to and receive energy from the same single PV source 1101, or each array 700 of system 100 can be electrically connected to and receive energy from a different PV source 1101. Still further, array 700 of a system 100 can be mixed such that one or more arrays 700 are connected to a single PV source 1101 over a DC bus, while one or more other arrays 700 have modules 108D that are each independently connected to a dedicated PV source 1101.

Figure 12A:
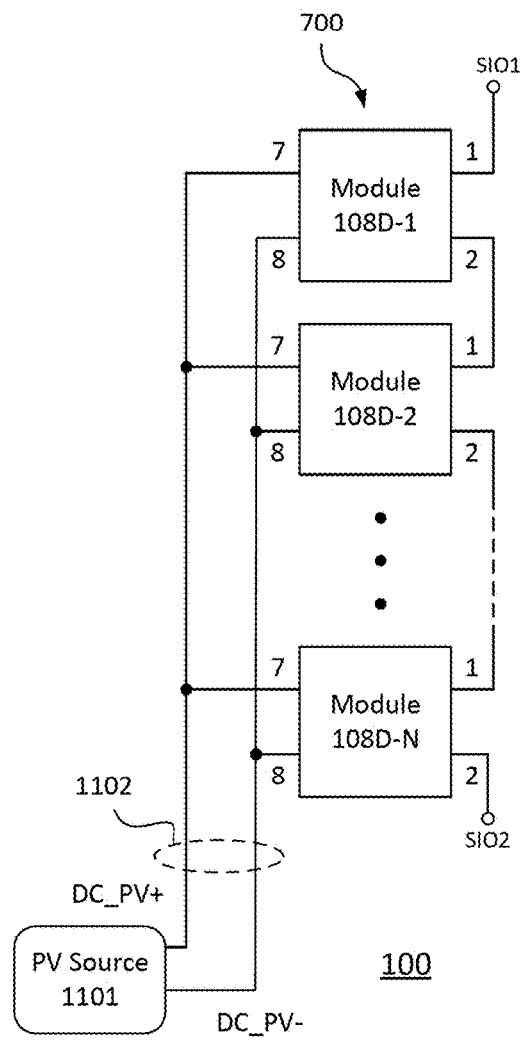
FIGS. 12A-12B are block diagrams depicting example embodiments of energy systems that include an array of converter modules connected to one or more photovoltaic sources.

FIG. 12A is a block diagram depicting an array 700 of modules 108D-1 through 108D-N with AC interfaces at ports 1 and 2 connected in a cascaded configuration. A single PV source 1101 is connected to all of the modules of array 700 over common DC bus 1102 such that modules 108D-1 through 108D-N are in parallel on the DC side. PV source 1101 can output its generated DC voltage signals DC_PV+ and DC_PV− over bus 1102 to ports 7 and 8, respectively, of each module 108D. As used herein, DC bus 1102 can refer to a common bus shared by some or all modules 108D (as shown here) or can refer to the separate connections of ports 7 and 8 between modules 108D on the DC side (e.g., as shown in FIGS. 12I-12N).

Figure 12B:
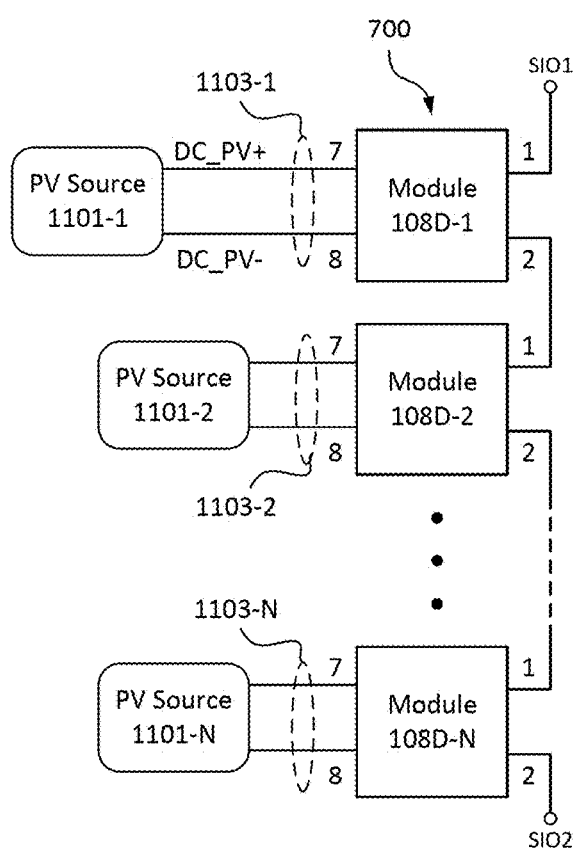

FIG. 12B is a block diagram depicting an array 700 of modules 108D-1 through 108D-N with AC interfaces at ports 1 and 2 connected in a cascaded configuration. Each module 108D-1 through 108D-N is independently connected to its own dedicated PV source 1101-1 through 1101-N over a dedicated DC bus 1103-1 through 1103-N, respectively. Each PV source 1101-1 through 1101-N can output its own independent generated DC voltage signals DC_PV+ and DC_PV− over the dedicated buses 1103-1 through 1103-N to ports 7 and 8 of each module 108D-1 through 108D-N.

Figure 12C:
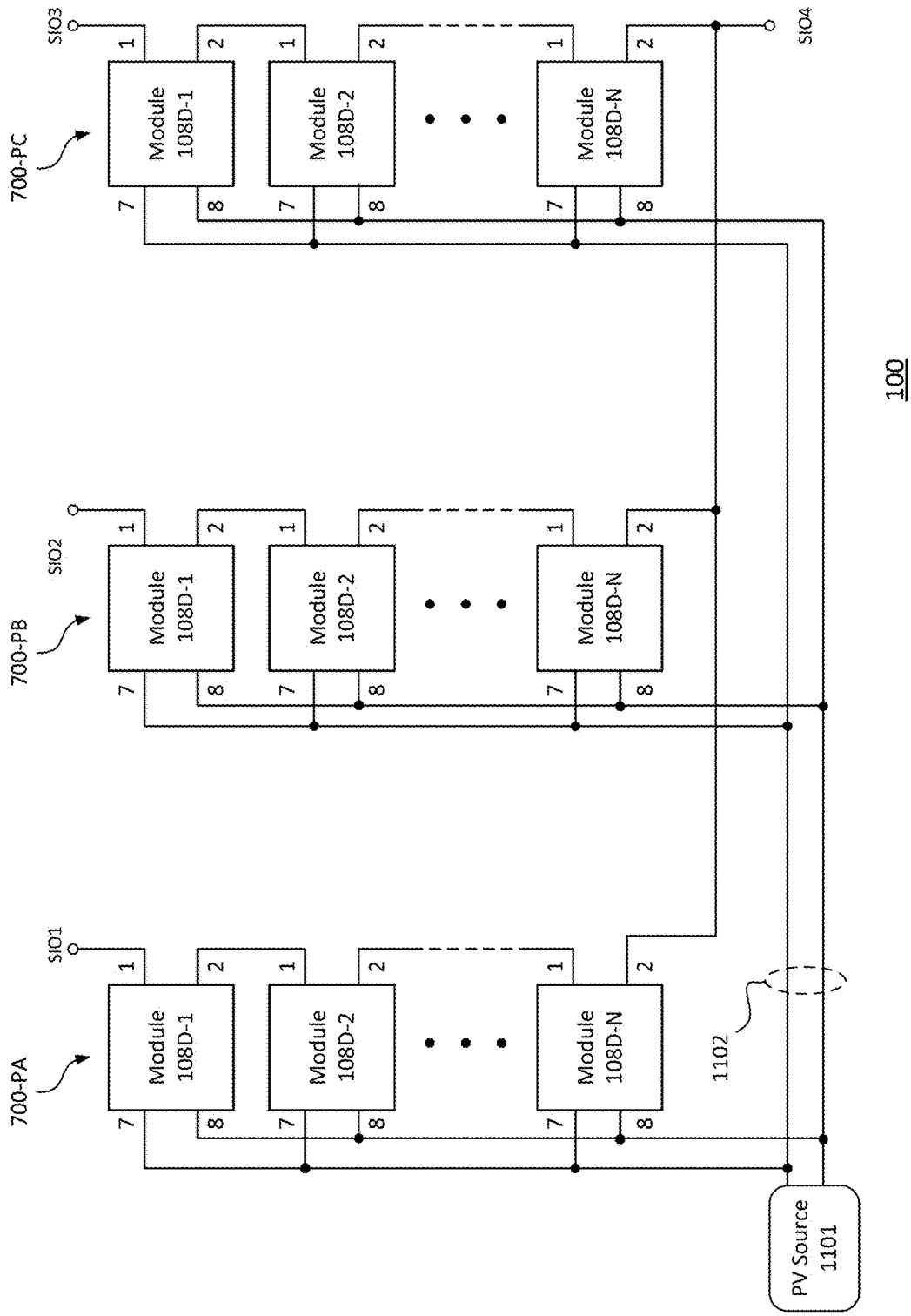
FIGS. 12C-12F are block diagrams depicting example embodiments of energy systems having multiple arrays of converter modules connected to one or more photovoltaic sources.

FIG. 12C is a block diagram depicting an example multiphase embodiment of system 100, where three arrays 700-PA, 700-PB, and 700-PC each include modules 108D-1 through 108D-N with AC interfaces at ports 1 and 2 connected in a cascaded configuration. Each of the arrays 700 is connected to the same PV source 1101 over common DC bus 1102.

Figure 12D:
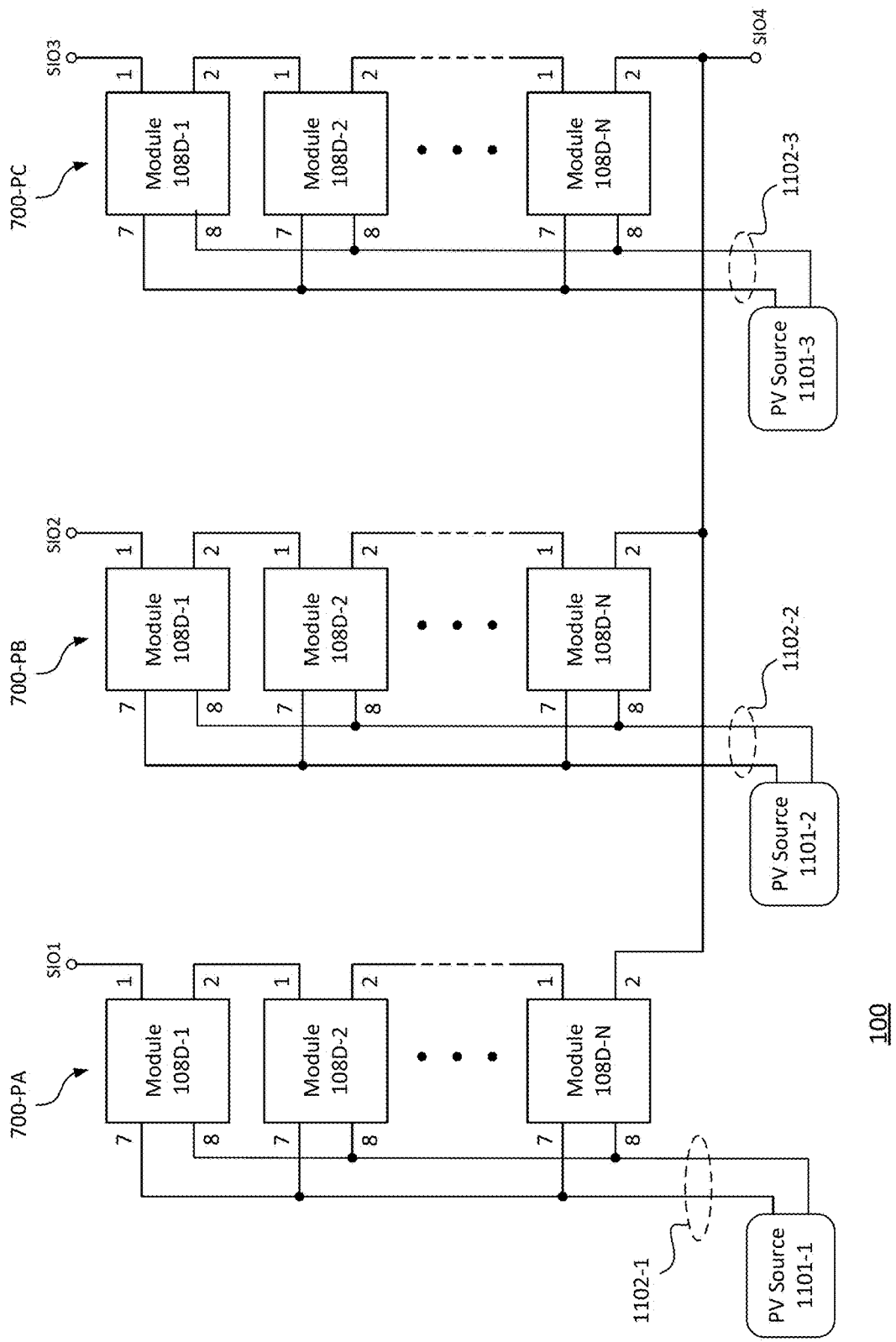

FIG. 12D is a block diagram depicting an example multiphase embodiment of system 100, where three arrays 700-PA, 700-PB, and 700-PC each include modules 108D-1 through 108D-N with AC interfaces at ports 1 and 2 connected in a cascaded configuration. Each of the arrays 700-PA, 700-PB, and 700-PC is connected to a different PV source 1101-1 through 1101-3 over different DC buses 1102-1 through 1102-3, respectively.

Figure 12E:
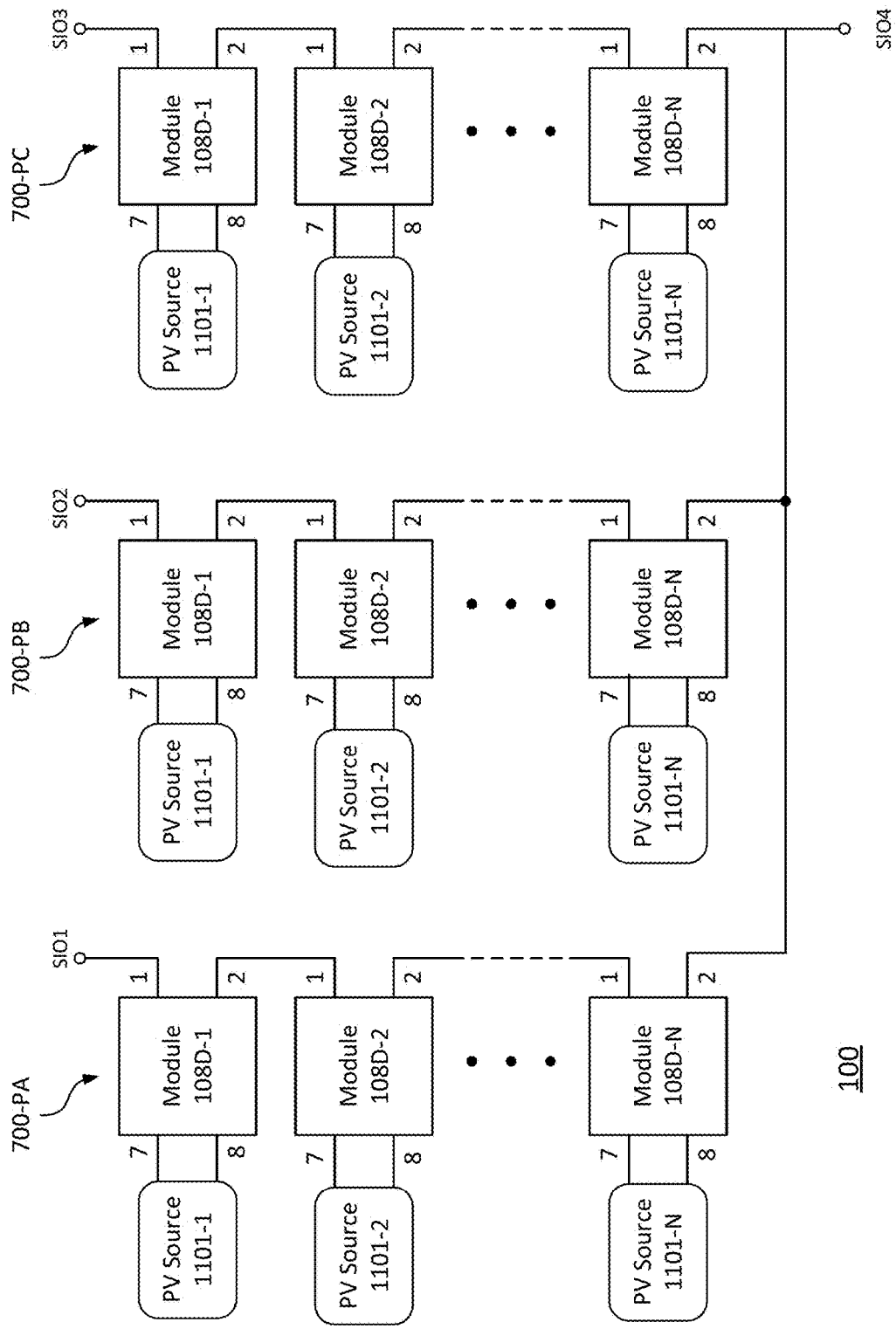

FIG. 12E is a block diagram depicting an example multiphase embodiment of system 100, where three arrays 700-PA, 700-PB, and 700-PC each include modules 108D-1 through 108D-N with AC interfaces at ports 1 and 2 connected in a cascaded configuration. Each of modules 108D-1 through 108D-N is connected to its own dedicated PV source 1101-1 through 1101-N, respectively, such that all modules 108D of system 100 are connected to a different PV source 1101.

Figure 12F:
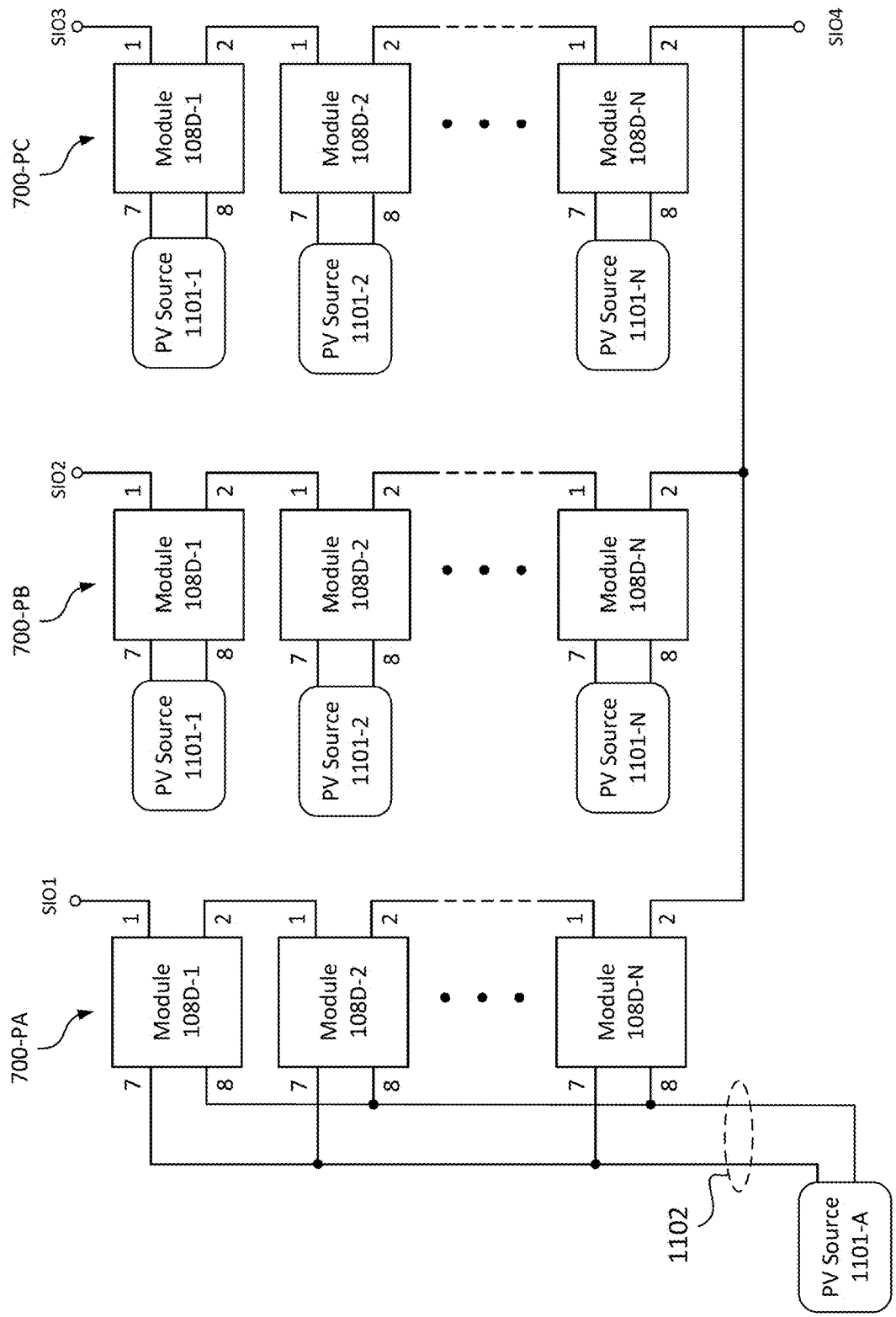

FIG. 12F is a block diagram depicting an example multiphase embodiment of system 100, where three arrays 700-PA, 700-PB, and 700-PC each include modules 108D-1 through 108D-N with AC interfaces at ports 1 and 2 connected in a cascaded configuration. This embodiment is arranged as a mix of the configurations of FIGS. 12A and 12B. Here, the modules 108D of array 700-PA are connected to PV source 1101-A over a DC bus 1102. The modules 108D-1 through 108D-N of the arrays 700-PB and 700-PC are each connected to a different PV source 1101-1 through 1101-N, respectively.

Figures 12G, 12H:
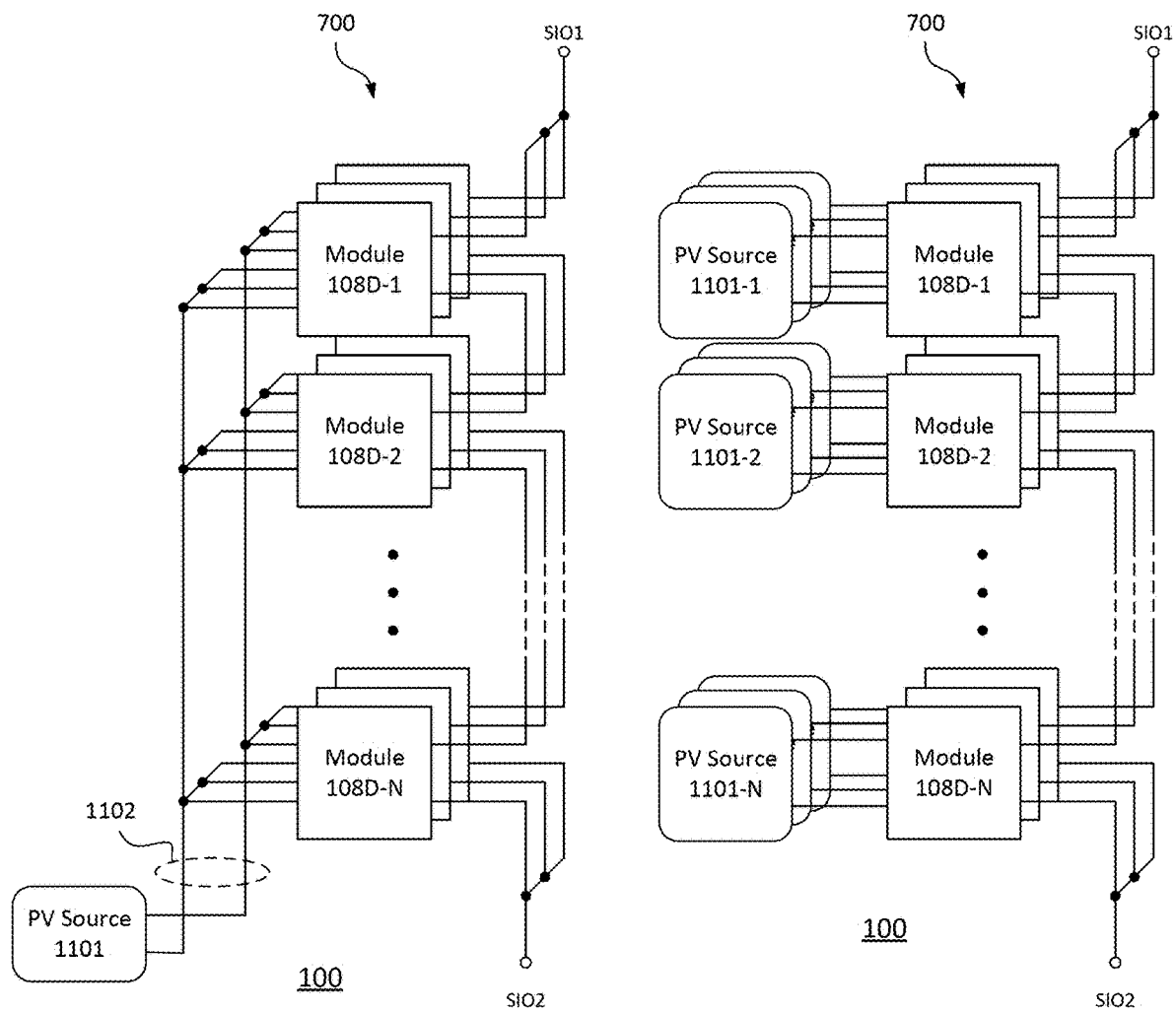
FIGS. 12G-12H are block diagrams depicting example embodiments of energy systems having arrays of converter modules connected in parallel and to one or more photovoltaic sources.

The embodiments of FIGS. 12A-12F can each be scaled with one or more energy sources 206 per module 108D to provide a highly flexible arrangement for interfacing with any number of different PV source configurations. In addition to scaling the number of sources 206 per module 108D, arrays 700 can be connected together in parallel. FIGS. 12G and 12H are block diagrams depicting example embodiments where multiple instances of the arrays 700 described with respect to FIGS. 12A and 12B, respectively, are connected in parallel. In FIG. 12G, the respective DC ports of each module are connected to the appropriate DC bus line 1102 from PV source 1101. On the AC side, each of modules 108D-1 (port 1) are connected to a common node at SIO1, while each of modules 108D-N (port 2) are connected to a common node at SIO2, to place multiple arrays 700 in parallel.

Figure 12I:
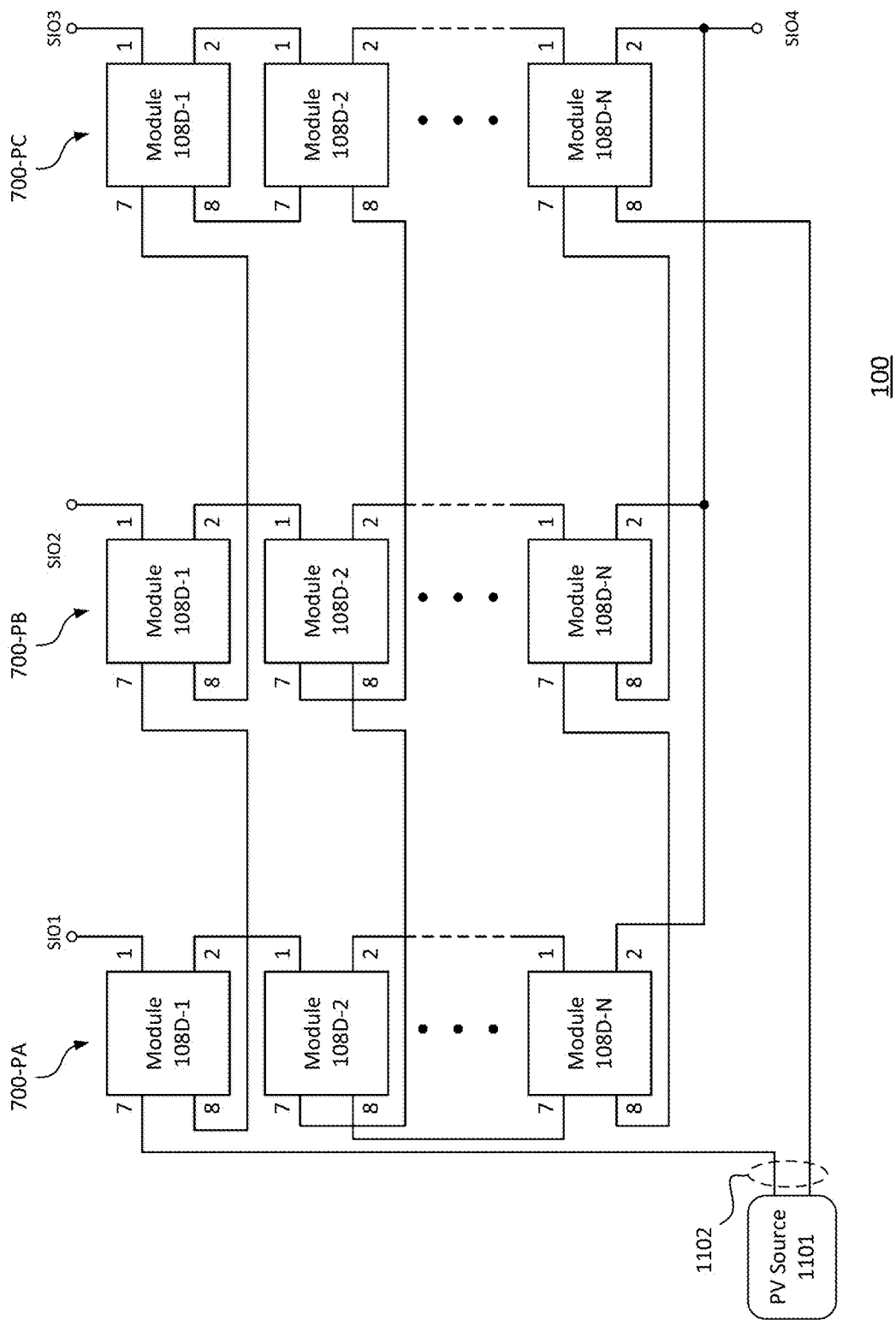
FIGS. 12I-12J are block diagrams depicting example embodiments of energy systems having multiple arrays of converter modules connected to a photovoltaic source.

FIG. 12I is a block diagram depicting an example multiphase embodiment of system 100, where three arrays 700-PA, 700-PB, and 700-PC each include modules 108D-1 through 108D-N with AC interfaces at ports 1 and 2 connected in a cascaded configuration. This embodiment is similar to the configuration of FIG. 12C, but with the DC interface connections at ports 7 and 8 between modules 108D of arrays 700-PA, 700-PB, and 700-PC being connected in a single continuous daisy chain arrangement rather than in parallel.

In this daisy chain arrangement, the DC interfaces of modules 108D of each array 700 are connected in series by generally connecting port 8 of one module 108D to port 7 of another module 108D, and so forth across all modules except for those at the series terminations (module 108D-1 of array 700-PA and module 108D-N of array 700-PC), which enables the modules 108D to receive energy from PV source 1101 in a controllable fashion.

Figure 12J:
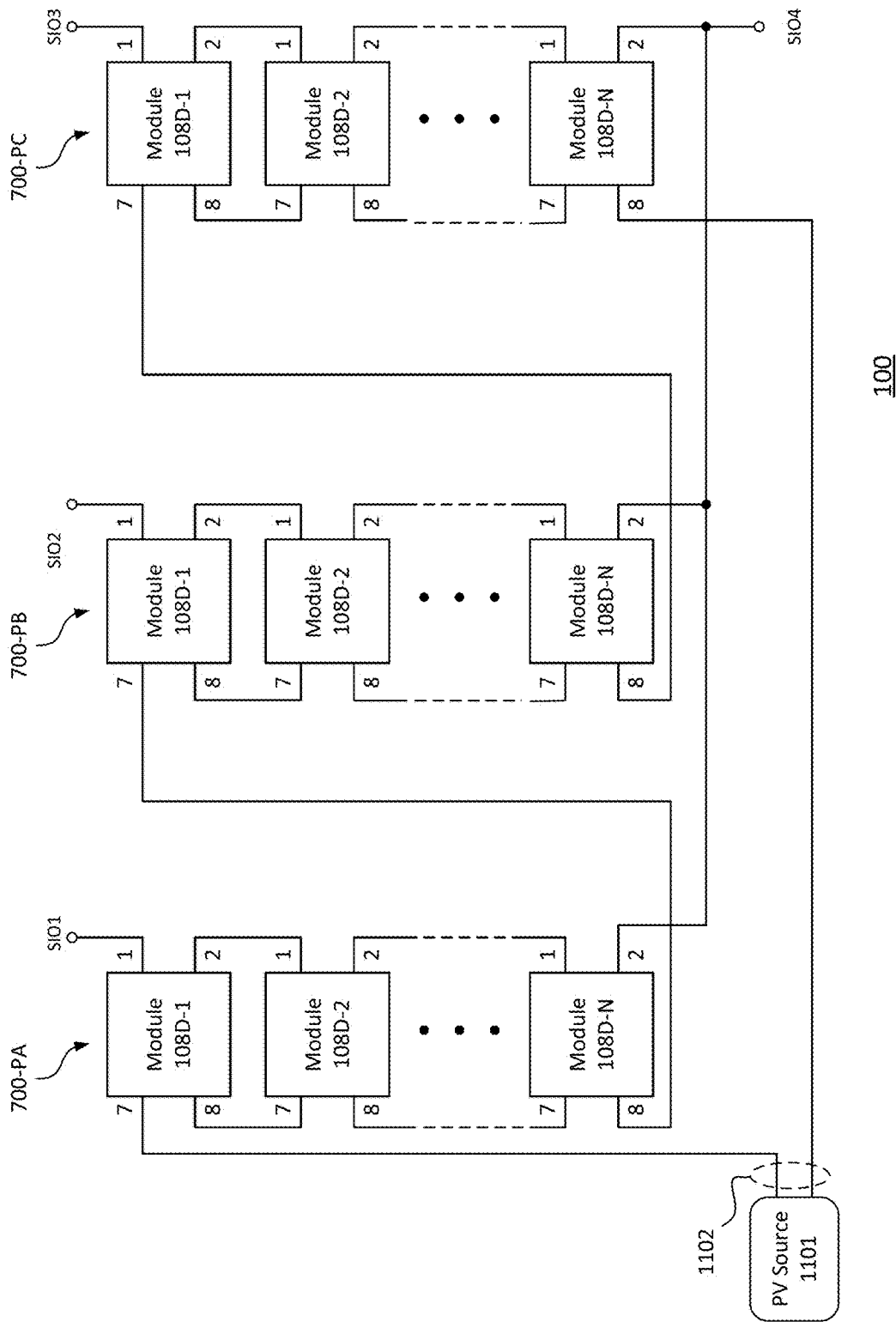
Figure 12K:
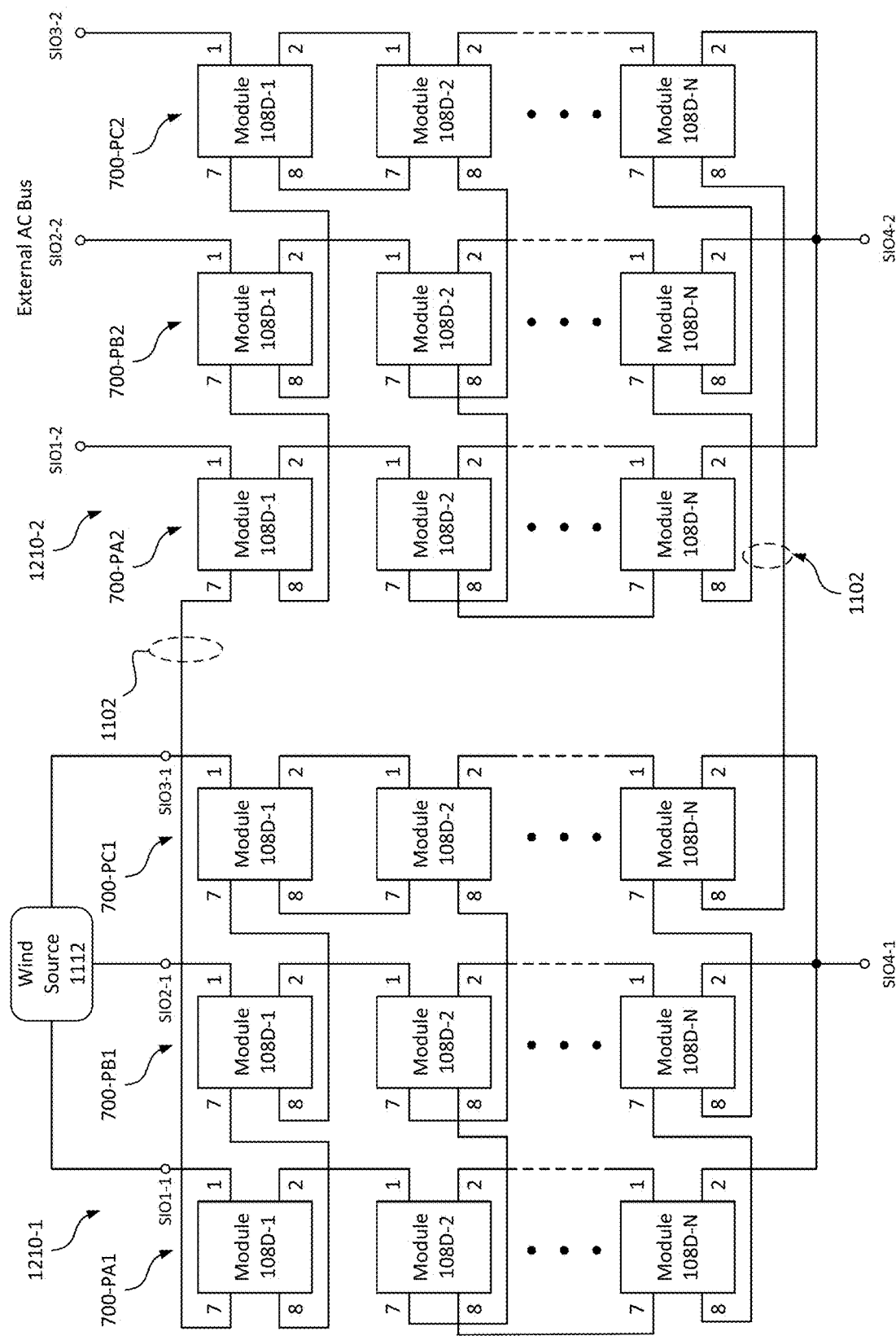
FIGS. 12K-12N are block diagrams depicting example embodiments of energy systems having multiple arrays of converter modules connected to one or more wind turbines.

In this embodiment, the DC interface of each module 108D is connected in series from one module to the next across the same level of each array 700 before transitioning to the next level, e.g., module 108D-1 of array 700-PA is connected to module 108D-1 of array 700-PB, which is connected to module 108D-1 of array 700-PC, which is then connected to module 108D-2 of array 700-PC, which is then connected to module 108D-2 of array 700-PB, and so forth until all modules 108D all connected in the daisy chain. An alternative embodiment is depicted in FIG. 12J, where each module 108D of a particular array 700 is connected before the daisy chain proceeds to the next array, e.g., module 108D-1 of array 700-PA is connected to module 108D-2 of array 700-PA and the connections proceed in series to module 108D-N of array 700-PA, before proceeding directly to module 108D-1 of array 700-PB, and so forth until all modules 108D are connected.

FIG. 12K is a block diagram depicting an example multiphase embodiment of system 100 that includes multiple instances (e.g., groups) of arrays 700 and a renewable AC source, which in this embodiment is a wind energy source 1112. Other AC sources can be used alternatively. A first instance 1210-1 includes three arrays 700-PA1, 700-PB1, and 700-PC1 that each include modules 108D-1 through 108D-N with AC interfaces (ports 1 and 2) connected in a cascaded configuration. A second instance 1210-2 includes three arrays 700-PA2, 700-PB2, and 700-PC2 that each include modules 108D-1 through 108D-N with AC interfaces (ports 1 and 2) connected in a cascaded configuration.

The AC side (e.g., the AC interface of each module) of instance 1210-1 is coupled to wind source 1112 via ports SIO1-1, SIO2-1, and SIO3-1. Port 1 of module 108D-1 of array 700-PA1 is connected to port SIO1-1, port 1 of module 108D-1 of array 700-PB1 is connected to port SIO2-1, and port 1 of module 108D-1 of array 700-PC1 is connected to port SIO3-1. Each array 700-PA1, 700-PB1, and 700-PC1 is connected to a different phase of wind source 1112.

The AC side of instance 1210-2 is coupled to an AC bus via ports SIO1-2, SIO2-2, and SIO3-2. Port 1 of module 108D-1 of array 700-PA2 is connected to port SIO1-2, port 1 of module 108D-1 of array 700-PB2 is connected to port SIO2-2, and port 1 of module 108D-1 of array 700-PC2 is connected to port SIO3-2. Each array 700-PA3, 700-PB3, and 700-PC3 is connected to a different phase of the AC bus.

The DC interfaces of modules 108D of each instances 1210-1 and 1210-2 are connected in a daisy chain arrangement via DC bus 1102, placing the DC interfaces of all modules 108D of instance 1210-1 in series and the DC interfaces of all modules 108D of instance 1210-2 in series. Each series chain of the two instances 1210-1 and 1210-2 are in parallel on the DC side. For example, port 7 of module 108D-1 of array 700-PA1 is connected to port 7 of module 108D-1 of array 700-PA2 and port 8 of module 108D-N of array 700-PC1 is connected to port 8 of module 108D-N of array 700-PC2. This configuration enables all modules 108D of both instances 1210 within system 100 to exchange energy with all other modules.

This embodiment enables various charging configurations using two different AC sources, e.g., wind source 1112 or a grid connected to ports SIO1-2, SIO2-2, and SIO3-2. In one configuration, modules 108D of instance 1210-1 can be charged by wind source 1112 and modules 108D of instance 1210-2 can be charged by the grid. Modules 108D of both instances 1210-1 and 1210-2 can be charged simultaneously by their respective AC sources.

In another configuration, modules 108D of both instances 1210-1 and 1210-2 can be charged by wind source 1112. Using DC bus 1102 to transfer energy from modules 108D of instance 1210-1 to modules 108D of instance 1210-2, modules 108D of instance 1210-2 can also be charged by wind source 1112-2.

In another configuration, modules 108D of both instances 1210-1 and 1210-2 can be charged by the grid. Using the DC bus 1102 to transfer energy from modules 108D of instance 1210-2 to modules 108D of instance 1210-1, modules 108D of instance 1210-1 can also be charged by the grid.

Thus, this embodiment provides flexibility in charging modules 108D of multiple instances 1210. This configuration can be expanded to more than two instances and more than two AC sources. Daisy chaining the DC interfaces of modules 108D of each instance 1210 enables each AC source to charge modules 108D of each instance 1210.

Figure 12L:
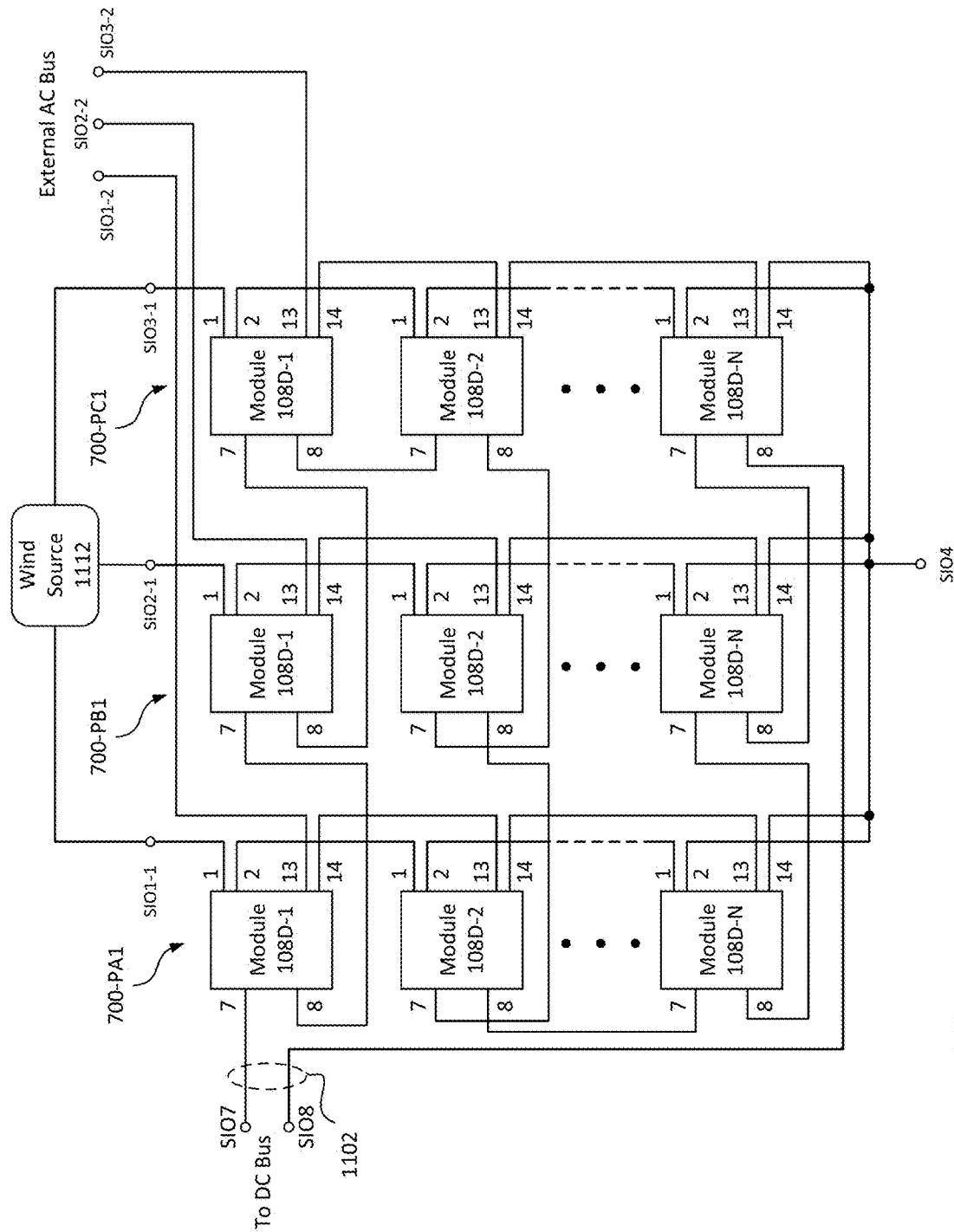

FIG. 12L is a block diagram depicting an example multiphase embodiment of system 100 that includes arrays 700 and wind source 1112. Each array 700-PA, 700-PB, and 700-PC includes modules 108D-1 through 108D-N connected in a cascaded configuration.

Here, each module 108D includes two AC interfaces, a first AC interface that includes ports 1 and 2 and a second interface that includes ports 13 and 14. For example, modules 108D can be implemented using module 108D of FIG. 11I.

The first interface of modules 108D-1 of arrays 700-PA1, 700-PB1, and 700-PC1 are coupled to wind source 1112 via ports SIO1-1, SIO2-1, and SIO3-1, respectively. The second interface of modules 108D-1 are connected to an AC bus (e.g., that is connected to a grid) via ports SIO1-1, SIO2-1, and SIO3-1, respectively.

The DC interfaces of modules 108D of each array 700 are connected in a daisy chain arrangement via DC bus 1102, placing the DC interfaces in series. This enables modules 108D to exchange energy, as described with reference to FIG. 12I.

This embodiment enables modules 108D of arrays 700-PA1, 700-PB1, and 700-PC1 to be charged by wind source 1112 and/or a grid (or other AC source) connected to the AC bus. For example, control system 102 can operate converter 202A-1 of each module 108D to charge source 206 of its module 108D using an AC signal at ports 1 and 2. Similarly, control system 102 can operate converter 202A-2 of each module 108D to charge source 206 of its module 108D using an AC signal at ports 13 and 14.

In this embodiment, DC bus 1102 is connected to an external DC bus via 10 ports SIO7 and SIO8. This external DC bus can be used to supply power to a DC load or to receive power from a DC energy provider like PV source 1101. For example, the external DC bus can include or be connected to a charging interface for charging EVs. Each of embodiments described with respect to FIGS. 12I-12N can be configured with or without an interface of ports SIO7 and SIO8 for connection to an external DC bus, depending on the needs of the implementation.

Figure 12M:
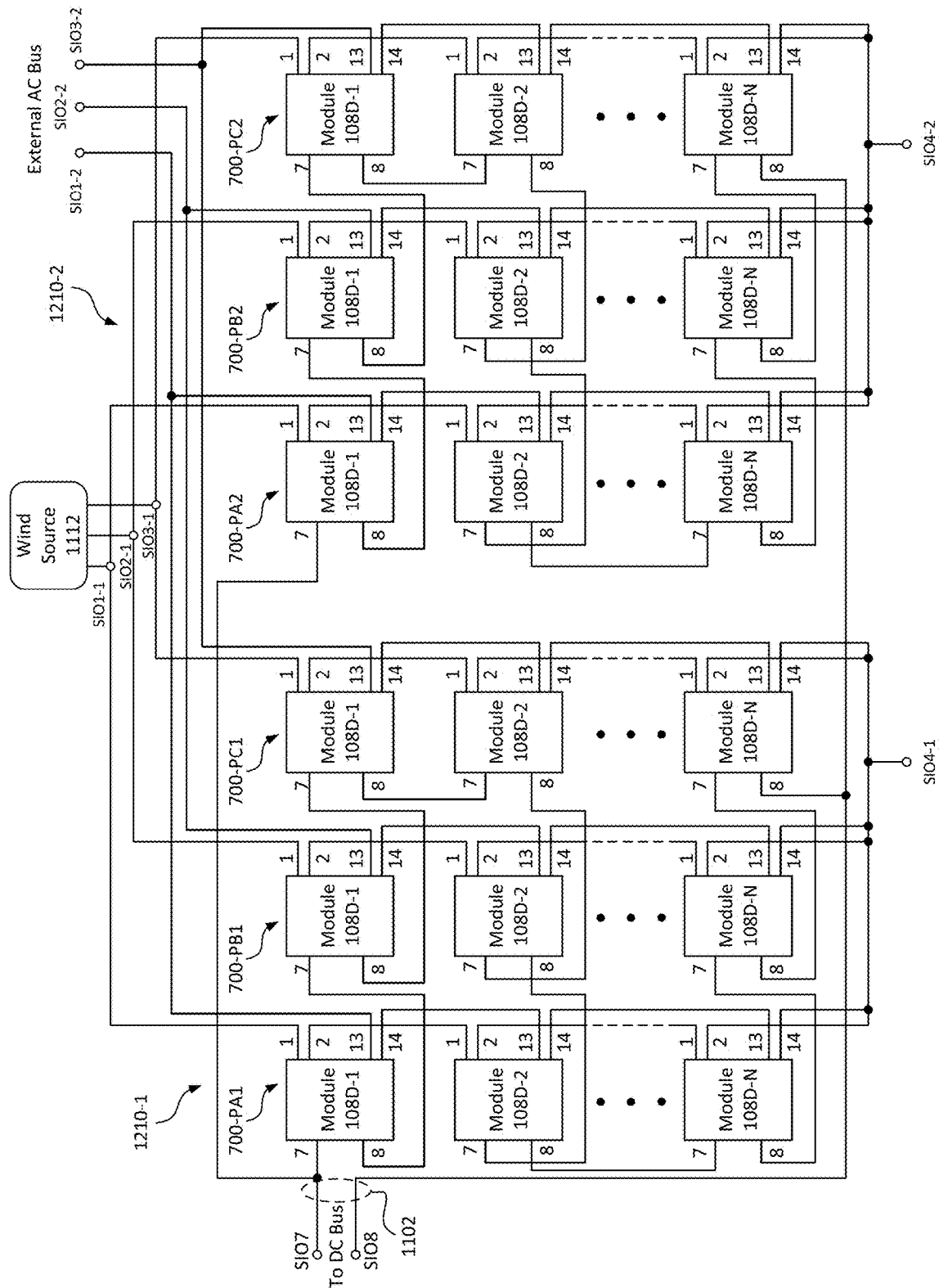

FIG. 12M is a block diagram depicting an example multiphase embodiment of system 100 that includes multiple instances 1210-1 and 1210-2 of arrays 700 and wind source 1112. Instance 1210-1 includes arrays 700-PA1, 700-PB1, and 700-PC1 and instance 1210-2 includes arrays 700-PA2, 700-PB2, and 700-PC2. Each instance 1210-1 and 1210-2 can be that of, or similar to, the arrangement of arrays 700 of FIG. 12I.

Each module 108D includes two AC interfaces, with one being connected to wind source 1112 and one being connected to an AC bus, e.g., a grid. In this example, the AC sides of instances 1210-1 and 1210-2 are connected to wind source 1112 and the AC bus in parallel.

In particular, a first AC interface of module 108D-1 of array 700-PA1 and a first AC interface of module 108D-1 of array 700-PA2 are coupled to wind source 1112 via port SIO1-1. A second AC interface of module 108D-1 of array 700-PB1 and a first AC interface of module 108D-1 of array 700-PB2 are coupled to wind source 1112 via port SIO2-1. A first AC interface of module 108D-1 of array 700-PC1 and a first AC interface of module 108D-1 of array 700-PC2 are coupled to wind source 1112 via port SIO3-1.

Similarly, a second AC interface of module 108D-1 of array 700-PA1 and a first AC interface of module 108D-1 of array 700-PA2 are coupled to the AC bus via port SIO1-2. A second AC interface of module 108D-1 of array 700-PB1 and a second AC interface of module 108D-1 of array 700-PB2 are coupled to the AC bus via port SIO2-2. A second AC interface of module 108D-1 of array 700-PC1 and a second AC interface of module 108D-1 of array 700-PC2 are coupled to the AC bus via port SIO3-2.

The DC interfaces (ports 7 and 8) of modules 108D of instance 1210-1 are connected in a series chain arrangement, as are the DC interfaces of modules 108D of instance 1210-2. The two series chains are in parallel, similar to the embodiment of FIG. 12K. This configuration enables modules 108D of both instances to exchange energy, as described with reference to FIG. 12I.

Similar to the embodiment of FIG. 12K, this embodiment enables various charging configurations using two different AC sources, e.g., wind source 1112 or a grid connected to ports SIO1-2, SIO2-2, and SIO3-2. In this example, each module 108D of each instance 1210 can be charged from either AC source directly (e.g., without use of the DC interfaces of modules 108D).

In one configuration, modules 108D of instance 1210-1 can be charged by wind source 1112 using the first AC interface of each module 108D and modules 108D of instance 1210-2 can be charged by the grid using the second AC interface of each module 108D. In another configuration, modules 108D of instance 1210-1 can be charged by the grid using the second AC interface of each module 108D and modules 108D of instance 1210-2 can be charged by wind source 1112 using the first AC interface of each module 108D.

In another configuration, all modules 108D of both instances 1210-1 and 1210-2 can be changed concurrently by the same AC source, e.g., wind source 1112 or the grid. In another configuration, one or more modules 108D of instance 1210-1 can be charged by wind source 1112 while one or more other modules 108D of instance 1210-1 can be charged by the grid. Similarly, one or more modules 108D of instance 1210-2 can be charged by wind source 1112 while one or more other modules 108D of instance 1210-2 can be charged by the grid.

In this embodiment, DC bus 1102 is connected to an external DC bus via 10 ports SIO7 and SIO8. This external DC bus can be used to charge a load. For example, the external DC bus can include or be connected to a charging interface for charging EVs.

Figure 12N:
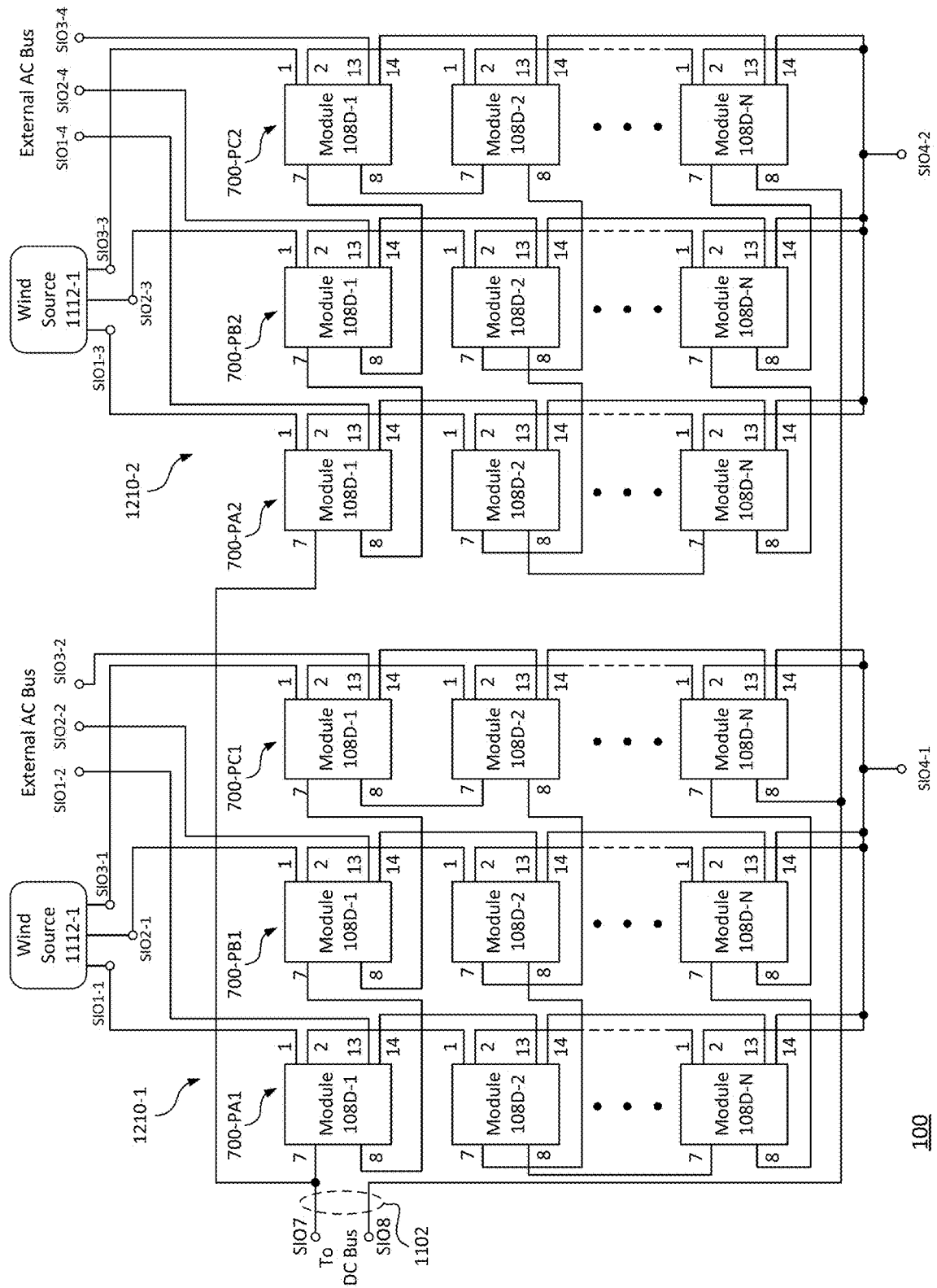

FIG. 12N is a block diagram depicting an example multiphase embodiment of system 100 that includes multiple instances 1210-1 and 1210-2 of arrays 700 and wind sources 1112. On the DC side of modules 108D, this embodiment is the same as system 100 of FIG. 12M with the same daisy chain arrangement. However, the configuration on the AC sides is different.

Here, each instance 1210-1 and 1210-2 is separately connected to respective wind sources 1112 and AC buses. In particular, the first AC interface of module 108D-1 of each array 700 in instance 1210-1 is connected to wind source 1112-1 via ports SIO1-1, SIO2-1, and SIO3-1. The second AC interface of module 108D-1 of each array 700 of instance 1210-1 is connected to the AC bus via ports SIO1-2, SIO2-2, and SIO3-2.

Similarly, the first AC interface of module 108D-1 of each array 700 in instance 1210-2 is connected to wind source 1112-2 via ports SIO1-3, SIO2-3, and SIO3-3. The second AC interface of module 108D-1 of each array 700 of instance 1210-2 is connected to the AC bus via ports SIO1-4, SIO2-4, and SIO3-4.

This embodiment enables modules 108D of each instance 1210 to be charged by either its wind source 1112 or a grid connected to its AC bus. The daisy chain on the DC side of modules 108D also enables modules 108D of each instance 1210 to exchange energy. Thus, modules 108D of instance 1210-1 can also be changed by wind source 1112-2 or the AC bus connected to ports SIO1-4, SIO2-4, and SIO3-4. Similarly, modules 108D of instance 1210-2 can also be changed by wind source 1112-1 or the AC bus connected to ports SIO1-2, SIO2-2, and SIO3-2. This provides additional charging flexibility and backup charging capabilities in the event of a failure of any of the AC sources connected to system 100.

In all of the aforementioned embodiments having modules 108D with connections on the DC side via ports 7 and 8 (e.g., the embodiments described with respect to FIGS. 12A-12N), the voltage across the port 7 and port 8 interface of each module can be set and adjusted under the control of control system 102. For example, control system 102 can regulate the voltage across LC circuit 1118 using the converter circuitry connected thereto (e.g., converter 1100 in FIG. 11C, converter 1110 in FIGS. 11D and 11E, and converter 1104 in FIG. 11G). The control of this voltage across ports 7 and 8 can accomplish various functions.

The setting or adjustment of the voltage across port 7 and port 8 of a module 108D can be used to match the voltage of a PV source 1101. The voltage produced by the PV source 1101 can be monitored in real-time by system 100 and the voltages of the modules 108D can be adjusted concurrently to the optimum level (e.g., maximum power point tracking). For example, in the embodiment of FIG. 12A, each module 108D-1 through 108D-N can set its voltage across ports 7 and 8 to match the output voltage DC_PV of the single PV source 1101. In the embodiment of FIG. 12B, each module 108D-1 through 108D-N can set the voltage across ports 7 and 8 to match the voltage DC_PV generated by the PV source 1101-1 thorough 1101-N associated with that module. In the embodiment of FIG. 12I, since all modules 108D are in series on the DC side, the voltages across ports 7 and 8 of each module 108D can be set such that the sum of all voltages of the modules 108D of all three arrays 700 equals the voltage generated by PV source 1101.

The setting of these voltages can also be used to compensate modules having sources 206 with relatively lower SOC levels. For example, in the embodiment of FIG. 12I, a first module 108D having a relatively lower SOC than the other modules can set the voltage across ports 7 and 8 to be higher than that of the other modules such that that particular first module receives more power (assuming all modules see the same input current on the DC side) from PV source 1101 than the others, and thus raises its SOC level relative to the others. Thus system 100 can perform balancing on the DC side to compensate for SOC or even temperature imbalances. Such balancing can also be performed without the presence of PV source 1101, such as in the embodiments of FIGS. 12K-12N. For example, as mentioned with respect to FIG. 12K, energy input from wind source 1112 to modules 108D of instance 1210-1 can be transferred to one or more modules 108D of instance 1210-2 by way of these DC interfaces and bus 1102 to balance the SOC levels of the sources 206 of modules 108D of both instances 1210-1 and 1210-2, and in reverse as well.

Energy need not be passed between sources 206 only, as energy can be passed from any element or interface (e.g., AC interface at ports 1 and 2, PV source 1101, fuel cell 1111, source 206) of any module 108D receiving or generating energy to any element or connection of another module 108D outputting or storing energy (e.g., AC interface at ports 1 and 2, source 206) across the DC interfaces of ports 7 and 8.

To perform such energy exchange, control system 102 can monitor the SOC levels of each source 206 within system 100 and coordinate the transfer of relatively more energy to those sources 206 needing greater compensation. Based on information collected and reported by LCDs 114 to MCD 112, MCD 112 can then instruct each LCD 114 to control the converter circuitry of the associated module 108D (or modules 108D) in the manner that will transfer energy to those modules 108D needing it. This can be performed using the pulse width modulation techniques utilizing reference signals, carrier signals, and modulation indexes as described herein with respect to FIGS. 8A-9B.

While the aforementioned describes the control system 102 setting voltage across the DC interface of ports 7 and 8, for any module 108D having two or more DC interfaces (e.g., one across ports 7 and 8, and another across ports 9 and 10, and so forth) then the description of setting the DC interface voltage likewise applies to all of the two or more DC interfaces present on the module 108D. Each DC interface can have a separate LC circuit 1118. Thus control system 102 can set the DC interface voltage across ports 7 and 8 to one value, and set the DC interface voltage across ports 9 and 10 to a second value. As an example, this might be used in instances where energy exchange between modules 108D is performed over one of the two DC interfaces and power point tracking with a PV source 1101 is performed over the other of the two DC interfaces.

In general, modules 108D of system 100 depicted in FIGS. 12A-12N can be implemented using any module 108D depicted in FIGS. 11A-11J. However, systems 100 that use modules 108D having two AC interfaces, e.g., modules 108D of systems 100 of FIGS. 12L-12N, can be implemented using module 108D of FIG. 11I.

The various arrangements of system 100 depicted in FIGS. 12A-12N can be used for many different applications. In one example, system 100 can be used for EV charging stations. In this example, PV arrays can be placed at the EV charging station and other components of system 100 (e.g., source 206, converters 202, 1104, 1116, buffer 204, fuel cell 1111, transformer 1130) can be located on a container of other appropriate housing. One or more wind sources 1112 can also be located at or near the EV charging station, or an AC bus connected to each wind source 1112 can be routed to the EV charging station. Similarly, an AC bus connected to a grid can be routed to the EV charging station. These arrangements provide substantial flexibility in buffering energy to charge EVs using renewable energy sources and/or a grid.

In all the PV embodiments described herein, the voltage and/or current produced by PV sources 1101 can be monitored by monitoring circuitry and those values can be output to control system 102 (e.g., to LCD 114, or to MCD 112 by way of LCD 114). Based on that information, control system 102 can then control the converter circuitry of modules 108D to route the produced PV energy to the appropriate location, such as for storage and energy sources 206 or for outputting to power connection 110 and use in supplying a grid or load connected to the system I/O ports (e.g., SIO1, SIO2, SIO3, SIO4).

Example Embodiments of Frameworks

The subject matter pertains to a housing framework (e.g., cabinets or racks of matching sizes) that permits ready customization to add to or detract from the number of modules 108 present in a converter system 100. Example embodiments pertaining to the frameworks are described with reference to FIGS. 13A-14C. These embodiments can be implemented with all aspects of system 100 described herein unless stated otherwise or logically implausible. As such, the many variations already described will not be repeated with respect to the following embodiments.

Figures 13A, 13B, 13C, 13D:
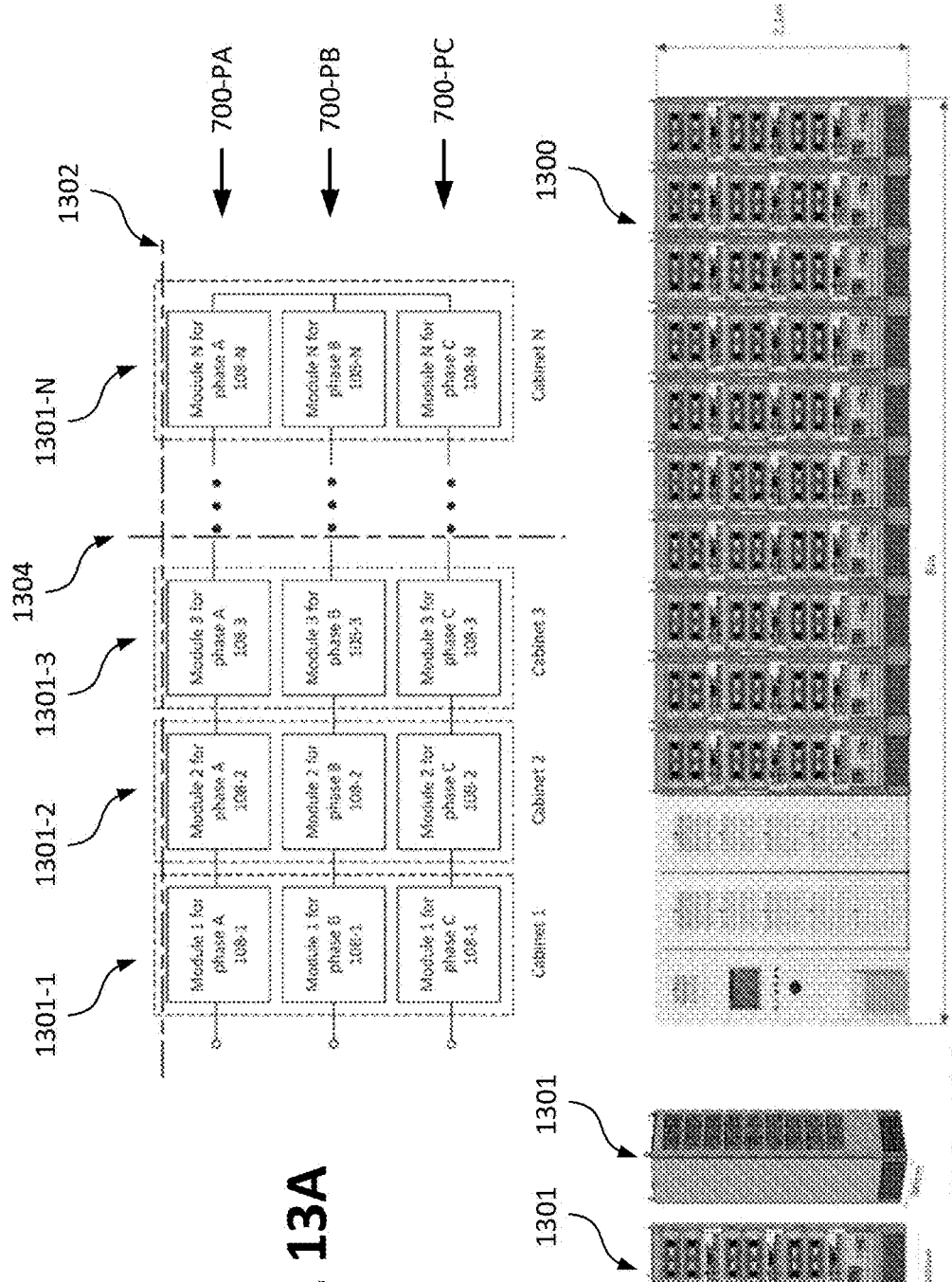
FIG. 13A is a block diagram depicting an example embodiment of a housing framework for housing multiphase systems.
FIGS. 13B and 13C are views depicting an example embodiment of an electronic rack for use in a rack-based installation.
FIG. 13D is an elevation view depicting an example embodiment of a rack-based installation consistent with the foregoing figures.

FIG. 13A is a block diagram depicting an example embodiment of a housing framework 1300 for housing multiphase systems 100. FIGS. 13B and 13C show front and perspective views, respectively, of an example electronics cabinet 1301, sometimes also called a "rack," suitable for use in the framework. Other designs for cabinet or racks may also be suitable, having a characteristic of arranging electronic components in a straight line, for example, a vertical line. FIG. 13D depicts an example implementation of multiple cabinets 1301 arranged in a framework 1300.

As can be seen in FIG. 13A, modules 108-1 through 108-N for each array 700 (e.g., modules 108-1 through 108-N for array 700-PA, modules 108-1 through 108-N for array 700-PB, and modules 108-1 through 108-N for array 700-PC) are aligned in separate ranks along a first straight line 1302 to facilitate direct connections between modules within each array 700. For example, modules 108 may be aligned in separate rows parallel to horizontal line 1302. Connections between modules 108 may be serial or parallel. In the illustrated example, modules 108-1 through 108-N of array 700-PA are in an upper row, modules 108-1 through 108-N of array 700-PB are in a middle row, and modules 108-1 through 108-N of array 700-PC are in a lower row.

Modules 108 for each level of a converter system 100 are aligned in separate ranks along a second straight line 1304, orthogonal to the first straight line 1302. For example, modules 108 may be aligned in separate columns parallel to the vertical line 1304. The lines 1302, 1304 may be imaginary lines. Alignment of modules 108 with the lines need not be geometrically perfect, but should be close enough to facilitate efficient electrical connections between modules 108. Advantageously, modules 108 for each level may be located in a common cabinet or rack section 1301. For example, in the illustrated example, a first cabinet 1301-1 houses modules 108-1 of a first level, a second cabinet 1301-2 houses modules 108-2 of a second level, a third cabinet 1301-3 houses modules 108-3 of a third level, and an Nth cabinet 1301-N houses modules 108-N of an Nth level. If additional module levels need to be added to provide more power or redundancy (or alternatively if a level of modules need to be removed) then this framework 1300 can be easily added to (and subtracted from) to meet those needs by adding or removing cabinets 1301. The maximum number of cabinets 1301 is limited only by the practical limits of space for framework 1300, and the operating parameters of the particular application.

An example embodiment of a single cabinet or rack section 1301 is shown at FIGS. 13B and 13C. FIG. 13D shows a framework 1300 of 13 cabinets or rack sections to the right, where the first three of the 13 are shown with front panels in place, and the remaining are shown without front panels. Each cabinet or rack section 1301 can have a housing with panels on any number of the sides, top and/or bottom. In this embodiment the housing is present on all sides, top, and bottom (not shown). Preferably panels, covers, or other insulative bodies are present over high voltage conductors for safety.

Figure 14A:
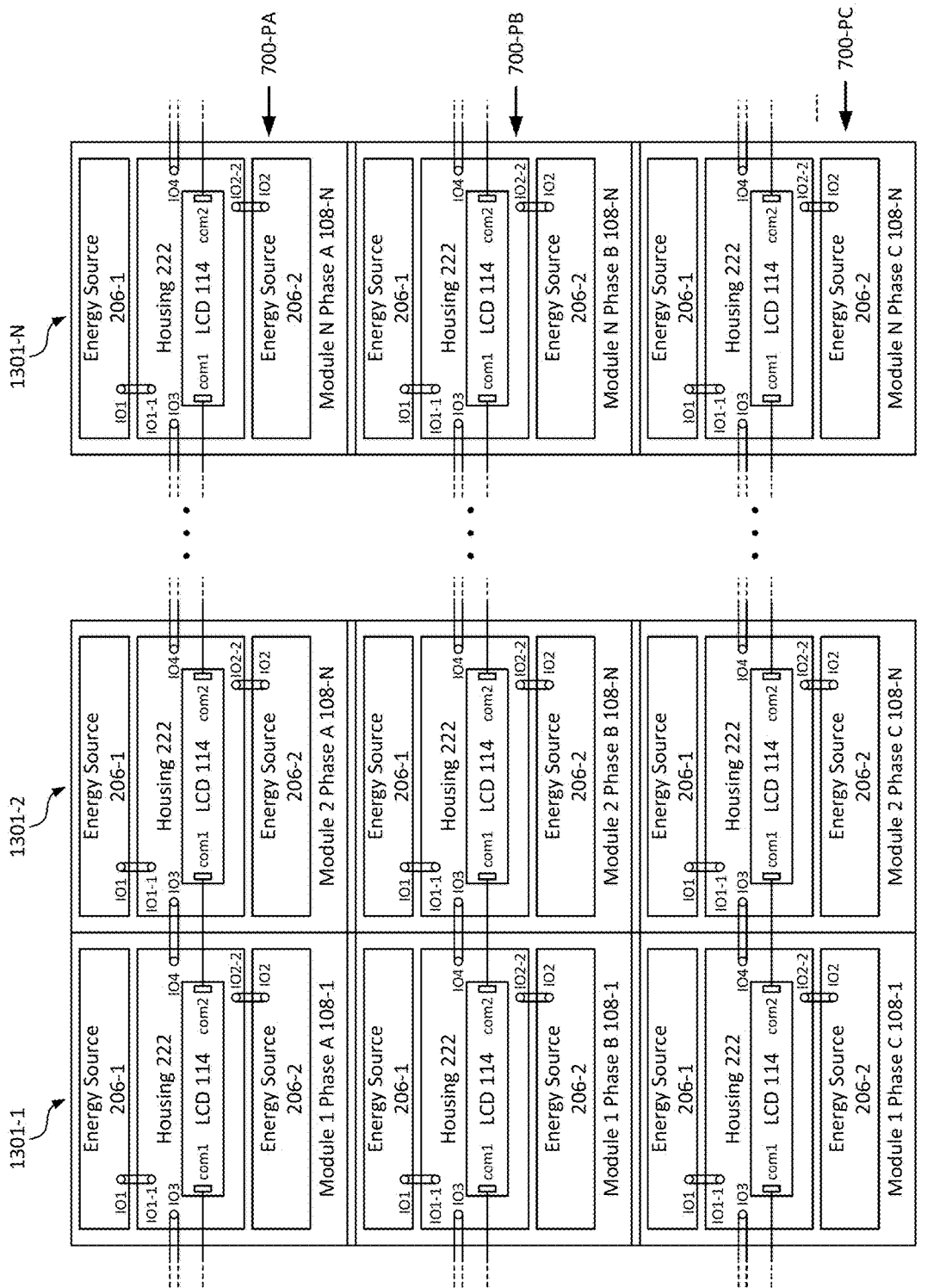
FIGS. 14A-14C are block diagrams depicting example embodiments of phase and module-based arrangements of modules and connections in a multi-phase module-based energy system framework.
Figure 14B:
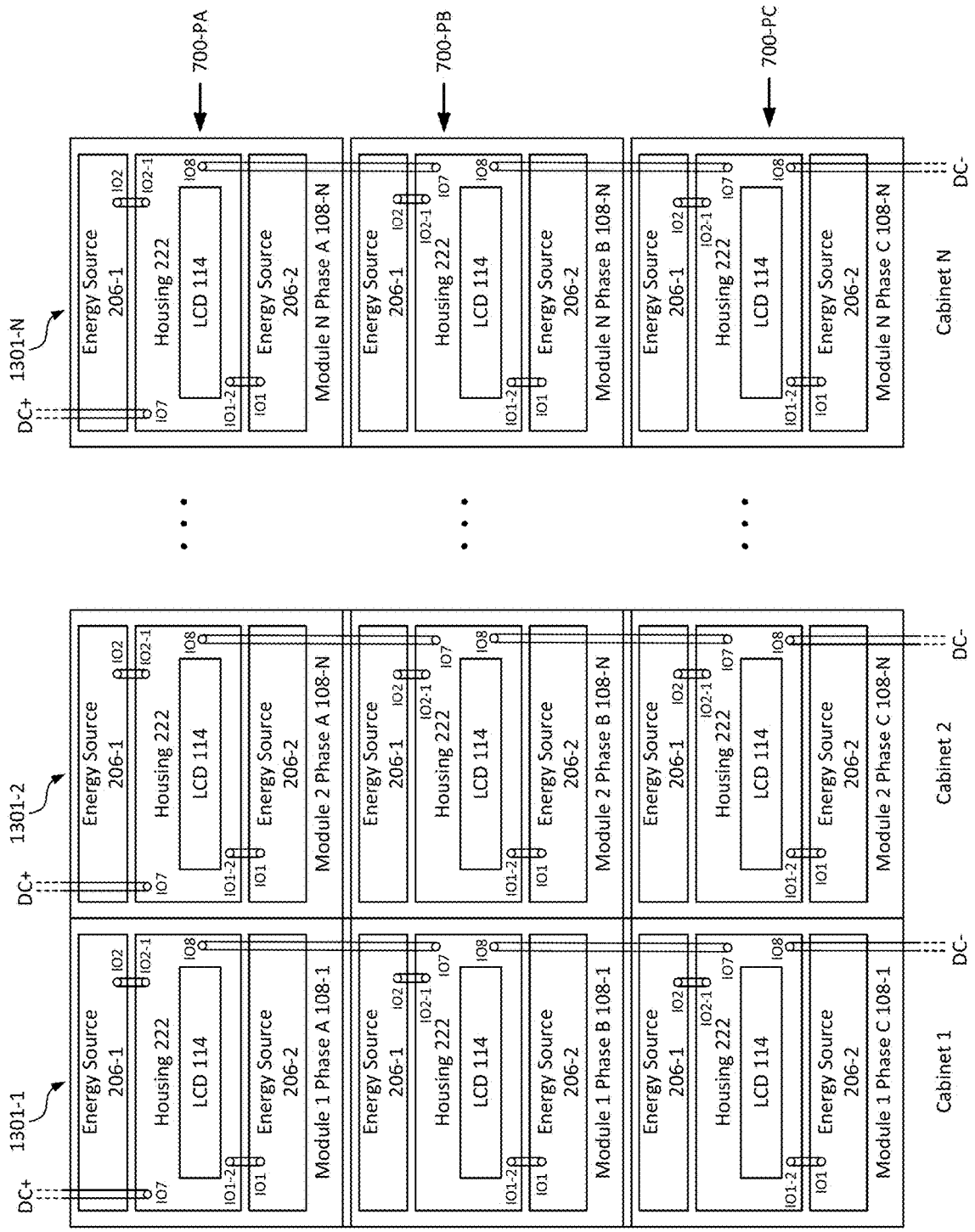
Figure 14C:
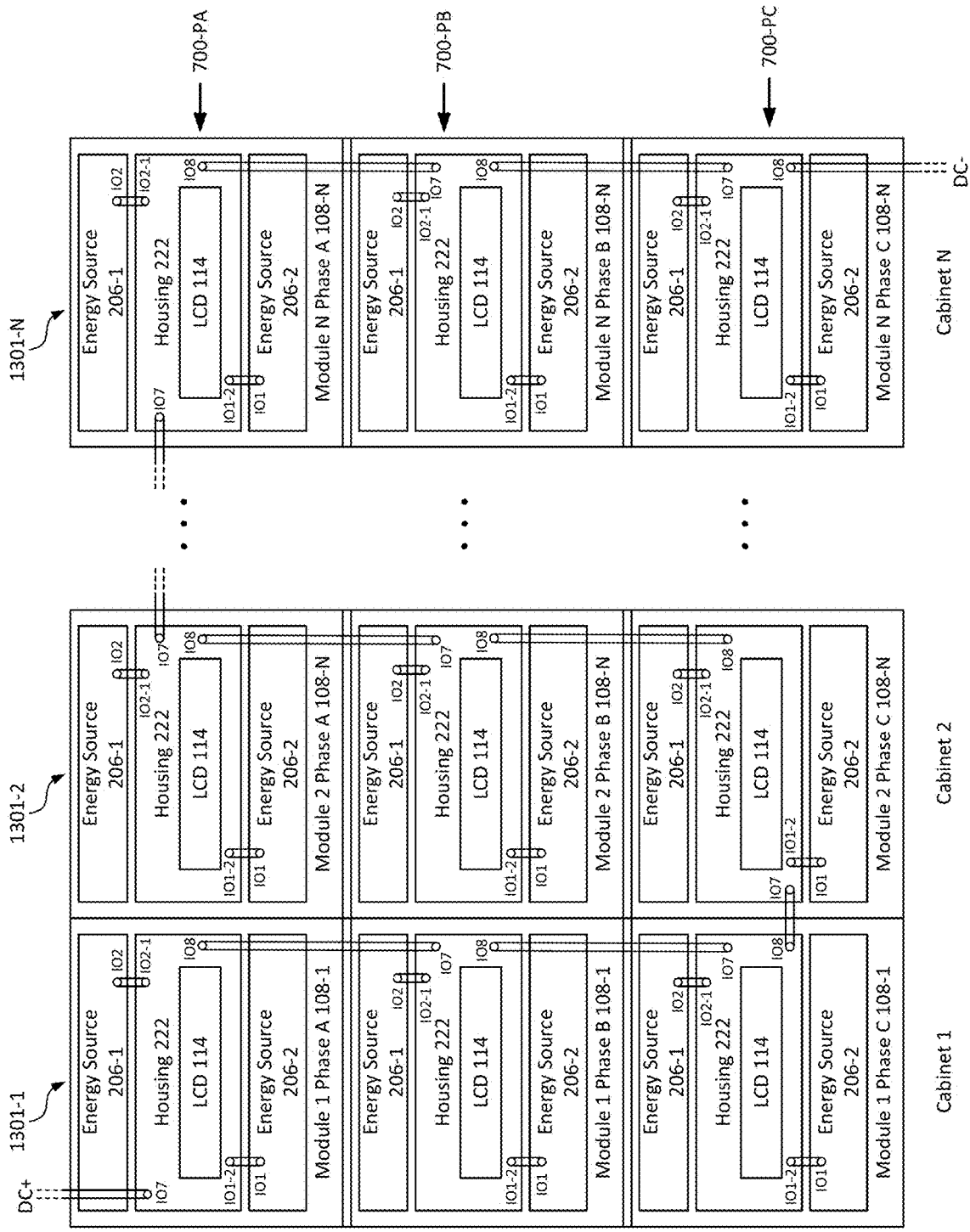

FIGS. 14A-14C are block diagrams depicting example embodiments of phase and module-based arrangements of modules and connections in a multi-phase module-based energy system framework 1300. FIG. 14A depicts a front view of modules 108 arranged in cabinets and FIGS. 14B and 14C depict example rear views of modules 108 arranged in the cabinets. However, the front and rear views can be reversed such that FIG. 14A depicts the rear view and FIGS. 14B and 14C depict front views or FIG. 14A can depict one side, while FIGS. 14B and 14C each depict a side that is opposite that, orthogonal to, or otherwise different from the side depicted in FIG. 14A.

As shown in FIGS. 11A-12M, modules 108D can have one or more DC interfaces and one or more AC interfaces.

In many examples, the DC interfaces are on one side of module 108D and the AC interfaces are on a different, e.g., opposite side, of modules 108D. Many of these interfaces are used to electrically couple modules 108 of an array 700 or of multiple arrays 700 together. Ports of each module 108 can be arranged such that the ports (e.g., ports 7 and 8) of the DC interface are on one side of module 108 and the ports (e.g., ports 1, 2, 13, 14) of the AC interface are on the different side of module 108. Thus, the AC interfaces can be accessed from one side of cabinet 1301 and the DC interfaces can be accessed from a different side of cabinet 1301. This allows for simpler and more compact arrangements of bus bars (or other appropriate connector) that connect modules 108 along these ports within the cabinets 1301. Reducing or minimizing connection length can reduce losses and cost.

In the example embodiments of FIGS. 14A-14C, the connections between AC interfaces are in or over the front side of cabinets 1301 and the connections between DC interfaces are in or over the back side of cabinets 1301. In this example, each module 108 includes multiple energy sources 206-1 and 206-2 and a converter housing 222. Converter housing 222 can hold multiple electronics including at least one converter 202, e.g., converter 202A of FIG. 6A or converter 202B of FIG. 6B), as well as LCD 114. Converter housing 222 can also hold at least one converter 1104, and optionally at least one converter 1116.

Converter housing 222 can include various 10 ports for electrically coupled components within housing 222 to other components. Converter housing 222 can include two pairs of ports IO1 and IO2 for electrically coupling energy sources 206-1 and 206-2 to one or more components in housing 222. For example, ports IO1-1 and IO2-1 are electrically coupled to ports IO1 and IO2 of energy source 206-1 and ports IO1-2 and IO2-2 are electrically coupled to ports IO1 and IO2 of energy source 206-1. Within housing 222, each pair of ports IO1 and IO2 of housing 222 are electrically coupled to one or more components, e.g., converter 202 and/or buffer 204 (e.g., FIGS. 11A-11B, 11F, 11H, 11I, 11J).

Converter housing 222 also includes ports IO3, IO4 and IO7, IO8 for coupling to an AC interface and a DC interface, respectively. Ports IO3 and IO4 of housing 222 can be electrically coupled to ports 1 and 2 of module 108D, which are electrically coupled to ports IO3 and IO4 of converter 202 (e.g., FIGS. 11A-11B, 11F, 11H-11J) in housing 222. Ports IO7 and IO8 of housing 222 can be electrically coupled to ports 7 and 8 of module 108D, which are electrically coupled to ports IO1 and IO2 of converter 1104 (e.g., FIGS. 11A-11B, 11F, 11H-11J) in housing 222. Although not shown, housing 222 can include additional ports for electrically coupling additional DC interfaces and/or additional AC interfaces of any additional converters 202, 1104, 1116 in housing 222 to external components to accommodate any of modules 108D of FIGS. 11H-11J.

In some embodiments, the ports of the various components within housing 222 proceed through housing 222 and can be exposed on the exterior of housing 222, e.g., without housing 222 including intermediate ports. In such embodiments, the ports shown in housing 222 in FIGS. 14A-14C can correspond to the ports of components within housing 222. For example, ports IO1 and IO2 shown in housing 222 can correspond to ports IO1 and IO2 of converter 202, respectively; ports IO3 and IO4 shown in housing 222 can correspond to ports IO3 and IO4 of converter 202, respectively; and ports IO7 and IO8 shown in housing 222 can correspond to ports 7 and 8 of module 108D (e.g., of ports IO1 and IO2 of converter 1104), respectively.

Each cabinet 1301 may be configured with a preexisting receptacle (e.g., a shelf, slot, or recess) to receive each module 108. Alternatively, cabinet 1301 may be provided with receptacles to independently receive each component (e.g., converter(s) 202, 1104, 1116, LCD 114, etc., source 206, and/or buffer 204) of module 108 (e.g., a receptacle for energy source(s) 206 of the first module, a receptacle for converter(s) 202 of the first module, a receptacle for each energy source 206 of the first module, and so forth). In these embodiments, the term "module" encompasses multiple discrete components electrically connected together to perform the function of one module, but without a single housing dedicated to that module.

Each energy source 206 may be configured as multiple types and with multiple configurations described herein, e.g., with respect to FIGS. 4A-4F. Within each module 108, LCD 114 communicates with converter 202A circuitry, an energy buffer 204 (not shown) and monitor circuitry 208 (not shown) associated with the various components.

Power connections within a cabinet 1301 or between cabinets 1301 (e.g., between each energy source 206 and its converter 202, 1116 or between converters 202, 1104, 1116) are preferably implemented with robust connectors that minimize self-inductance, such as an insulated bus bar (e.g., a laminated rigid bar with rectangular or other non-circular cross-section). These bars can be fastened in place.

Data connections (e.g., between MCD 112 and LCDs 114, or between LCDs 114) are preferably high speed bidirectional connections such as fiber optic, although other wired or wireless connections are possible. In the example of FIG. 14A, each LCD 114 within the phase or array is daisy chained (as described in FIG. 1A) with a wired connection shown at the communication (com) ports. In embodiments where LCDs 114 are daisy chained, the master control signals can be initially supplied to any module 108 in the array 700, so long they are subsequently supplied to each module in the array 700. In one example implementation the signals from MCD 112 are input to LCD 114 of module 108-1, and then propagated to the remaining modules in that array 200 (2-N). All signals (sensor information, M, Vref, etc.) can be exchanged over one port and bus, or multiple ports and buses can be used.

The sides of each cabinet 1301 may have ports, openings, or other passages or connections to permit easy interconnection between cabinets. Alternatively, all or part of sidewalls between adjoining or adjacent cabinets 1201 may be omitted to facilitate connection between cabinets. As used herein, "adjacent" means "adjoining, or nearly adjoining without an intervening barrier."

In an alternative embodiment, the framework may include a backplane for carrying communication signals between LCDs 114 of each array 700 and between MCD 112 and each LCD 114 of all arrays 700. For example, each converter 202 (or LCD 114) may be configured to plug into or otherwise mate with a connector in the back of its cabinet receptacle, and that connector be configured to couple with one or more buses of the backplane for carrying the signals through the framework.

FIG. 14A depicts one example of connections between AC interfaces of modules 108. The connections can be arranged within cabinets 1301 for any system 100 described herein. Referring to FIG. 14A, within each phase, converter 202, 1104, 1116 of one module 108 in a first cabinet 1301 is connected to at least one other horizontally-aligned converter 202 in an adjacent cabinet 1301. For example, port IO4 of converter 202 of module 1 of phase A in cabinet 1301-2 is connected to port IO3 of converter 202 of module 2 of array A in cabinet 1301-2 using electrical connections between ports of the converters' respective housings 222. This is one example of an electrical connection between AC interfaces of two modules 202. The horizontally aligned arrangement between coupled components permits short and direct connections for the bars, which further minimizes inductance, noise, and losses.

The bus bars that connects a port of a housing 222 for an AC interface of a module 202 in one cabinet 1301 with a port of a housing 222 for an AC interface of a module 202 in another cabinet 1301 can be routed along the fronts of the cabinets 1301. These bus bars can be routed through ports, openings, or other passages between the cabinets 1301.

As described herein, e.g., with reference to FIGS. 11I, and 12L-12N, modules 108D can have multiple AC interfaces. The cabinets 1301 can include bus bars (or other connectors) for each AC interface of each module 108D.

The power connections between each converter 202 and its energy sources 206 can be arranged on both sides of cabinet 1301. There are two connections between each energy source 206 and converter 202, e.g., a positive and negative DC connection. One connection between energy source 206-1 and converter 202 (e.g., between port IO1 of energy source 206-1 and port IO1-1 of the housing 222 that includes converter 202) can be arranged along the front of cabinet 1301 and the other connection between energy source 206-1 and converter 202 (e.g., between port IO2 of energy source 206-1 and port IO2-1 of the housing 222 that includes converter 202) can be arranged along the back of cabinet 1301 (FIG. 14B-14C).

Similarly, one connection between energy source 206-2 and converter 202 (e.g., between port IO2 of energy source 206-2 and port IO2-2 of the housing 222 that includes converter 202) can be arranged along the front side of cabinet 1301 and the other connection between energy source 206-2 and converter 202 (e.g., between port IO1 of energy source 206-2 and port IO1-2 of the housing 222 that includes converter 202) can be arranged along the back or rear side of cabinet 1301 (FIG. 14B-14C). Separation in this manner can permit the use of minimal length connections to reduce losses and cost.

FIG. 14B depicts one example of connections between DC interfaces of modules 108. In this example, the DC interfaces of modules 108 within a cabinet 1301 (e.g., within a level of a multi-level converter system) are electrically coupled. For example, port IO8 of converter 1104 of the phase A module 108 in each cabinet 1301 is electrically coupled to port IO7 of converter 1104 of the phase B module 108 in that cabinet 1301. Similarly, port IO8 of converter 1104 of the phase B module 108 in each cabinet 1301 is electrically coupled to port IO7 of converter 1104 of the phase C module 108 in that cabinet 1301.

In addition, port IO7 of converter 1104 of the phase A module 108 in each cabinet 1301 and port IO8 of converter 1104 of the phase C module 108 in each cabinet 1301 are connected to a DC bus, e.g., to separate DC buses or connected in parallel to the same DC bus. In this example, port IO7 of the phase A module 108 is connected to DC+ and port IO8 of the phase C module 108 is connected to DC-. The electrical connections between ports IO7 and 108 of housings 222 that correspond to these ports of modules 1104 can be made using bus bars or other appropriate connectors that are routed along the back of cabinets 1301. Although the connections to the DC bus(es) are shown at the top and bottom of cabinets 1301, the conductors of the DC bus can enter cabinet 1301 through a passage at the top bottom, or either side of cabinet 1301.

FIG. 14C depicts another example of connections between DC interfaces of modules 108. This example depicts daisy chain connections between DC interfaces, e.g., similar to those of FIG. 121. In this example, port IO8 of converter 1104 of the phase A module of each cabinet 1301 is electrically coupled to port IO7 of converter 1104 of the phase B module 108 of that cabinet 1301. Similarly, port IO8 of converter 1104 of the phase B module 108 of each cabinet 1301 is electrically coupled to port IO7 of converter 1104 of the phase C module 108 of that cabinet 1301.

Port IO8 of converter 1104 of the phase C module of cabinet 1301-1 is electrically coupled to port IO7 of the phase C module of cabinet 1301-2. Port IO7 of converter 1104 of the phase A module 108 of cabinet 1301-2 is electrically coupled to port IO7 of converter 1104 of the phase A module of the next cabinet (e.g., cabinet 1301-N). The bus bars that make these inter-cabinet connections can be routed along the backs of the cabinets 1301. These bus bars can be routed through ports, openings, or other passages between the cabinets 1301.

In addition, port IO7 of converter 1104 of module 1 of phase A in cabinet 1301-1 and port IO8 of converter 1104 of module N of phase C are connected to a DC bus. In this example, port IO7 of the phase A module 108 is connected to DC+ and port IO8 of the phase C module 108 is connected to DC-. Although these connections are shown at the top and bottom of cabinets 1301, the conductors of the DC bus can enter cabinet 1301 through a passage at the top bottom, or either side of cabinet 1301.

FIGS. 14B and 14C show two example arrangements of connections between DC interfaces of modules 108. The connections can be arranged within cabinets 1301 for any system 100 described herein. As described herein, e.g., with reference to FIGS. 11H-11J, modules 108D can have multiple DC interfaces. The cabinets 1301 can include bus bars (or other connectors) for each DC interface of each module 108D.

Second Life Energy Source Examples

The embodiments of module 108 described herein improves the life of sources 206 by, for example, keeping sources 206 at preferred (or optimal) temperatures and charge/discharge conditions. The structure and/or topology of modules 108 also allows for second life applications of modules 108 and/or their sources 206 without major changes to modules 108 and also allows for accurate measurement and valuation of residual life of sources 206 at the end of life.

A first life of a source 206 is an original application in which source 206 is used. For example, the first life application is the first implementation in sources 206 are put to use by the first customer of sources 206 after their original manufacture (and not refurbishment). The user of sources 206 in their first life will typically have received sources 206 from the manufacturer, distributor, or original equipment manufacturer (OEM). Batteries 206 used in a first life application will typically have the same electrochemistry (e.g., will have the same variant of lithium ion electrochemistry (e.g., LFP, NMC)) and will have the same nominal voltage and will have a capacity variation across the pack or system that is minimal (e.g., 5% or less). Use of an energy storage system with batteries 206 in their first life application will result in batteries 206 having a longer lifespan in that first life application, and upon removal from that first life application, the batteries 206 will be more similar in terms of capacity degradation than batteries from a first life application not using the energy storage system.

As used herein, a "second life" application refers to any application or implementation after the first life application (e.g., a second implementation, third implementation, fourth implementation, etc.) of source 206. A second life energy source refers to any energy source (e.g., battery or HED capacitor) implemented in that source's second life application.

An example of a first life application for batteries 206 is within an energy storage system for an EV. Then, at the end of that life (e.g., after 100,000 miles of driving, or after degradation of the batteries within that battery pack by a threshold amount), the batteries 206 can be removed from the battery pack, optionally subjected to refurbishing and testing, and then implemented in a second life application that can be, e.g., use within a stationary energy storage system (e.g., residential, commercial, or industrial energy buffering, EV charging station energy buffering, renewable source (e.g., wind, solar, hydroelectric), energy buffering, and the like) or another mobile energy storage system (e.g., battery pack for an electric car, bus, train, or truck). Similarly, the first life application can be a first stationary application and the second life application can be a stationary or mobile application.

FIG. 15A depicts an energy storage system 100 having multiple modules 108 electrically connected together in cascaded fashion to provide energy for a load or grid or receive energy from a load or grid. As described herein, modules 108 can be electrically connected in a variety of configurations, e.g., in one or more arrays 700. Energy sources 206 of energy storage system 100 can be referred to as first life energy sources as the energy storage system 100 is the original application in which sources 206 are used.

System 100 can be configured to provide power to one or more motors, e.g., one or more motors of an EV. For example, system 100 can be configured to EVs having one, two, three, four, or more motors.

After modules 108 are used in their first application, modules 108 and/or sources 206 of modules 108 can be used in a second life application, as shown in FIG. 15B. When used in the second life application, sources 206 can be referred to as second life energy sources 206. Second life application can include a can be a stationary energy storage system 100 (e.g., residential, commercial, or industrial energy buffering, EV charging station energy buffering, renewable source, energy buffering, and the like).

Modules 108 and/or sources 206 of modules 108 can be tested and/or refurbished prior to being used in the second life application. In some cases, modules 108 may be reconfigured for use in the second life application, e.g., by being placed in a different housing to fit in a rack of the second life application.

For the second life application, sources 206 can be selected and/or utilized by system 100 to minimize (or at least reduce) any differences in initial capacity and nominal voltage. For example, sources 206 having a capacity difference of 5% or more can be included within system 100 and operated to provide energy for a load. In another example, an operator or automated system can select sources 206 for system that have a capacity different within a threshold amount, e.g., to reduce the initial capacity differences between sources of system 206. If modules 108 are compatible with both the first and second life application (e.g., with or without reconfiguration), modules 108 can be selected for the second life application based on the capacity difference of sources 206 of modules 108.

System 100 can adjust utilization of each source 206 individually such that sources 206 within system 100 or packs of system 100 are relatively balanced in terms of SOC or total charge (SOC times capacity) as the pack or system 100 is discharged, even though the sources 206 in system 100 can have widely varying capacities. Similarly, system 100 can maintain balance as the pack or system 100 is charged. Sources 206 can vary not only in terms of capacity but also in nominal voltage, power rating, electrochemical type (e.g., a combination of LFP and NMC batteries) and the like. Thus, system 100 can be used such that all modules 206 within system 100 or each pack of system 100 are second life energy sources (or such that a combination of first life and second life energy sources are used), having various combinations of different characteristics.

In one example, system 100 can include second life energy sources 206 (and optionally one or more first life energy sources 206) having energy capacity variations of 5% or more, 10% or more, 15% or more, 20% or more, or 25% or more, 30% or more, 5-30%, 10-30%, and/or 20-30%.

In another example, system 100 can include second energy life sources 206 (and optionally one or more first life energy sources 206) having energy capacity per mass density variations of 5% or more, 10% or more, 15% or more, 20% or more, or 25% or more, 30% or more, 5-30%, 10-30%, and/or 20-30%.

In another example, system 100 can include second life energy sources 206 (and optionally one or more first life energy sources 206) having peak power per mass density variations of 5% or more, 10% or more, 15% or more, 20% or more, or 25% or more, 30% or more, 5-30%, 10-30%, and/or 20-30%.

In another example, system 100 can include second life energy sources 206 (and optionally one or more first life energy sources 206) having nominal voltage variations of 5% or more, 10% or more, 15% or more, 20% or more, or 25% or more, 30% or more, 5-30%, 10-30%, and/or 20-30%.

In another example, system 100 can include second life energy sources 206 (and optionally one or more first life energy sources 206) having operating voltage range variations of 5% or more, 10% or more, 15% or more, 20% or more, or 25% or more, 30% or more, 5-30%, 10-30%, and/or 20-30%.

In another example, system 100 can include second life energy sources 206 (and optionally one or more first life energy sources 206) having maximum specified current rise time variations of 5% or more, 10% or more, 15% or more, 20% or more, or 25% or more, 30% or more, 5-30%, 10-30%, and/or 20-30%.

In another example, system 100 can include second life energy sources 206 (and optionally one or more first life energy sources 206) having specified peak current variations of 5% or more, 10% or more, 15% or more, 20% or more, or 25% or more, 30% or more, 5-30%, 10-30%, and/or 20-30%.

In another example, system 100 can include second life energy sources 206 (and optionally one or more first life energy sources 206) having variations of electrochemical type (e.g., lithium ion batteries with non-lithium ion batteries, or different lithium ion batteries (e.g., any combination of NMC, LFP, LTO, or other lithium ion battery types).

System 100 can include second life energy sources 206 (and optionally one or more first life energy sources 206) having any combination of the characteristics provides in the preceding examples.

Figure 16:
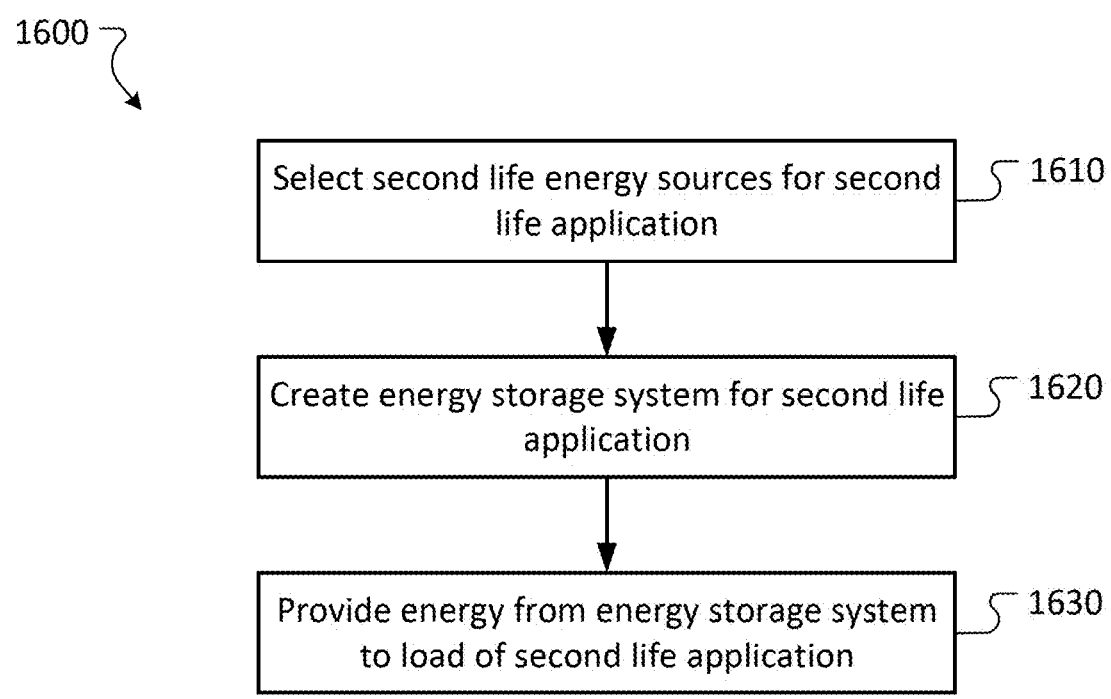
FIG. 16 is a flow diagram depicting an example embodiment of a method of providing energy from an energy storage system having second life energy sources to a load.

FIG. 16 is a is a flow diagram depicting an example embodiment of a method 1600 of providing energy from an energy storage system having second life energy sources to a load.

At step 1610, second life energy sources 206 are selected for a selection life application. The second life energy sources 206 can be selected for inclusion in an energy storage system 100 for the second life application. Second life energy sources 206 can be selected from a set of energy sources 206 that have been decommissioned from their respective first life applications, e.g., based on degradations in their characteristics. The set of energy sources 206 can come from multiple different first life applications and/or multiple different types (e.g., some stationary, some mobile) of first life applications.

An operator or automated system can select second life energy sources 206 for the second life application based on characteristics of energy sources 206 in the set of energy sources 206. The characteristics can include, for example, the energy capacity of each energy source 206, the energy capacity per mass density of each energy source 206, the peak power per mass density of each energy source 206, the nominal voltage of each energy source 206, the operating voltage range of each energy source 206, the maximum specified current rise time of each energy source 206, specified peak current of each energy source 206, and/or other appropriate characteristics of each energy source 206.

For example, a system can test each energy source 206 to determine the characteristics of each energy source 206. This system can then select a specified number of energy sources 206 for the second life application, e.g., based on a required number of energy sources 206 for an energy storage system 100 of the second life application. The system can select energy sources 206 for the second application such that variations in the characteristics of the selected energy sources are minimized.

At step 1620, an energy storage system 100 is created for the second life application. System 100 can be created by installing selected energy sources 206 in modules 108 for system 100. When used in a second life application, selected energy sources 206 can be referred to as second life energy sources 206. In some implementations, energy sources 206 can be refurbished prior to installation. Multiple modules 108 can then be electrically connected together in cascaded fashion to provide energy for a load of the second life application or a grid or receive energy from the load or grid.

At step 1630, energy is provided from system 100 to the load of the second life application. As described herein, control system 102 can operate switches of converters 202 to provide an appropriate amount of energy to a load. In addition, control system 102 can use balancing techniques described herein to balance characteristics of the second life energy sources 206 of system 100. For example, control system 102 can use the described balancing techniques balance the SOC when sources 206 and charged and/or discharged. Such balancing techniques can account for variations in the initial characteristics (e.g., initial capacities) of sources 206 of system 100.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated or taught otherwise.

The term "module" as used herein refers to one of two or more devices or sub-systems within a larger system. The module can be configured to work in conjunction with other modules of similar size, function, and physical arrangement (e.g., location of electrical terminals, connectors, etc.). Modules having the same function and energy source(s) can be configured identical (e.g., size and physical arrangement) to all other modules within the same system (e.g., rack or pack), while modules having different functions or energy source(s) may vary in size and physical arrangement. While each module may be physically removable and replaceable with respect to the other modules of the system (e.g., like wheels on a car, or blades in an information technology (IT) blade server), such is not required. For example, a system may be packaged in a common housing that does not permit removal and replacement any one module, without disassembly of the system as a whole. However, any and all embodiments herein can be configured such that each module is removable and replaceable with respect to the other modules in a convenient fashion, such as without disassembly of the system.

The term "master control device" is used herein in a broad sense and does not require implementation of any specific protocol such as a master and slave relationship with any other device, such as the local control device.

The term "output" is used herein in a broad sense, and does not preclude functioning in a bidirectional manner as both an output and an input. Similarly, the term "input" is used herein in a broad sense, and does not preclude functioning in a bidirectional manner as both an input and an output.

The terms "terminal" and "port" are used herein in a broad sense, can be either unidirectional or bidirectional, can be an input or an output, and do not require a specific physical or mechanical structure, such as a female or male configuration.

The term "nominal voltage" is a commonly used metric to describe a battery cell, and is provided by the manufacturer (e.g., by marking on the cell or in a datasheet). Nominal voltage often refers to the average voltage a battery cell outputs when charged, and can be used to describe the voltage of entities incorporating battery cells, such as battery modules and subsystems and systems of the present subject matter.

The term "C rate" is a commonly used metric to describe the discharge current divided by the theoretical current draw under which the battery would deliver its nominal rated capacity in one hour.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

In many embodiments, an energy storage system includes a plurality of converter modules electrically coupled together in cascaded fashion to form an array. The array is configured to output an AC signal including a superposition of AC module voltages from the plurality of converter modules. Each of the plurality of converter modules include a DC-DC converter configured to electrically couple with a photovoltaic (PV) source and configured to convert a first DC voltage from the PV source to a second DC voltage; an energy buffer electrically coupled with the DC-DC converter; an energy source electrically coupled with the DC- DC converter and with a DC-AC converter; a power connection configured to output an AC module voltage of the module; the DC-AC converter configured to convert an input DC voltage to the AC module voltage; and a local control device configured to control the DC-DC converter and the DC-AC converter to route energy from the PV source to the energy source and/or the power connection.

In some embodiments, the DC-DC converter includes a first DC-AC converter electrically connected to a transformer, and a diode rectifier electrically coupled to the transformer.

In some embodiments, the DC-DC converter includes a first DC-AC converter electrically connected to a transformer, and a first AC-DC converter electrically coupled to the transformer.

In some embodiments, each converter module of the plurality of converter modules is electrically coupled with the same PV source over a common DC bus.

In some embodiments, each converter module of the plurality of converter modules is electrically coupled with a different PV source.

In some embodiments, the array is a first array, the AC signal is a first AC signal, and the plurality of converter modules is a first plurality of converter modules. The system can include a second array including a second plurality of converter modules electrically coupled together in cascaded fashion. The second array can be configured to output a second AC signal comprising a superposition of AC module voltages from the second plurality of converter modules.

In some embodiments, the array is a first array, the AC signal is a first AC signal, and the plurality of converter modules is a first plurality of converter modules. The system can include a second array including a second plurality of converter modules electrically coupled together in cascaded fashion. The second array is configured to output a second AC signal comprising a superposition of AC module voltages from the second plurality of converter modules. The system can include a third array including a third plurality of converter modules electrically coupled together in cascaded fashion. The third array is configured to output a third AC signal including a superposition of AC module voltages from the third plurality of converter modules.

In some embodiments, each converter module of the first plurality of converter modules, the second plurality of converter modules, and the third plurality of converter modules is coupled with the same PV source.

In some embodiments, the PV source of each converter module in the first plurality of converter modules is a first PV source, each converter module of the second plurality of converter modules is electrically coupled with a second PV source, each converter module of the third plurality of converter modules is electrically coupled with a third PV source. The first PV source, the second PV source, and the third PV source are different PV sources.

In some embodiments, each converter module of the first plurality of converter modules is electrically coupled to a different PV source. Each converter module of the second plurality of converter modules is electrically coupled to a different PV source. Each converter module of the third plurality of converter modules is electrically coupled to a different PV source.

In some embodiments, each converter module of the first plurality of converter modules is electrically coupled to the same PV source. Each converter module of the second plurality of converter modules is electrically coupled to a different PV source. Each converter module of the third plurality of converter modules is electrically coupled to a different PV source.

In some embodiments, the DC-DC converters of the converter modules of each array are connected in a daisy chain arrangement.

In some embodiments, the first array, the second array, and the third array form a first instance of arrays. The system can include a second instance of arrays. The second instance of arrays includes a fourth array including a fourth plurality of converter modules electrically coupled together in cascaded fashion. The fourth array is configured to output a fourth AC signal including a superposition of AC module voltages from the fourth plurality of converter modules. The second instance of arrays includes a fifth array including a fifth plurality of converter modules electrically coupled together in cascaded fashion. The fifth array is configured to output a fifth AC signal including a superposition of AC module voltages from the fifth plurality of converter modules. The second instance of arrays includes a sixth array including a sixth plurality of converter modules electrically coupled together in cascaded fashion. The sixth array is configured to output a sixth AC signal comprising a superposition of AC module voltages from the sixth plurality of converter modules.

In some embodiments, the power connection of a first converter module of each of (i) the first plurality of converter modules, (ii) the second plurality of converter modules, and (iii) the third plurality of converter modules is electrically coupled to a wind source.

In some embodiments, the power connection of a first converter module of each of (i) the first plurality of converter modules, (ii) the second plurality of converter modules, and (iii) the third plurality of converter modules is electrically coupled to an AC bus.

In some embodiments, the AC bus is electrically coupled to a grid.

In some embodiments, the DC-DC converters of the converter modules of the first plurality of converter modules, the second plurality of converter modules, and the third plurality of converter modules are connected in a first daisy chain arrangement. The DC-DC converters of the converter modules of the fourth plurality of converter modules, the fifth plurality of converter modules, and the sixth plurality of converter modules are connected in a second daisy chain arrangement. The first daisy chain arrangement of DC-DC converters is in parallel with the second daisy chain arrangement of DC-DC converters.

In some embodiments, the DC-AC converter of each converter module is a first DC-AC converter. The power connection of each converter module is a first converter module. Each converter module includes a second DC-AC converter and a second power connection.

In some embodiments, the first power connection of a first converter module of each of (i) the first plurality of converter modules, (ii) the second plurality of converter modules, and (iii) the third plurality of converter modules is electrically coupled to a wind source. The second power connection of the first converter module of each of (i) the first plurality of converter modules, (ii) the second plurality of converter modules, and (iii) the third plurality of converter modules is electrically coupled to an AC bus.

In some embodiments, the first array, the second array, and the third array form a first instance of arrays. The system includes a second instance of arrays. The second instance of arrays includes a fourth array including a fourth plurality of converter modules electrically coupled together in cascaded fashion. The fourth array is configured to output a fourth AC signal including a superposition of AC module voltages from the fourth plurality of converter modules. The second instance of arrays includes a fifth array including a fifth plurality of converter modules electrically coupled together in cascaded fashion. The fifth array is configured to output a fifth AC signal including a superposition of AC module voltages from the fifth plurality of converter modules. The second instance of arrays includes a sixth array including a sixth plurality of converter modules electrically coupled together in cascaded fashion. The sixth array is configured to output a sixth AC signal including a superposition of AC module voltages from the sixth plurality of converter modules.

In some embodiments, the first power connection of a first converter module of each of (i) the fourth plurality of converter modules, (ii) the fifth plurality of converter modules, and (iii) the sixth plurality of converter modules is electrically coupled to the wind source. The second power connection of the first converter module of each of (i) the fourth plurality of converter modules, (ii) the fifth plurality of converter modules, and (iii) the sixth plurality of converter modules is electrically coupled to the AC bus.

In some embodiments, the wind source if a first wind source. The AC bus is a first AC bus. The first power connection of a first converter module of each of (i) the fourth plurality of converter modules, (ii) the fifth plurality of converter modules, and (iii) the sixth plurality of converter modules is electrically coupled to a second wind source. The second power connection of the first converter module of each of (i) the fourth plurality of converter modules, (ii) the fifth plurality of converter modules, and (iii) the sixth plurality of converter modules is electrically coupled to a second AC bus.

In some embodiments, the DC-DC converters of the converter modules of the first plurality of converter modules, the second plurality of converter modules, and the third plurality of converter modules are connected in a first daisy chain arrangement. The DC-DC converters of the converter modules of the fourth plurality of converter modules, the fifth plurality of converter modules, and the sixth plurality of converter modules are connected in a second daisy chain arrangement. The first daisy chain arrangement of DC-DC converters is in parallel with the second daisy chain arrangement of DC-DC converters.

In some embodiments, the system includes a master control device communicatively coupled with the local control devices of the converter modules.

In many embodiments, an energy storage system includes a plurality of converter modules electrically coupled together in cascaded fashion to form an array. The array is configured to output an AC signal including a superposition of AC module voltages from the plurality of converter modules. Each of the plurality of converter modules includes a transformer; a power connection configured to output an AC module voltage; a first DC-AC converter configured to electrically couple with a photovoltaic (PV) source and the transformer, the first DC-AC converter configured to convert a first DC voltage from the PV source to a first AC voltage for application to the transformer; a first AC-DC converter configured to electrically couple with the transformer and convert a second AC voltage from the transformer to a second DC voltage for a second DC-AC converter; the second DC-AC converter configured to electrically couple with the first AC-DC converter and the power connection, and configured to convert the second DC voltage to the AC module voltage; an energy buffer; an energy source; a second AC-DC converter configured to electrically couple with the transformer and convert a third AC voltage from the transformer to a third DC voltage for application to the energy buffer and the energy source; and a local control device configured to control the first and second DC-AC converters and the first and second AC-DC converters to route energy from the PV source to the energy source and/or the power connection.

In some embodiments, each converter module of the plurality of converter modules is electrically coupled with the same PV source over a DC bus.

In some embodiments, each converter module of the plurality of converter modules is electrically coupled with a different PV source.

In some embodiments, the system includes a third DC-AC converter configured to electrically couple with the transformer and to convert a fourth DC voltage from a fuel cell to a fourth AC voltage for application to the transformer.

In some embodiments, the system includes a fourth DC-AC converter configured to electrically couple with the transformer and to convert fifth AC voltage from the transformer to a fifth DC voltage for application to a DC bus.

In some embodiments, the system includes a third AC-DC converter configured to electrically couple with the transformer and convert a sixth AC voltage from the transformer to a sixth DC voltage for a fifth DC-AC converter. The fifth DC-AC converter is configured to electrically couple with the third AC-DC converter and a second power connection, and configured to convert the sixth DC voltage to a seventh AC voltage.

In some embodiments, the array is a first array, the AC signal is a first AC signal, and the plurality of converter modules is a first plurality of converter modules. The system includes a second array including a second plurality of converter modules electrically coupled together in cascaded fashion. The second array is configured to output a second AC signal including a superposition of AC module voltages from the second plurality of converter modules.

In some embodiments, the array is a first array, the AC signal is a first AC signal, the plurality of converter modules is a first plurality of converter modules. The system includes a second array including a second plurality of converter modules electrically coupled together in cascaded fashion. The second array is configured to output a second AC signal including a superposition of AC module voltages from the second plurality of converter modules. The system includes a third array including a third plurality of converter modules electrically coupled together in cascaded fashion. The third array is configured to output a third AC signal comprising a superposition of AC module voltages from the third plurality of converter modules.

In some embodiments, each converter module of the first plurality of converter modules, the second plurality of converter modules, and the third plurality of converter modules is coupled with the same PV source.

In some embodiments, the PV source of each converter module in the first plurality of converter modules is a first PV source, each converter module of the second plurality of converter is electrically coupled with a second PV source, and each converter module of the third plurality of converter modules is electrically coupled with a third PV source. The first PV source, the second PV source, and the third PV source are different PV sources.

In some embodiments, each converter module of the first plurality of converter modules is electrically coupled to a different PV source. Each converter module of the second plurality of converter modules is electrically coupled to a different PV source. Each converter module of the third plurality of converter modules is electrically coupled to a different PV source.

In some embodiments, each converter module of the first plurality of converter modules is electrically coupled to the same PV source. Each converter module of the second plurality of converter modules is electrically coupled to a different PV source. Each converter module of the third plurality of converter modules is electrically coupled to a different PV source.

In some embodiments, each converter module includes a fourth AC-DC converter configured to electrically couple with a DC bus and the transformer. The fourth AC-DC converter is configured to convert an eighth AC voltage from the transformer to a seventh DC voltage for the DC bus.

In some embodiments, the fourth AC-DC converters of the converter modules of each array are connected in a daisy chain arrangement.

In some embodiments, the first array, the second array, and the third array form a first instance of arrays. The system can include a second instance of arrays. The second instance of arrays includes a fourth array including a fourth plurality of converter modules electrically coupled together in cascaded fashion. The fourth array is configured to output a fourth AC signal comprising a superposition of AC module voltages from the fourth plurality of converter modules. The second instance of arrays includes a fifth array including a fifth plurality of converter modules electrically coupled together in cascaded fashion. The fifth array is configured to output a fifth AC signal comprising a superposition of AC module voltages from the fifth plurality of converter modules. The second instance of arrays includes a sixth array including a sixth plurality of converter modules electrically coupled together in cascaded fashion. The sixth array is configured to output a sixth AC signal including a superposition of AC module voltages from the sixth plurality of converter modules.

In some embodiments, the power connection of a first converter module of each of (i) the first plurality of converter modules, (ii) the second plurality of converter modules, and (iii) the third plurality of converter modules is electrically coupled to a wind source.

In some embodiments, the power connection of a first converter module of each of (i) the first plurality of converter modules, (ii) the second plurality of converter modules, and (iii) the third plurality of converter modules is electrically coupled to an AC bus.

In some embodiments, the AC bus is electrically coupled to a grid.

In some embodiments, each converter module includes a fourth AC-DC converter configured to electrically couple with a DC bus and the transformer. The fourth AC-DC converter is configured to convert an eighth AC voltage from the transformer to a seventh DC voltage for the DC bus. The fourth AC-DC converters of the converter modules of the first plurality of converter modules, the second plurality of converter modules, and the third plurality of converter modules are connected in a first daisy chain arrangement. The fourth AC-DC converters of the converter modules of the fourth plurality of converter modules, the fifth plurality of converter modules, and the sixth plurality of converter modules are connected in a second daisy chain arrangement. The first daisy chain arrangement of fourth AC-DC converters is in parallel with the second daisy chain arrangement of fourth AC-DC converters.

In some embodiments, the power connection of each converter module is a first power connection. The system includes a third AC-DC converter configured to electrically couple with the transformer and convert a sixth AC voltage from the transformer to a sixth DC voltage for a fifth DC-AC converter. The fifth DC-AC converter is configured to electrically couple with the third AC-DC converter and a second power connection, and configured to convert the sixth DC voltage to a seventh AC voltage.

In some embodiments, the first power connection of a first converter module of each of (i) the first plurality of converter modules, (ii) the second plurality of converter modules, and (iii) the third plurality of converter modules is electrically coupled to a wind source. The second power connection of the first converter module of each of (i) the first plurality of converter modules, (ii) the second plurality of converter modules, and (iii) the third plurality of converter modules is electrically coupled to an AC bus.

In some embodiments, the first array, the second array, and the third array form a first instance of arrays. The system can include a second instance of arrays. The second instance of arrays includes a fourth array including a fourth plurality of converter modules electrically coupled together in cascaded fashion. The fourth array is configured to output a fourth AC signal including a superposition of AC module voltages from the fourth plurality of converter modules. The second instance of arrays includes a fifth array including a fifth plurality of converter modules electrically coupled together in cascaded fashion. The fifth array is configured to output a fifth AC signal including a superposition of AC module voltages from the fifth plurality of converter modules. The second instance of arrays includes a sixth array including a sixth plurality of converter modules electrically coupled together in cascaded fashion. The sixth array is configured to output a sixth AC signal including a superposition of AC module voltages from the sixth plurality of converter modules.

In some embodiments, the first power connection of a first converter module of each of (i) the fourth plurality of converter modules, (ii) the fifth plurality of converter modules, and (iii) the sixth plurality of converter modules is electrically coupled to the wind source. The second power connection of the first converter module of each of (i) the fourth plurality of converter modules, (ii) the fifth plurality of converter modules, and (iii) the sixth plurality of converter modules is electrically coupled to the AC bus.

In some embodiments, the wind source if a first wind source. The AC bus is a first AC bus. The first power connection of a first converter module of each of (i) the fourth plurality of converter modules, (ii) the fifth plurality of converter modules, and (iii) the sixth plurality of converter modules is electrically coupled to a second wind source. The second power connection of the first converter module of each of (i) the fourth plurality of converter modules, (ii) the fifth plurality of converter modules, and (iii) the sixth plurality of converter modules is electrically coupled to a second AC bus.

In some embodiments, the DC-DC converters of the converter modules of the first plurality of converter modules, the second plurality of converter modules, and the third plurality of converter modules are connected in a first daisy chain arrangement. The DC-DC converters of the converter modules of the fourth plurality of converter modules, the fifth plurality of converter modules, and the sixth plurality of converter modules are connected in a second daisy chain arrangement. The first daisy chain arrangement of DC-DC converters is in parallel with the second daisy chain arrangement of DC-DC converters.

In some embodiments, the system includes a master control device communicatively coupled with the local control devices of the converter modules.

In many embodiments, a framework for a multi-phase energy system includes a plurality of modules arranged in a plurality of cabinets. Each module includes a DC interface and an AC interface. Each module includes an energy source configured to output a DC voltage (DC), a converter coupled with the energy source, and a local control device configured to control the converter to output a module voltage from the AC interface selected from the group comprising: +DC, zero volts, and −DC. The plurality of modules are connected as a plurality of arrays such that each array is configured to output an AC signal having a different phase angle. The modules within each array are connected as levels of that array such that the AC signal output by that array is a superposition of the module voltages from each module of that array. Each cabinet holds the modules belonging to at least one same level of the different arrays arranged along an axis orthogonal to a reference plane such that the modules of the at least one same level are aligned along the axis. For at least two adjacent levels of the arrays, modules are arranged in order of array such that modules of the same array are aligned parallel to the reference plane at a same common distance from the reference plane. The DC interface of each module is electrically coupled to the DC interface of at least one other module via a first connector that is routed along a first side of the plurality of cabinets. The AC interface of each module is electrically coupled to the AC interface of at least one other module via a second connector that is routed along a second side of the plurality of cabinets.

In some embodiments, the first side is opposite the second side.

In some embodiments, the first side is orthogonal to the second side.

In some embodiments, the energy source of each module is a first energy source and each module includes a second energy source.

In some embodiments, the first energy source is electrically coupled to the module via a third connector and a fourth connector and the second energy source is electrically connected to the module via a fifth and sixth connector.

In some embodiments, the third connector is routed along the first side of the cabinet and the fourth connector is routed along the second side of the cabinet.

In some embodiments, the sixth connector is routed within a cabinet along the first side of the cabinet and the seventh connector is routed within the cabinet along the second side of the cabinet.

In some embodiments, the energy source includes a battery module, high energy density (HED) capacitor, or a fuel cell.

In some embodiments, the DC interface of at least one module is electrically coupled to a photovoltaic (PV) source.

In some embodiments, the DC interface of at least one module is electrically coupled to a DC bus.

In some embodiments, the DC interface of at least one module is electrically coupled to a fuel cell.

In some embodiments, the AC interface of at least one module of each phase is electrically coupled to a wind source.

In some embodiments, the AC interface of at least one module of each phase is electrically coupled to an AC bus.

In some embodiments, each module includes multiple AC interfaces.

In some embodiments, each module include multiple DC interfaces.

In some embodiments, the DC interfaces of the modules are connected in a daisy chain arrangement.

In many embodiments, an energy storage system includes a plurality of modules electrically connected together in cascaded fashion to provide energy for a load or grid or receive energy from a load or grid. Each module has an energy source and switch circuitry to selectively connect the energy source to other modules of the system. An energy source of at least one of the modules is a second life energy source.

In some embodiments, all of the energy sources of the system are second life energy sources.

In some embodiments, all of the energy sources of the system are either a first life energy source or a second life energy source.

In some embodiments, all of the energy sources of the system are batteries.

In some embodiments, the energy sources vary in energy capacity by 5% or more, 10% or more, 15% or more, 20% or more, or 25% or more, 30% or more, 5-30%, 10-30%, and/or 20-30%.

In some embodiments, the energy sources vary in energy capacity per mass density by 5% or more, 10% or more, 15% or more, 20% or more, or 25% or more, 30% or more, 5-30%, 10-30%, and/or 20-30%.

In some embodiments, the energy sources vary in peak power per mass density by 5% or more, 10% or more, 15% or more, 20% or more, or 25% or more, 30% or more, 5-30%, 10-30%, and/or 20-30%.

In some embodiments, the energy sources vary in nominal voltage by 5% or more, 10% or more, 15% or more, 20% or more, or 25% or more, 30% or more, 5-30%, 10-30%, and/or 20-30%.

In some embodiments, the energy sources vary in operating voltage range by 5% or more, 10% or more, 15% or more, 20% or more, or 25% or more, 30% or more, 5-30%, 10-30%, and/or 20-30%.

In some embodiments, the energy sources vary in maximum specified current rise time by 5% or more, 10% or more, 15% or more, 20% or more, or 25% or more, 30% or more, 5-30%, 10-30%, and/or 20-30%.

In some embodiments, the energy sources vary in specified peak current by 5% or more, 10% or more, 15% or more, 20% or more, or 25% or more, 30% or more, 5-30%, 10-30%, and/or 20-30%.

In some embodiments, the energy sources vary in electrochemical type.

In some embodiments, the energy storage system is a stationary energy storage system, and the energy sources are post-mobile application energy sources.

In some embodiments, the energy storage system is a mobile energy storage system.

In many embodiments, an energy storage system includes a plurality of converter modules. Each module of the plurality of converter modules includes an AC interface and a DC interface. The AC interfaces of each of the plurality of converter modules are electrically coupled in cascaded fashion to form an array. The array is configured to output an AC signal comprising a superposition of AC module voltages output from the AC interfaces of the plurality of converter modules. The DC interface of each of the plurality of converter modules is electrically coupled to the DC interface of at least one other of the plurality of converter modules. The DC interface of at least one of the plurality of converter modules is coupled with a photovoltaic (PV) source or a fuel cell.

In some embodiments, each of the plurality of converter modules includes an energy source, an energy buffer, a DC-DC converter electrically positioned between the DC interface and the energy source, and a DC-AC converter electrically positioned between the energy source and the AC interface.

In some embodiments, the DC-DC converter includes a transformer.

In some embodiments, the system includes a control system configured to control switch circuitry of each of the plurality of converter modules to set a DC interface voltage across the DC interface of each of the plurality of converter modules.

In some embodiments, each of the plurality of converter modules includes an LC circuit coupled across the DC interface.

In some embodiments, the control system is configured to monitor a state of charge of an energy source of each of the plurality of converter modules, and is configured to control the switch circuitry to set DC interface voltages of the plurality of converter modules such that the energy source of at least one of the plurality of converter modules receives more power from the PV source or fuel cell than the energy source of at least one other of the plurality of converter modules.

In some embodiments, the control system is configured to balance states of charge of energy sources of the plurality of converter modules by regulation of power distributed through the DC interfaces of the plurality of converter modules.

In many embodiments, an energy storage system includes a plurality of converter modules. Each module of the plurality of converter modules includes an AC interface, a first DC interface, and a second DC interface. The AC interfaces of each of the plurality of converter modules are electrically coupled in cascaded fashion to form an array. The array is configured to output an AC signal including a superposition of AC module voltages output from the AC interfaces of the plurality of converter modules. The first DC interface of each of the plurality of converter modules is electrically coupled to the DC interface of at least one other of the plurality of converter modules. The second DC interface of at least one of the plurality of converter modules is coupled with a photovoltaic (PV) source or a fuel cell.

In some embodiments, each of the plurality of converter modules includes an energy source, an energy buffer, a transformer, a first converter electrically positioned between the first DC interface and the transformer, a second converter electrically positioned between the second DC interface and the transformer, a third converter electrically positioned between the energy source and the transformer, and a fourth converter electrically positioned between the AC interface and the transformer.

In some embodiments, the system includes a control system configured to control the first, second, third, and fourth converters of each of the plurality of converter modules.

In some embodiments, the system includes a control system configured to control switch circuitry of each of the plurality of converter modules to set a first DC interface voltage across the first DC interface of each of the plurality of converter modules and to set a second DC interface voltage across the second DC interface of each of the plurality of converter modules.

In some embodiments, each of the plurality of converter modules includes a first LC circuit coupled across the first DC interface and a second LC circuit coupled across the second DC interface.

In some embodiments, the control system is configured to balance states of charge of energy sources of the plurality of converter modules by regulation of power distributed through the first DC interfaces of the plurality of converter modules.

In many embodiments, an energy storage system includes a plurality of converter modules. Each module of the plurality of converter modules includes an energy source, a first AC interface and a second AC interface. The first AC interfaces of each of the plurality of converter modules are electrically coupled in cascaded fashion to form an array. The array is configured to output a first AC signal comprising a superposition of AC module voltages output from the first AC interfaces of the plurality of converter modules to a grid. The second AC interfaces of each of the plurality of converter modules are electrically coupled in cascaded fashion and configured to receive a second AC signal.

In some embodiments, the plurality of converter modules are configured to receive the second AC signal from a renewable energy source.

In some embodiments, each of the plurality of converter modules includes a transformer electrically positioned between the first AC interface and the second AC interface.

In some embodiments, each of the plurality of converter modules includes a DC interface. The DC interface of each of the plurality of converter modules is electrically coupled to the DC interface of at least one other of the plurality of converter modules.

In some embodiments, the plurality of converter modules are configured to transfer energy between them over the DC interfaces.

In some embodiments, the system includes a control system configured to coordinate energy transfer between the plurality of converter modules over the DC interfaces.

In some embodiments, the DC interface is a first DC interface, and wherein the plurality of converter modules each comprises a second DC interface coupled with a photovoltaic source or an energy source.

Processing circuitry can include one or more processors, microprocessors, controllers, and/or microcontrollers, each of which can be a discrete or stand-alone chip or distributed amongst (and a portion of) a number of different chips. Any type of processing circuitry can be implemented, such as, but not limited to, personal computing architectures (e.g., such as used in desktop PC's, laptops, tablets, etc.), programmable gate array architectures, proprietary architectures, custom architectures, and others. Processing circuitry can include a digital signal processor, which can be implemented in hardware and/or software. Processing circuitry can execute software instructions stored on memory that cause processing circuitry to take a host of different actions and control other components.

Processing circuitry can also perform other software and/or hardware routines. For example, processing circuitry can interface with communication circuitry and perform analog-to-digital conversions, encoding and decoding, other digital signal processing, multimedia functions, conversion of data into a format (e.g., in-phase and quadrature) suitable for provision to communication circuitry, and/or can cause communication circuitry to transmit the data (wired or wirelessly).

Any and all communication signals described herein can be communicated wirelessly except where noted or logically implausible. Communication circuitry can be included for wireless communication. The communication circuitry can be implemented as one or more chips and/or components (e.g., transmitter, receiver, transceiver, and/or other communication circuitry) that perform wireless communications over links under the appropriate protocol (e.g., Wi-Fi, Bluetooth, Bluetooth Low Energy, Near Field Communication (NFC), Radio Frequency Identification (RFID), proprietary protocols, and others). One or more other antennas can be included with communication circuitry as needed to operate with the various protocols and circuits. In some embodiments, communication circuitry can share antenna for transmission over links. RF communication circuitry can include a transmitter and a receiver (e.g., integrated as a transceiver) and associated encoder logic.

Processing circuitry can also be adapted to execute the operating system and any software applications, and perform those other functions not related to the processing of communications transmitted and received.

Computer program instructions for carrying out operations in accordance with the described subject matter may be written in any combination of one or more programming languages, including computer and programming languages. A non-exhaustive list of examples includes hardware description languages (HDLs), SystemC, C, C++, C #, Objective-C, Matlab, Simulink, SystemVerilog, System-VHDL, Handel-C, Python, Java, JavaScript, Ruby, HTML, Smalltalk, Transact-SQL, XML, PHP, Golang (Go), "R" language, and Swift, to name a few.

Memory, storage, and/or computer readable media can be shared by one or more of the various functional units present, or can be distributed amongst two or more of them (e.g., as separate memories present within different chips). Memory can also reside in a separate chip of its own.

To the extent the embodiments disclosed herein include or operate in association with memory, storage, and/or computer readable media, then that memory, storage, and/or computer readable media are non-transitory. Accordingly, to the extent that memory, storage, and/or computer readable media are covered by one or more claims, then that memory, storage, and/or computer readable media is only non-transitory. The terms "non-transitory" and "tangible" as used herein, are intended to describe memory, storage, and/or computer readable media excluding propagating electromagnetic signals, but are not intended to limit the type of memory, storage, and/or computer readable media in terms of the persistency of storage or otherwise. For example, "non-transitory" and/or "tangible" memory, storage, and/or computer readable media encompasses volatile and non-volatile media such as random access media (e.g., RAM, SRAM, DRAM, FRAM, etc.), read-only media (e.g., ROM, PROM, EPROM, EEPROM, flash, etc.) and combinations thereof (e.g., hybrid RAM and ROM, NVRAM, etc.) and variants thereof.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

As used herein and in the appended claims, the singular forms "a," "an," and "the" include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

The invention claimed is:

1. A framework for a multi-phase energy system comprising:

a plurality of modules arranged in a plurality of cabinets, wherein each module comprises a DC interface and an AC interface, and wherein each module comprises an energy source configured to output a DC voltage, a converter coupled with the energy source, and a local control device configured to control the converter to output a module voltage from the AC interface, the module voltage being selected from the group consisting of: a positive direct current (+DC) voltage, a reference output voltage, and a negative direct current (−DC) voltage, wherein the plurality of modules are connected as a plurality of arrays such that each array is configured to output an AC signal having a different phase angle, wherein the modules within each array are connected as levels of that array such that the AC signal output by that array is a superposition of the module voltages from each module of that array, and wherein each cabinet holds the modules belonging to at least one same level of the different arrays arranged along an axis orthogonal to a reference plane such that the modules of the at least one same level are aligned along the axis, wherein, for at least two adjacent levels of the arrays, modules are arranged in order of array such that modules of the same array are aligned parallel to the reference plane at a same common distance from the reference plane, wherein the DC interface of each module is electrically coupled to the DC interface of at least one other module via a first connector that is routed along a first side of the plurality of cabinets, wherein the AC interface of each module is electrically coupled to the AC interface of at least one other module via a second connector that is routed along a second side of the plurality of cabinets, and wherein, for each module of each array:
the first connector is an inter-level connector between two modules at different levels, and the second connector is an intra-level connector between two modules at a same level, or the first connector is an intra-level connector between two modules at a same level and the second connector is an inter-level connector between two modules at different levels.

2. The framework of claim 1, wherein the first side is opposite the second side.

3. The framework of claim 1, wherein the first side is orthogonal to the second side.

4. The framework of claim 1, wherein the energy source of each module is a first energy source and each module comprises a second energy source.

5. The framework of claim 4, wherein the first energy source is electrically coupled to the module via a third connector and a fourth connector and the second energy source is electrically connected to the module via a fifth connector and a sixth connector.

6. The framework of claim 5, wherein the third connector is routed along the first side of the cabinet and the fourth connector is routed along the second side of the cabinet.

7. The framework of claim 6, wherein the fifth connector is routed along the first side of the cabinet and the sixth connector is routed along the second side of the cabinet.

8. The framework of claim 1, wherein the energy source comprises a battery module, high energy density (HED) capacitor, or a fuel cell.

9. The framework of claim 1, wherein the DC interface of at least one module is electrically coupled to a photovoltaic (PV) source.

10. The framework of claim 1, wherein the DC interface of at least one module is electrically coupled to a DC bus.

11. The framework of claim 1, wherein the DC interface of at least one module is electrically coupled to a fuel cell.

12. The framework of claim 1, wherein the AC interface of at least one module of each phase is electrically coupled to a wind source.

13. The framework of claim 1, wherein the AC interface of at least one module of each phase is electrically coupled to an AC bus.

14. The framework of claim 1, wherein each module comprises multiple AC interfaces.

15. The framework of claim 1, wherein each module comprises multiple DC interfaces.

16. The framework of claim 1, wherein the DC interfaces of the modules are connected in a daisy chain arrangement.

17. A framework for a multi-phase energy system comprising:
a plurality of modules arranged in a plurality of cabinets, wherein each module comprises a DC interface and an AC interface, and wherein each module comprises an energy source configured to output a DC voltage (DC), a DC-AC converter coupled with the energy source and the AC interface, a DC-DC converter coupled with the energy source and the DC interface, and a local control device,
wherein the local control device is configured to control the DC-AC converter to output a module voltage from the AC interface, the module voltage being selected from the group consisting of: a positive DC output voltage, a reference output voltage, and a negative DC output voltage, wherein the local control device is further configured to control the DC-DC converter,
wherein the plurality of modules are connected as a plurality of arrays such that each array is configured to output an AC signal having a different phase angle, wherein the modules within each array are connected as levels of that array such that the AC signal output by that array is a superposition of the module voltages from each module of that array,
wherein the DC interface of each module is electrically coupled to the DC interface of at least one other module via a first connector that is routed along a first side of the plurality of cabinets,
wherein the AC interface of each module is electrically coupled to the AC interface of at least one other module via a second connector that is routed along a second side of the plurality of cabinets, and
wherein, for each module of each array:
the first connector is an inter-level connector between two modules at different levels and the second connector is an intra-level connector between two modules at a same level, or
the first connector is an intra-level connector between two modules at a same level and the second connector is an inter-level connector between two modules at different levels.

18. The framework of claim 17, wherein:
the energy source of each module is a first energy source and each module comprises a second energy source, and
the second energy source of each module is electrically connected to the DC-AC converter of the module via a fifth connector and a sixth connector.

19. The framework of claim 17, wherein the converter and the local control device of each module is arranged in a housing comprising DC ports facing the first side of the plurality of cabinets and AC ports facing the second side of the plurality of cabinets, and wherein the energy source is arranged outside of the housing.

20. A framework for a multi-phase energy system comprising:
a plurality of modules arranged in a plurality of cabinets, wherein each module comprises a DC interface and an AC interface, and wherein each module comprises an energy source configured to output a DC voltage (DC), a converter coupled with the energy source, and a local control device configured to control the converter to output a module voltage from the AC interface, the module voltage being selected from the group consisting of: a positive DC output voltage, a reference output voltage, and a negative DC output voltage,
wherein the plurality of modules are connected as a plurality of arrays such that each array is configured to output an AC signal having a different phase angle, wherein the modules within each array are connected as levels of that array such that the AC signal output by that array is a superposition of the module voltages from each module of that array,
wherein the DC interface of each module is electrically coupled to the DC interface of at least one other module via a first connector that is routed along a first side of the plurality of cabinets such that the DC interfaces of the plurality of modules are connected in a daisy chain arrangement,
wherein the AC interface of each module is electrically coupled to the AC interface of at least one other module via a second connector that is routed along a second side of the plurality of cabinets,
wherein, for each module of each array:
the first connector is an inter-level connector between two modules at different levels and the second connector is an intra-level connector between two modules at a same level, or the first connector is an intra-level connector between two modules at a same level and the second connector is an inter-level connector between two modules at different levels.

* * * * *